(12) United States Patent
Yoshida et al.

(10) Patent No.: US 7,385,662 B2
(45) Date of Patent: Jun. 10, 2008

(54) LIQUID CRYSTAL DISPLAY WITH CONNECTION ELECTRODES, BRANCHES, AND EXTENSION ELECTRODES

(75) Inventors: Hidefumi Yoshida, Kawasaki (JP); Yasutoshi Tasaka, Kawasaki (JP); Takashi Sasabayashi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/346,517

(22) Filed: Feb. 2, 2006

(65) Prior Publication Data

US 2006/0125992 A1 Jun. 15, 2006

Related U.S. Application Data

(62) Division of application No. 10/408,437, filed on Apr. 7, 2003, now Pat. No. 7,023,516.

(30) Foreign Application Priority Data

| Apr. 15, 2002 | (JP) | ............................ 2002-112623 |
| Sep. 30, 2002 | (JP) | ............................ 2002-287809 |

(51) Int. Cl.
*G02F 1/1343* (2006.01)
(52) U.S. Cl. ...................... 349/143; 349/129; 349/139; 349/141; 349/146
(58) Field of Classification Search ...................... None
See application file for complete search history.

(56) References Cited

U.S. PATENT DOCUMENTS

| 6,052,162 | A | 4/2000 | Shimada et al. ............... 349/38 |
| 6,407,791 | B1 | 6/2002 | Suzuki et al. |
| 2002/0075436 | A1 | 6/2002 | Kubo et al. |
| 2002/0159018 | A1 | 10/2002 | Kataoka et al. |
| 2003/0071952 | A1 | 4/2003 | Yoshida et al. |
| 2003/0086044 | A1 | 5/2003 | Inoue et al. |
| 2003/0164921 | A1 | 9/2003 | Uesaka et al. ............... 349/194 |
| 2004/0075798 | A1 | 4/2004 | Inoue et al. ................ 349/129 |
| 2004/0141134 | A1 | 7/2004 | Nakanishi et al. |

FOREIGN PATENT DOCUMENTS

JP 09-152625 6/1997

(Continued)

*Primary Examiner*—Andrew Schechter
*Assistant Examiner*—Lucy Chien
(74) *Attorney, Agent, or Firm*—Greer, Burns & Crain, Ltd.

(57) ABSTRACT

The invention relates to a substrate for a liquid crystal display used in a display section of an information apparatus and a liquid crystal display having the same and provides a substrate for a liquid crystal display and a liquid crystal display having the same that provide good display characteristics without any increase in manufacturing steps. A configuration is employed which includes a plurality of gate bus lines formed on a substrate substantially in parallel with each other, a plurality of drain bus lines formed on the substrate such that they intersect the gate bus lines with an insulation film interposed therebetween, pixel regions provided on the substrate in the form of a matrix, pixel electrodes having a plurality of electrode units formed in the pixel regions, slits formed between the electrode units, and connection electrodes for connecting the plurality of electrode units with each other and a thin film transistor formed at each pixel region.

1 Claim, 59 Drawing Sheets

FOREIGN PATENT DOCUMENTS

| | | |
|---|---|---|
| JP | 11-242225 | 9/1999 |
| JP | 11-352512 | 12/1999 |
| JP | 2000-040456 | 2/2000 |
| JP | 2000-047251 | 2/2000 |
| JP | 2000-122082 | 4/2000 |
| JP | 200-267101 | 9/2000 |
| JP | 2000-305100 | 11/2000 |
| JP | 2001-051298 | 2/2001 |
| JP | 2001-083517 | 3/2001 |
| JP | 2001-249340 | 9/2001 |
| JP | 2001-249350 | 9/2001 |
| JP | 2001-331124 | 11/2001 |
| JP | 2002-031717 | 1/2002 |
| JP | 2002-040432 | 2/2002 |
| JP | 2002-040457 | 2/2002 |
| KR | 2001-0007523 | 1/2001 |
| KR | 1020010039258 | 5/2001 |

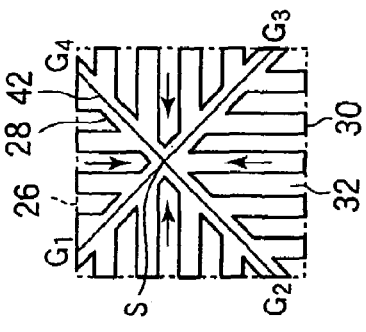
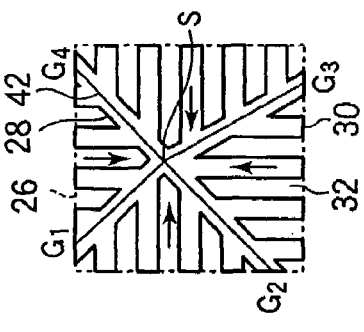
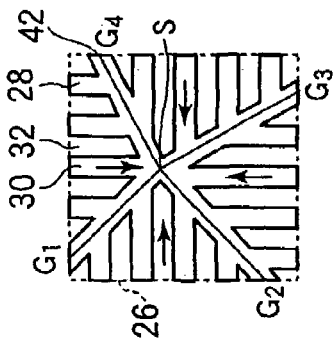
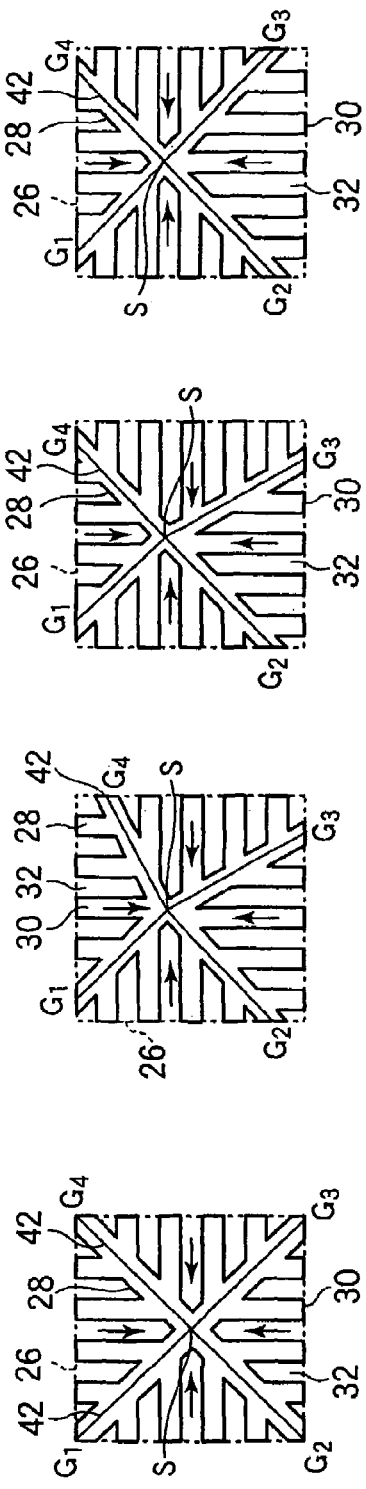
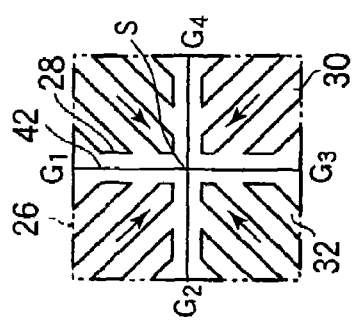
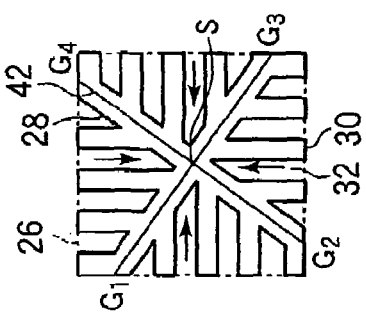
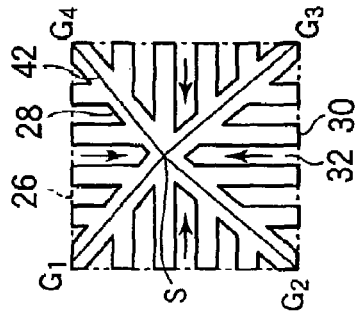
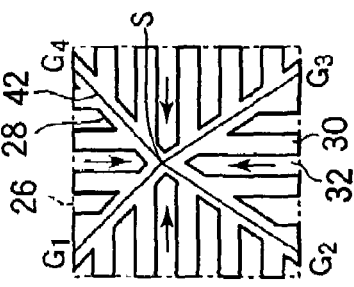

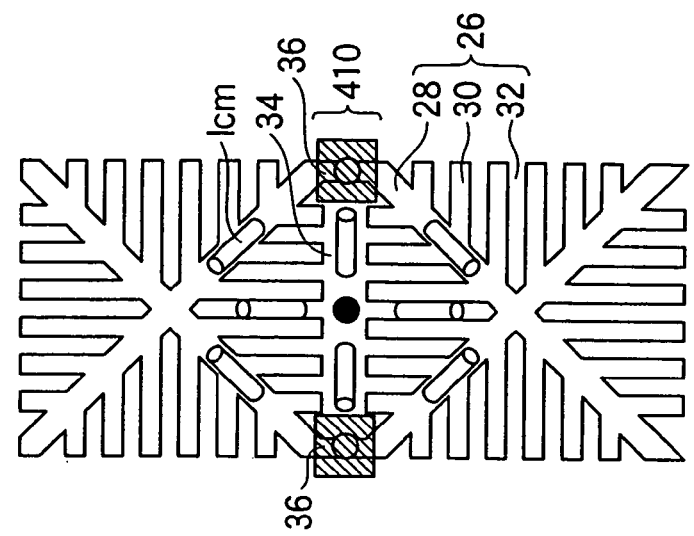
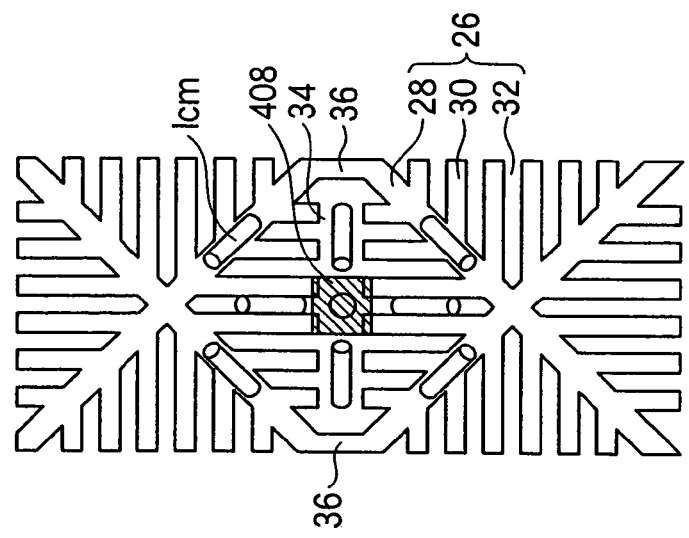
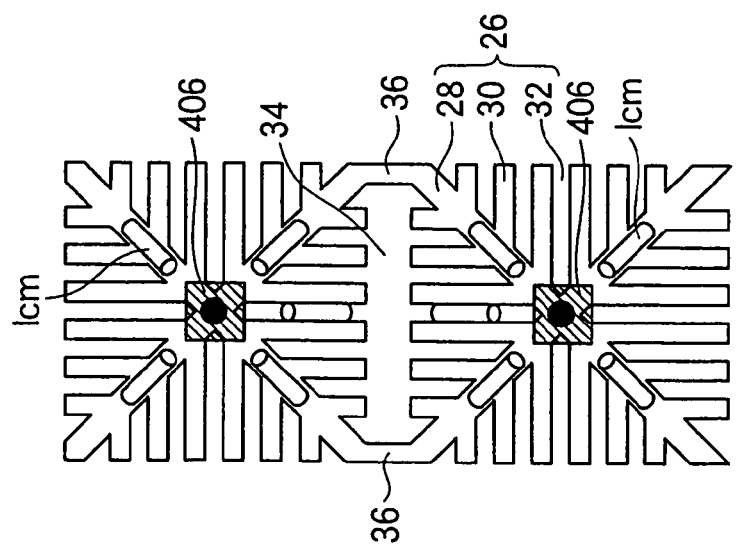
FIG.37C
FIG.37B
FIG.37A

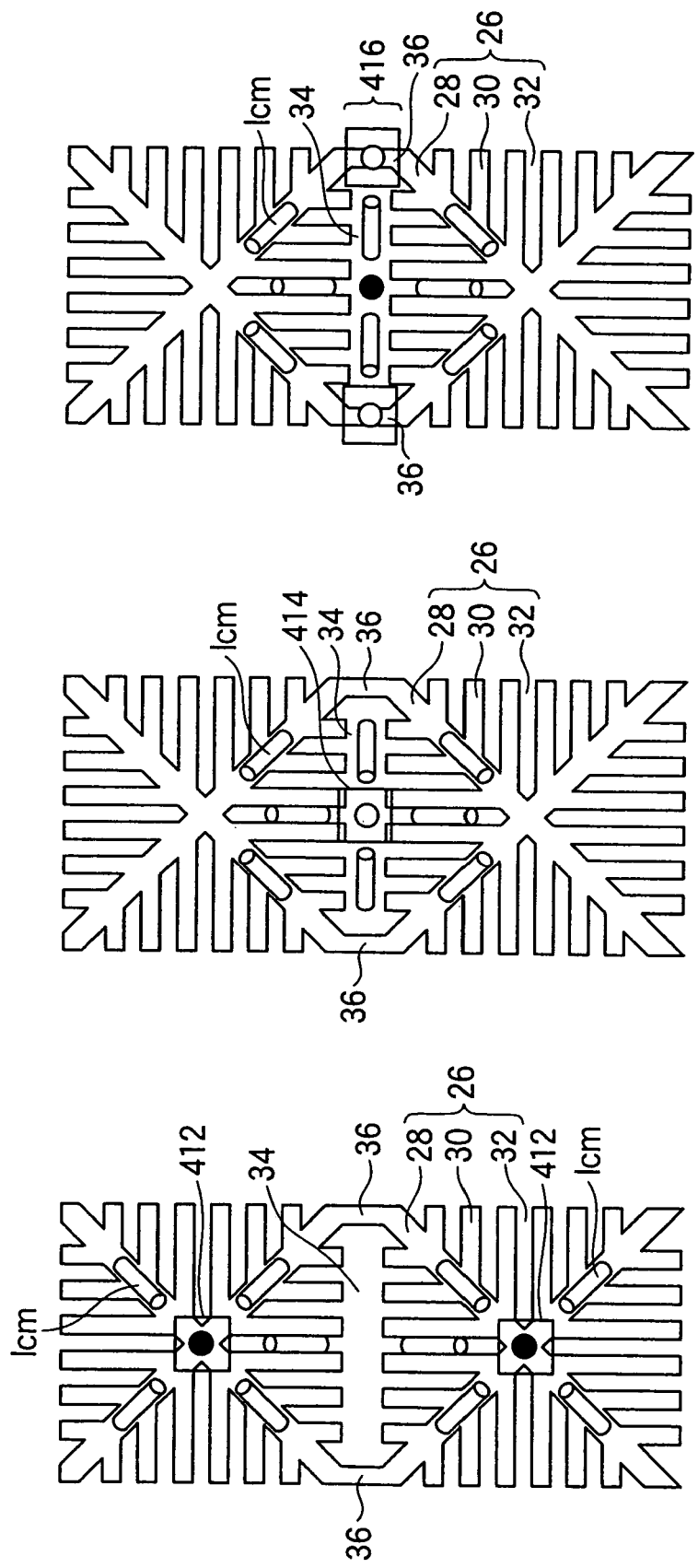

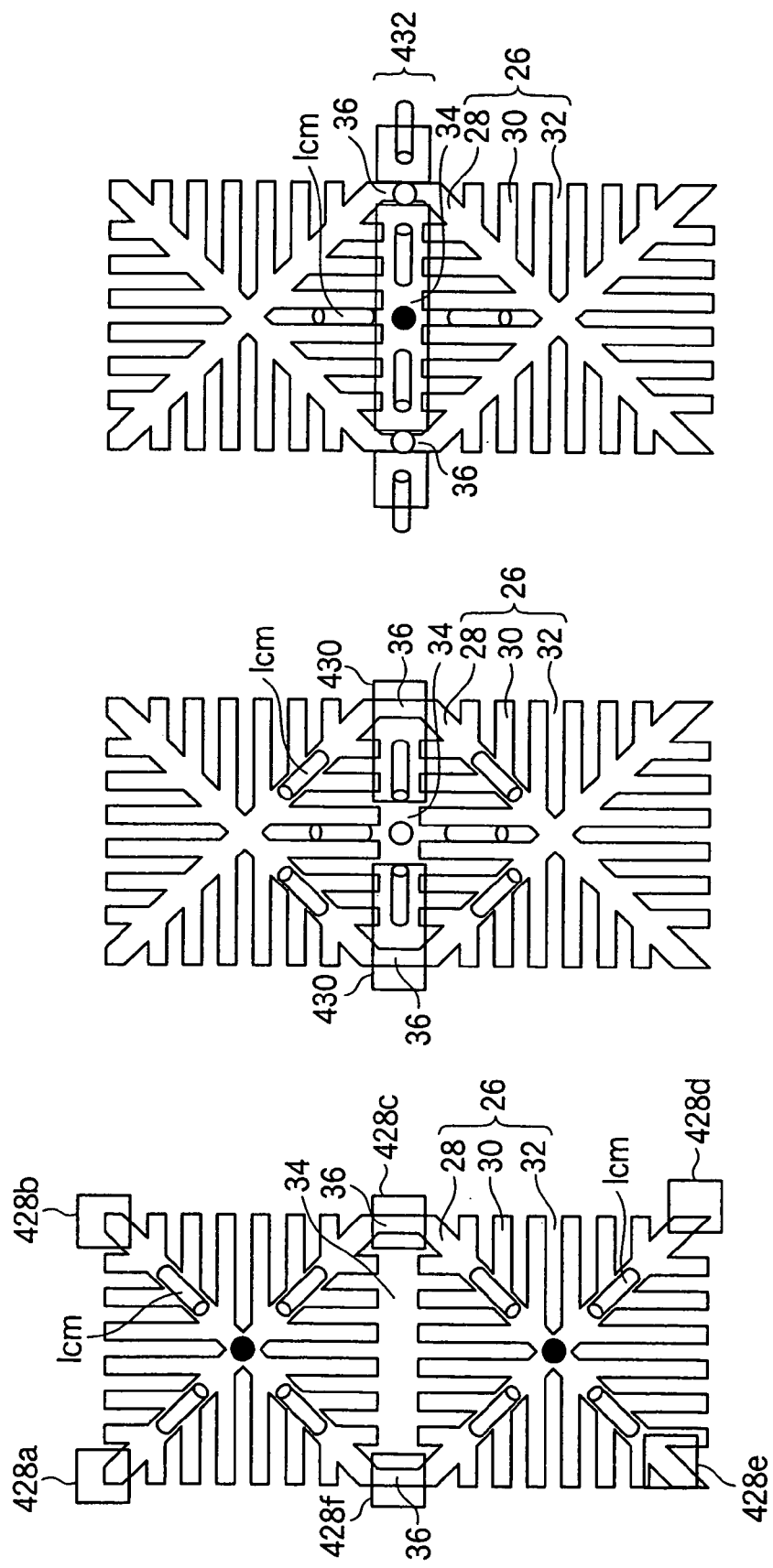

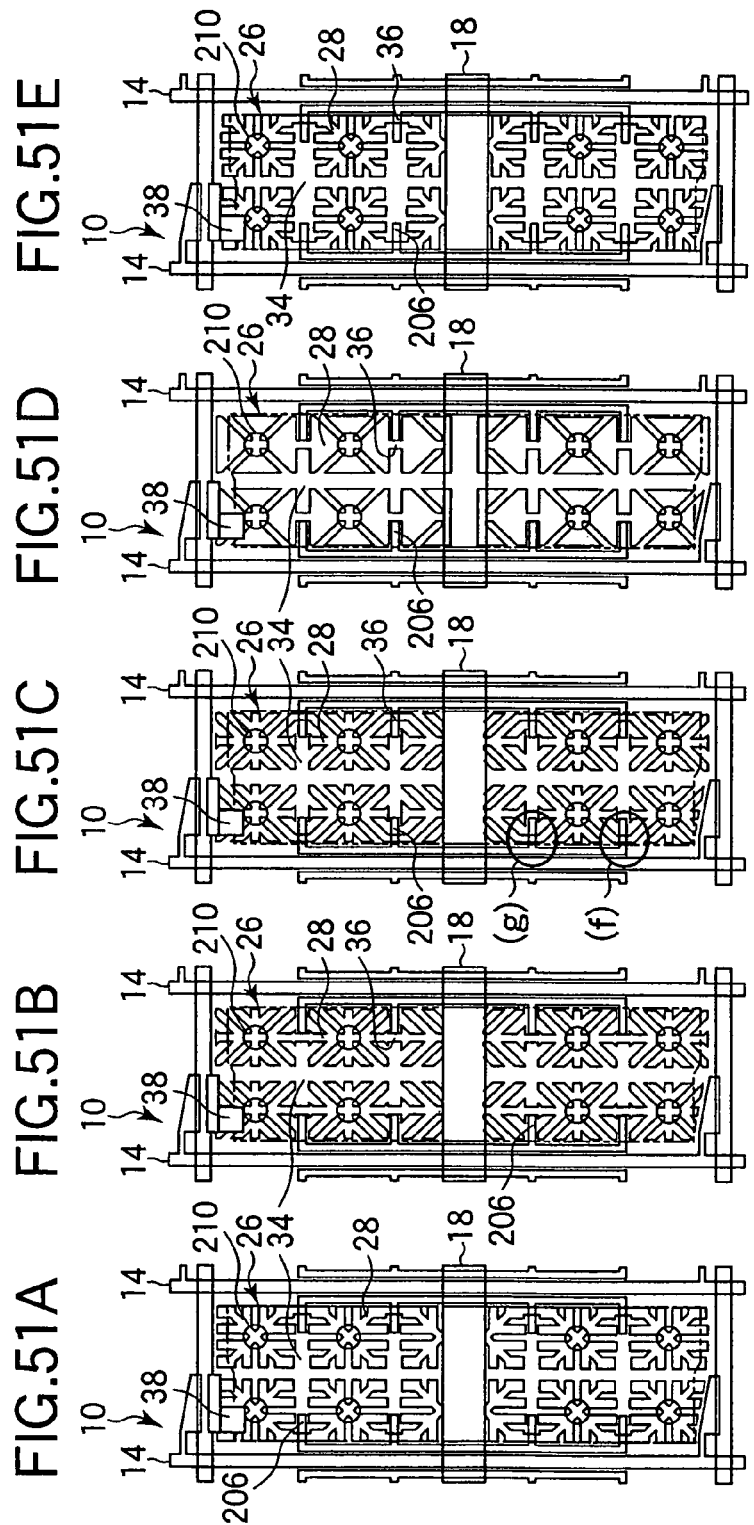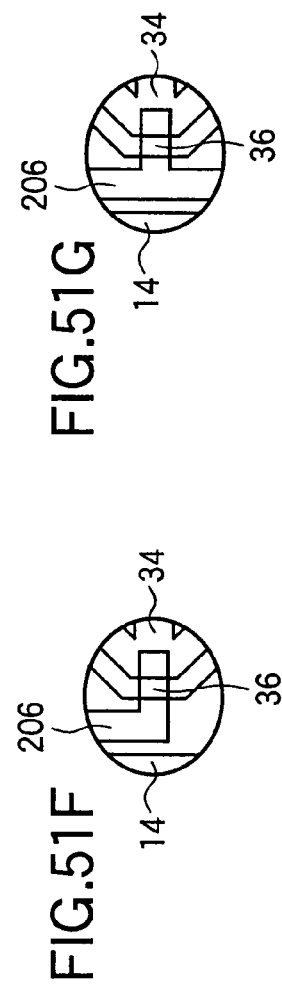

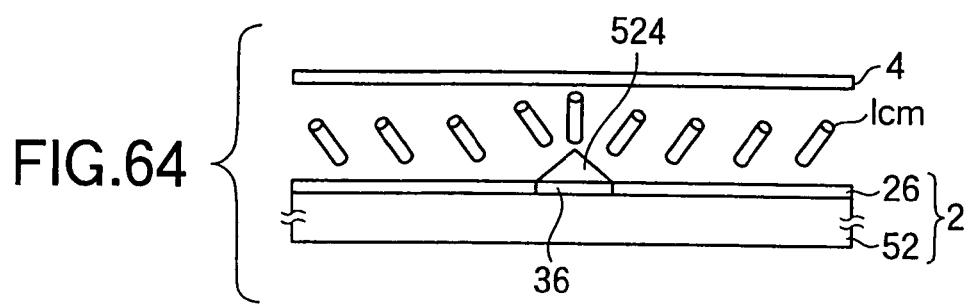
FIG. 64
FIG. 65A
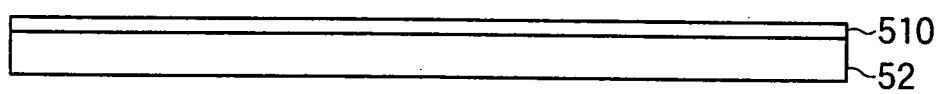
FIG. 65B
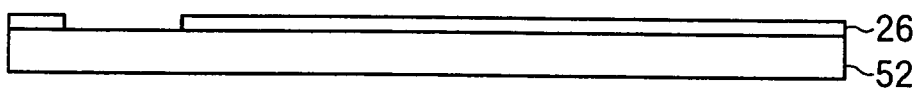
FIG. 65C
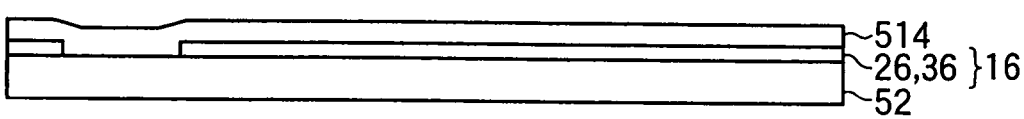
FIG. 65D
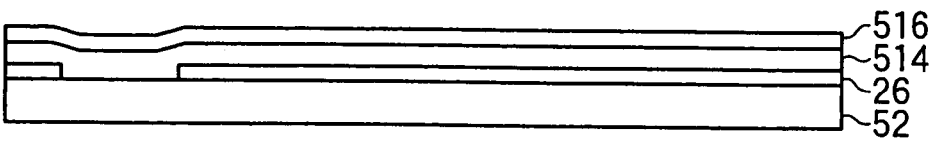

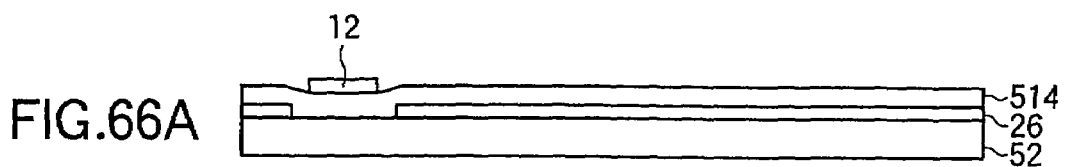
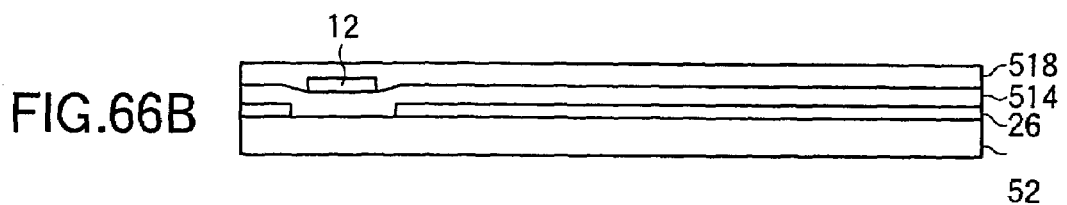
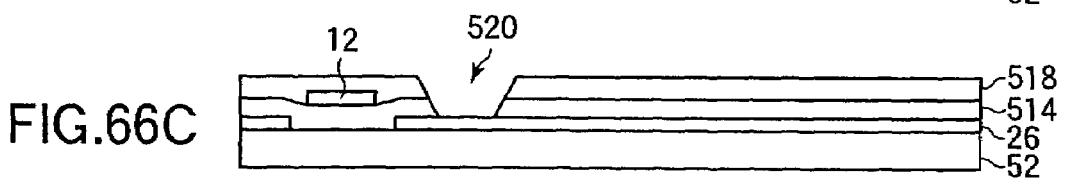
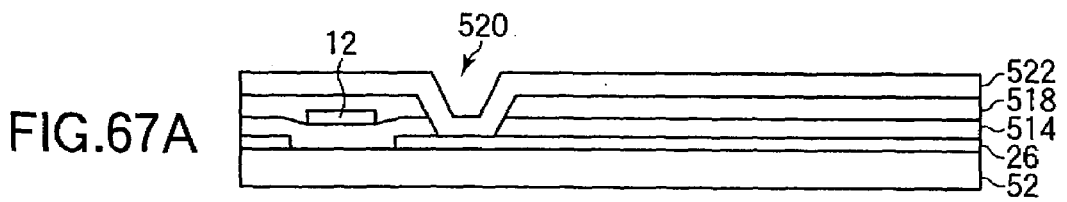
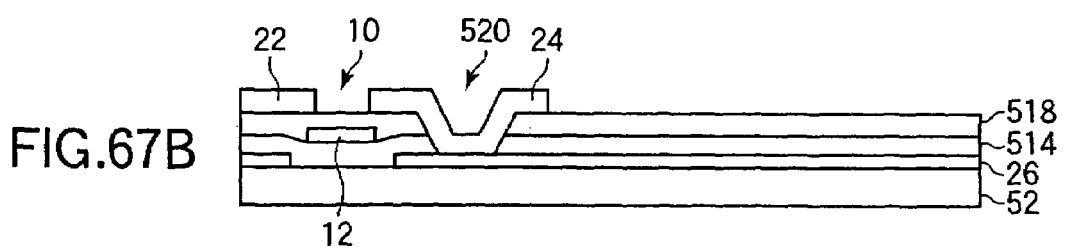
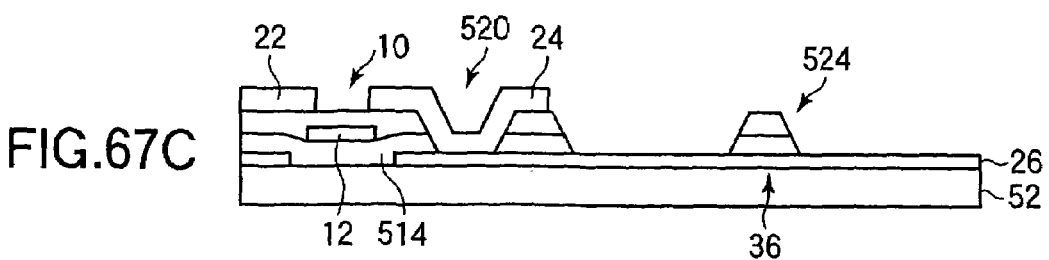

LIQUID CRYSTAL DISPLAY WITH CONNECTION ELECTRODES, BRANCHES, AND EXTENSION ELECTRODES

This is divisional of application Ser. No. 10/408,437, filed Apr. 7, 2003 now U.S. Pat. No. 7,023,516.

BACKGROUND OF THE INVENTION

1. Field of the Invention

The present invention relates to a substrate for a liquid crystal display used in a display section of an information apparatus and a liquid crystal display having the same.

2. Description of the Related Art

In the field of active matrix liquid crystal displays having a thin film transistor (TFT) at each pixel, efforts have recently been made to increase their size and to allow them to display in higher tones with higher contrast.

FIG. 70 shows a configuration of one pixel of a TFT substrate of an active matrix liquid crystal display. As shown in FIG. 70, a plurality of gate bus lines 112 extending in the horizontal direction of the figure are formed substantially in parallel with each other (two of those are shown in FIG. 70). A plurality of drain bus lines 114 extending in the vertical direction of the figure are formed substantially in parallel with each other such that they intersect the gate bus lines 112 with an insulation film which is not shown interposed therebetween (two of those are shown in FIG. 70). Regions surrounded by the plurality of gate bus lines 112 and drain bus lines 114 are pixel regions. Pixel electrodes 116 are formed in the pixel regions. Storage capacitor bus lines 118 extending substantially in parallel with the gate bus lines 112 are formed substantially across the middle of the pixel regions.

TFTs 110 are formed in the vicinity of the positions where the gate bus lines 112 and the drain bus lines 114 intersect each other. Drain electrodes 122 of the TFTs 110 are extended from the drain bus lines 114 and are formed such that they are located at edges of active semiconductor layers and channel protection films formed on the same (both of which are not shown) on one side thereof. Source electrodes 124 of the TFTs 110 are formed such that they face the drain electrodes 122 with a predetermined gap left therebetween and such that they are located edges of the active semiconductor layers and channel protection films on another side thereof. Regions of the gate bus lines 112 directly under the channel protection films serve as gate electrodes of the TFTs 110. The source electrodes 124 are electrically connected to pixel electrodes 116 through contact holes (not shown).

FIG. 71 shows alignment of liquid crystal molecules in a VA (vertically aligned) mode liquid crystal display fabricated using a TFT substrate as shown in FIG. 70. The arrows in the figure represent directions in which the liquid crystal molecules are tilted when a voltage is applied to the liquid crystal layer. FIG. 71 shows three pixels which are defined by a black matrix (BM) 140. As shown in FIG. 71, the liquid crystal molecules are tilted in various directions in the VA mode liquid crystal display that has not been subjected to an aligning process such as rubbing when a voltage is applied to the liquid crystal layer. As a result, alignment regions having different areas are formed in each of the pixels. Further, boundaries (disclination) between alignment regions are visually perceived as dark lines 142 the position of which is different in each pixel. Therefore, when the display screen is viewed in a diagonal direction in particular, irregularities, coarseness, and after images can be visually perceived, and image quality can be thus significantly reduced.

Liquid crystal displays are now being used even as monitors of personal computers (PC) and television receivers. In such applications, liquid crystal displays must have wider viewing angles such that they can be properly viewed in any direction.

MVA (multi-domain vertical alignment) type liquid crystal displays (hereinafter referred to as "MVA LCDs") have been proposed as a technique to achieve wider viewing angles (see Article 1, for example).

FIGS. 72A and 72B show a schematic sectional configuration of an MVA LCD. FIG. 72A a liquid crystal layer to which no voltage is applied, and FIG. 72B shows the liquid crystal layer to which a predetermined voltage is now applied. As shown in FIGS. 72A and 72B, the MVA LCD has two substrates 302 and 304 which are provided opposite to each other. A transparent electrode (not shown) is formed on both of the substrates 302 and 304. A plurality of linear protrusions (banks) 306 made of resin are formed in parallel with each other on the substrate 302, and a plurality of linear protrusions 308 are formed in parallel with each other on the other substrate 304. The protrusions 306 and 308 are alternately arranged when viewed in a direction perpendicular to substrate surfaces.

A liquid crystal layer 160 having negative dielectric constant anisotropy is sealed between the substrates 302 and 304. As shown in FIG. 72A, liquid crystal molecules 312 are aligned substantially perpendicularly to the substrate surfaces by an alignment regulating force of a vertical alignment film (not shown) formed on surfaces of the substrates 302 and 304 facing each other. Liquid crystal molecules 312 in the vicinity of the protrusions 306 and 308 are aligned substantially perpendicular to inclined surfaces of the protrusions 306 and 308. That is, the liquid crystal molecules 312 in the vicinity of the protrusions 306 and 308 are aligned at an angle to the substrate surfaces.

As shown in FIG. 72B, when a predetermined voltage is applied between the transparent electrodes on the substrates 302 and 304, the liquid crystal molecules 312 in the vicinity of the protrusions 306 and 308 are tilted in a direction perpendicular to the direction in which the protrusions 306 and 308 extend. The tilt is propagated to liquid crystal molecules 312 between the protrusions 306 and 308, and the liquid crystal molecules 312 between the protrusions 306 and 308 are thus tilted in the same direction.

The tilting direction of the liquid crystal molecules 312 can be regulated in each region by providing the protrusions 306 and 308 in such a way. When the protrusions 306 and 308 are formed in two directions substantially perpendicular to each other, the liquid crystal molecules 312 are tilted in four directions in one pixel. Since viewing angle characteristics of different regions are thus mixed, the MVA LCD has a wide viewing angle when displaying white or black. The MVA LCD exhibits a contrast ratio of 10 or more in upward, downward, leftward, and rightward viewing directions each of which is at an angle of 80 deg. to the direction perpendicular to the display screen.

(Reference Documents)

Article 1: Japanese Patent No. 2947350

Article 2: JP-A-2000-305100

Article 3: JP-A-2001-249340

Article 4: JP-A-2001-249350

Article 5: JP-A-2002-40432

Article 6: JP-A-2002-40457

Article 7: JP-A-2000-47251

However, the MVA LCD shown in FIGS. 72A and 72B has a problem arises in that it suffers from a low yield of manufacture and a high manufacturing cost because there is a need for an additional step for forming the protrusions 306 and 308.

Another technique is to form a transparent electrode with blank sections (slits) instead of providing protrusions 306 and 308. However, when a common electrode on a CF substrate is formed with slits, a CF layer is exposed and put in contact with a liquid crystal layer. For example, when resin including a pigment dispersed therein as a color component is used as a CF layer, a problem arises in that inorganic components of the pigment can contaminate a liquid crystal layer and a semiconductor layer.

FIG. 73 shows another configuration of a TFT substrate of an MVA LCD. As shown in FIG. 73, a pixel electrode 116 has trunk sections 128 extending substantially in parallel with or perpendicularly to bus lines 112 and 114, branch sections 130 branching from the trunk sections 128 and extending diagonally to the same, and spaces 132 between adjoining branch sections 130. In an MVA LCD fabricated using the TFT substrate shown in FIG. 73, the aligning direction of liquid crystal molecules is determined by the trunk sections 128 and the branch sections 130.

However, since the response time of the liquid crystal molecules in the MVA LCD fabricated using the TFT substrate shown in FIG. 73 is long, a singular point of an alignment vector of liquid crystal molecules is generated at random on the branch sections 130. As a result, the position of a singular point is different in each pixel or frame. Therefore, irregularities and coarseness is visually perceived on the display screen when the display screen is viewed in a diagonal direction in particular, which results in the problem of reduction in display quality.

SUMMARY OF THE INVENTION

The invention provides a substrate for a liquid crystal display with which high display quality can be achieved without increasing manufacturing steps and a liquid crystal display having the same.

The above-described problems are solved by a substrate for a liquid crystal display having an insulated substrate that sandwiches a liquid crystal display in combination with an opposite substrate, a plurality of gate bus lines formed substantially in parallel with each other on the insulated substrate, a plurality of drain bus lines formed such that they intersect the gate bus lines with an insulation film interposed therebetween, pixel regions provided in the form of a matrix on the insulated substrate, a pixel electrode having a plurality of electrode units formed in the pixel regions, slits formed between the electrode units and connection electrodes for connecting the plurality of electrode units with each other, and a thin film transistor formed in each of the pixel regions.

BRIEF DESCRIPTION OF THE DRAWINGS

FIGS. 22A to 22H show modifications of the configuration of a substrate for a liquid crystal display according to Embodiment 2-1 in the second mode for carrying out the invention;

FIGS. 37A to 37C show configurations of a substrate for a liquid crystal display according to Embodiment 3-2 in the third mode for carrying out the invention;

FIGS. 40A to 40C show configurations of a substrate for a liquid crystal display according to Embodiment 3-3 in the third mode for carrying out the invention;

FIGS. 43A to 43C show configurations of a substrate for a liquid crystal display according to Embodiment 3-6 in the third mode for carrying out the invention;

FIGS. 51A to 51G show examples of specific configurations of a substrate for a liquid crystal display according to Embodiment 3-11 in the third mode for carrying out the invention;

FIG. 64 is a sectional view showing a configuration of a substrate for a liquid crystal display according to Embodiment 5-2 in the fifth mode for carrying out the invention;

FIGS. 65A to 65D are sectional views taken at manufacturing steps showing a method of manufacturing a substrate for a liquid crystal display according to Embodiment 5-2 in the fifth mode for carrying out the invention;

FIGS. 66A to 66C are sectional views taken at manufacturing steps showing the method of manufacturing a substrate for a liquid crystal display according to Embodiment 5-2 in the fifth mode for carrying out the invention;

FIGS. 67A to 67C are sectional views taken at manufacturing steps showing the method of manufacturing a substrate for a liquid crystal display according to Embodiment 5-2 in the fifth mode for carrying out the invention;

DESCRIPTION OF THE PREFERRED EMBODIMENTS (First Mode for Carrying Out the Invention)

Substrates for a liquid crystal display and liquid crystal displays in a first mode for carrying out the invention will now be specifically described with reference to Embodiments 1-1 to 1-6.

Embodiment 1-1

Figure 1:
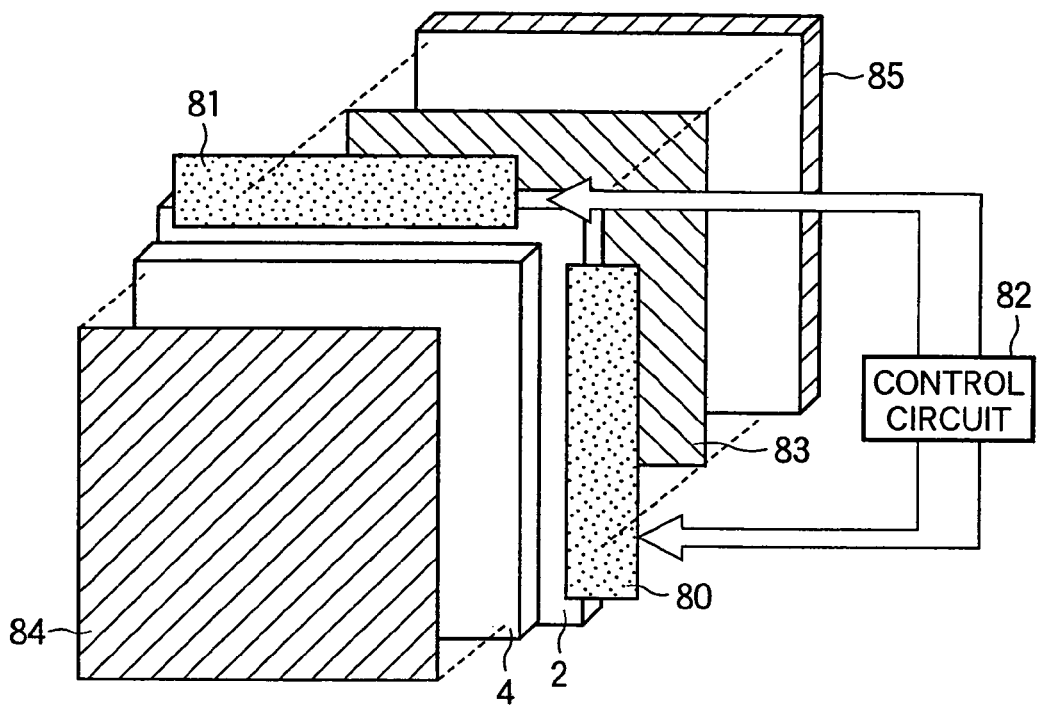
FIG. 1 shows a schematic configuration of a liquid crystal display according to Embodiment 1-1 in a first mode for carrying out the invention.

A substrate for a liquid crystal display and a liquid crystal display having the same according to Embodiment 1-1 in the first mode for carrying out the invention will now be described with reference to FIGS. 1 to 4. FIG. 1 shows a schematic configuration of a liquid crystal display of the present embodiment. The liquid crystal display has a structure in which a TFT substrate (insulated substrate) 2 having TFT formed thereon and a CF substrate (insulated opposite substrate) 4 having color filters formed thereon are combined in a face-to-face relationship to seal a liquid crystal between the substrates 2 and 4.

Figure 2:
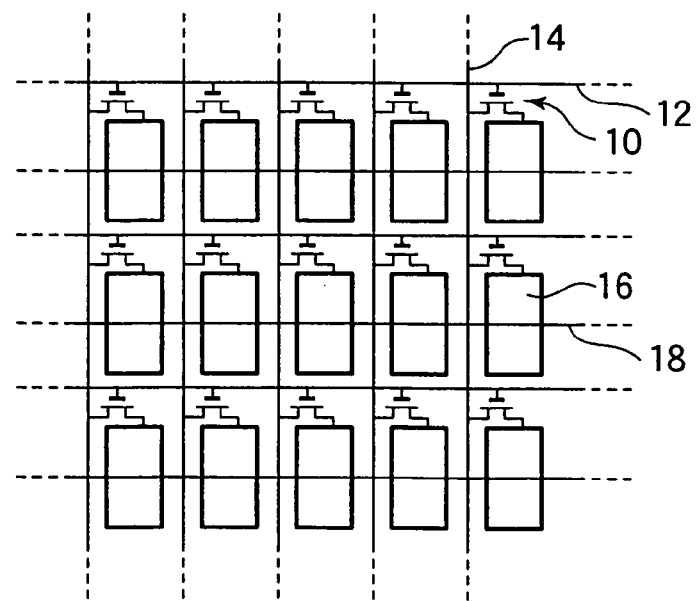
FIG. 2 schematically shows an equivalent circuit of the liquid crystal display according to Embodiment 1-1 in the first mode for carrying out the invention.

FIG. 2 schematically shows an equivalent circuit of elements formed on the TFT substrate 2. On the TFT substrate 2, a plurality of gate bus lines 12 extending in the horizontal direction in the figure are formed in parallel with each other. A plurality of drain bus lines 14 extending in the vertical direction in the figure are formed in parallel with each other such that they intersect the gate bus lines 12 with an insulation film interposed therebetween. Each of regions surrounded by the plurality of gate bus lines 12 and drain bus lines 14 serves as a pixel region. A TFT 10 and a pixel electrode 16 are formed in each of the pixel regions that are provided in the form of a matrix. A drain electrode of each TFT 10 is connected to a drain bus line 14 adjacent thereto; a gate electrode of the same is connected to a gate bus line 12 adjacent thereto; and a source electrode of the same is connected to the pixel electrode 16. A storage capacitor bus line 18 is formed substantially in the middle of each pixel region in parallel with the gate bus lines 12. The TFTs 10, the pixel electrodes 16, the bus lines 12, 14 and 16 are formed using a photolithographic process and formed by repeating a series of semiconductor processes that starts with film formation followed by resist application, exposure, developing, etching, and then removal of the resist.

Referring to FIG. 1 again, the TFT substrate 2 is provided with a gate bus line driving circuit 80 having driver ICs for driving the plurality of gate bus lines 12 and a drain bus line driving circuit 81 having driver ICs for driving the plurality of drain bus lines 14. The driving circuits 80 and 81 output a scan signal and a data signal to a predetermined gate bus line 12 or drain bus line 14 based on a predetermined signal output by a control circuit 82. A polarizer 83 is provided on a surface of the TFT substrate 2 opposite to the surface of the same on which the elements are formed, and a backlight unit 85 is mounted on a surface of the polarizer 83 opposite to the surface thereof facing the TFT substrate 2. A polarizer 84 is applied to a surface of the CF substrate 4 opposite to the surface thereof on which color filters are formed.

Figure 3:
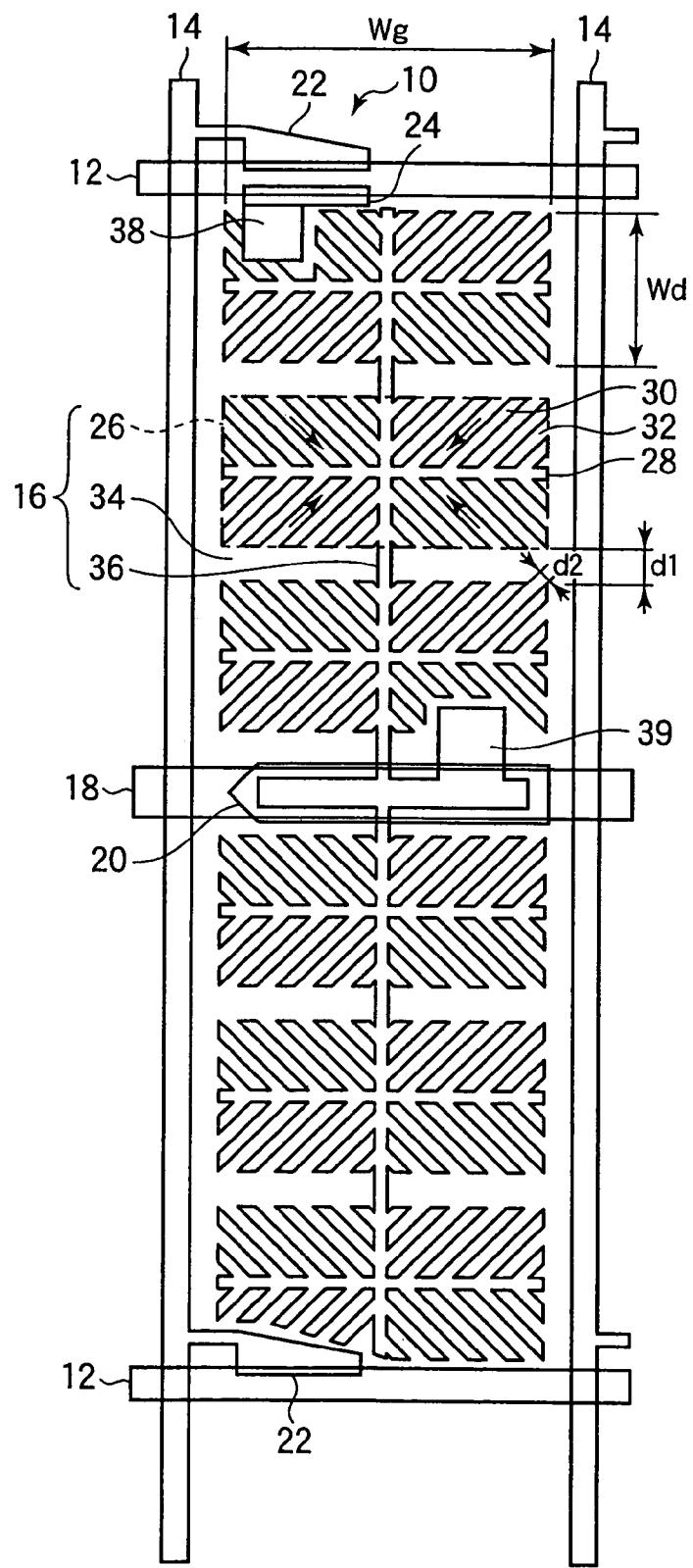
FIG. 3 shows a configuration of a substrate for a liquid crystal display according to Embodiment 1-1 in the first mode for carrying out the invention.

FIG. 3 shows a configuration of one pixel of the TFT substrate 2. As shown in FIG. 3, on the TFT substrate 2, a plurality of gate bus lines 12 extending in the horizontal direction in the figure are formed substantially in parallel with each other at intervals of 300 µm, for example (FIG. 3 shows two of those lines). A plurality of drain bus lines 14 extending in the vertical direction in the figure are formed substantially in parallel with each other at intervals of 100 µm, for example, such that they intersect the gate bus lines 12 substantially perpendicular to the same with an insulation film which is not shown interposed therebetween (FIG. 3 shows two of those lines). Regions surrounded by the plurality of gate bus lines 12 and drain bus lines 14 serve as pixel regions. Storage capacitor bus lines 18 extending substantially in parallel with the gate bus lines 12 are formed such that they traverse the respective pixel regions in the middle thereof. Storage capacitor electrodes 20 for respective pixels are formed on the storage capacitor bus lines 18.

TFTs 10 are formed in the vicinity of the positions where the gate bus lines 12 and the drain bus lines 14 intersect. Drain electrodes 22 of the TFTs 10 are extended from the drain bus lines 14 and are formed such that they are located at edges of active semiconductor layers and channel protection films formed on the same (both of which are not shown) on one side thereof. Source electrodes 24 of the TFTs 10 are formed such that they face the drain electrodes 22 with a predetermined gap left therebetween and such that they are located on edges of the active semiconductor layers and the channel protection films on another side thereof. Regions of the gate bus lines 12 directly under the channel protection films serve as gate electrodes of the TFTs 10.

Pixel electrodes 16 constituted by transparent conductive films such as ITOs (indium tin oxides) are formed in the pixel regions. The pixel electrodes 16 have a rectangular outline and have a plurality of electrode units 26 that are smaller than a pixel region, blank sections (slits) 34 of the electrodes formed between adjoining electrode units 26 and connection electrodes 36 for electrically connecting the electrode units 26 separated by the slits 34 with each other. In FIG. 3, three each electrode units 26 (six units in total) are provided on both sides of a storage capacitor bus line 18, i.e., above and below the same.

An electrode unit 26 has crossed electrodes (trunk sections) 28 that extend substantially in parallel with or perpendicularly to the gate bus lines 12 and the drain bus lines 14. An electrode unit 26 has a plurality of electrodes (branch sections) 30 that branch from the trunk sections 28 and extend in the form of comb teeth at an angle to the trunk sections 28 and blank sections (spaces) 32 between adjoining branch sections 30 of the electrode. An electrode unit 26 is divided into four alignment regions having substantially the same area by the trunk sections 28. The four arrows in the electrode units 26 represent tilting directions of liquid crystal molecules (directions in which a CF substrate 4 side of the liquid crystal molecules is tilted). When a voltage is applied, liquid crystal molecules are tilted substantially in parallel with the branch sections 30 and toward the trunk sections 28.

A width Wg of an electrode unit 26 in the direction in parallel with the gate bus lines 12 is 77 μm, for example. A width Wd of the same in the direction in parallel with the drain bus lines 14 is 35 μm, for example. The trunk section 28 is at an angle of 45 deg. to the branch section 30, for example. A width d1 of a slit 34 is 7 μm for example, and a width d2 of a space 32 is 3 μm which is smaller than the width d1 (d1>d2).

A pixel electrode 16 is formed with a contact region 38 having no space 32 formed therein in the vicinity of the respective source electrode 24. The pixel electrode 16 is also formed with a contact region 39 having no space 32 formed therein in the vicinity of the respective storage capacitor electrode 20. The pixel electrode 16 is electrically connected to the source electrode 24 through a contact hole (not shown) formed in the contact region 38 and is electrically connected to the storage capacitor electrode 20 through a contact hole (not shown) formed in the contact region 39. Some of the branch sections 30 in the vicinity of the contact regions 38 and 39 are formed shorter than other branch sections 30 such that there will be no closed space surrounded by the electrodes.

Figure 4:
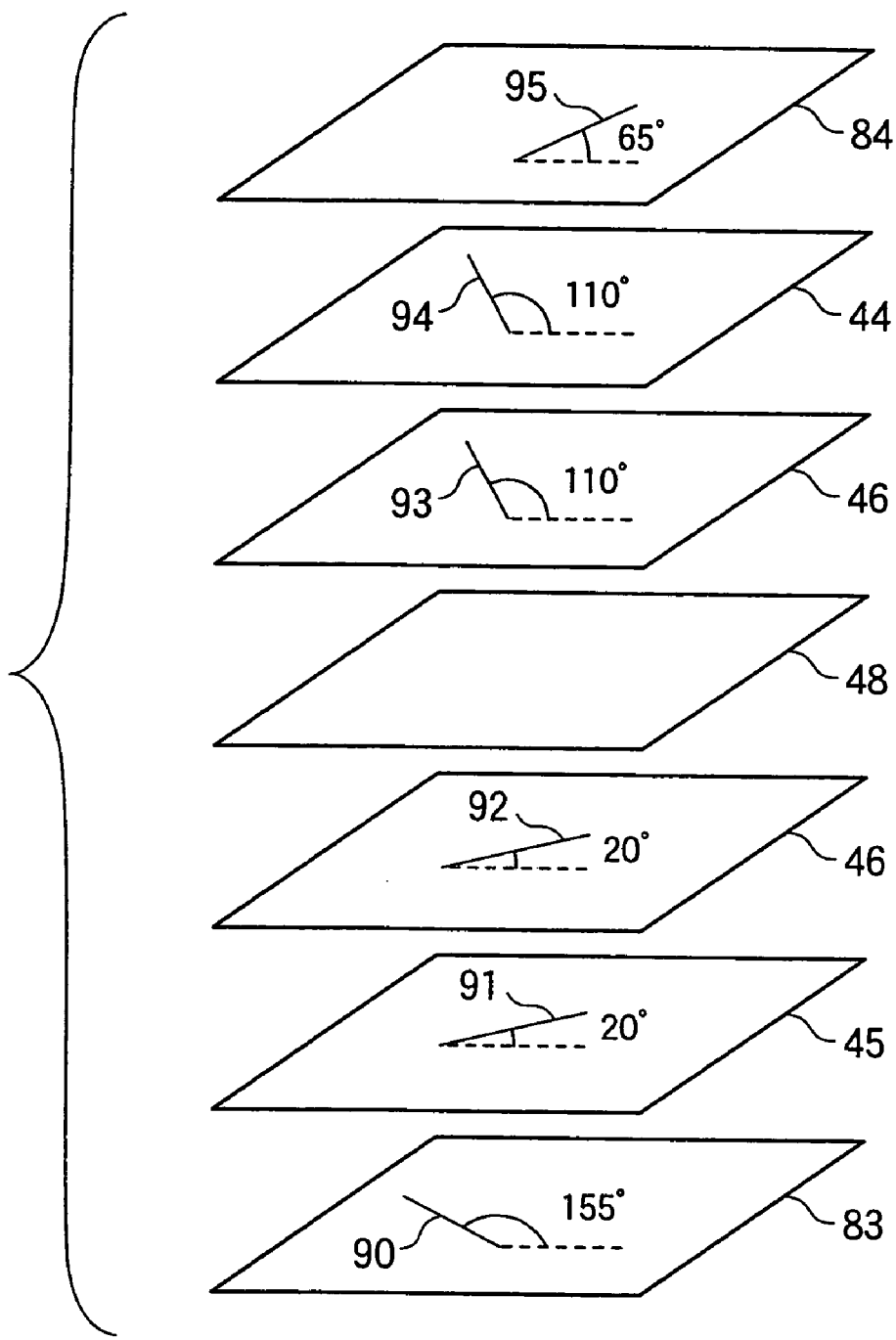
FIG. 4 shows a configuration of the liquid crystal display according to Embodiment 1-1 in the first mode for carrying out the invention.

FIG. 4 shows an arrangement of the polarizers of the liquid crystal display of the present embodiment. As shown in FIG. 4, the polarizers 83 and 84 are provided in a crossed Nicols relationship with each other on both sides of a liquid crystal layer 48. A ¼ wave plate 45 is interposed between the liquid crystal layer 48 and the polarizer 83. A ¼ wave plate 44 is interposed between the liquid crystal layer 48 and the polarizer 84. Layers having a negative phase difference such as TAC films 46 may be provided between the liquid crystal layer 48 and the ¼ wave plates 45 and 44 to improve viewing angle characteristics. The upper side of the figure is a viewer's side and the lower side of the figure is a light source side.

An optical axis (phase lag axis) 91 of the ¼ wave plate 45 is at an angle of about 45 deg. to an absorbing axis 90 of the polarizer 83. That is, when light emitted by the light source passes through the polarizer 83 and then the ¼ wave plate 45, the light becomes circularly polarized light. An optical axis 94 of the ¼ wave plate 44 is at an angle of about 45 deg. to an absorbing axis 95 of the polarizer 84. The optical axes 94 and 91 of the ¼ wave plates 44 and 45 respectively are substantially orthogonal to each other. In order to achieve a symmetric viewing angle and to optimize viewing angle characteristics when the display screen is viewed downward, upward, rightward and leftward, the polarizers 83 and 84 and the ¼ wave plates 44 and 45 are provided as described below.

The absorbing axis 90 of the polarizer 83 is in a direction at a counterclockwise angle of 155 deg. relative to the right side of the display screen (the direction of 3 o'clock) that is to serve as a reference. The optical axis 91 of the ¼ wave plate 45 and an optical axis 92 of the TAC film 46 provided on the light source side of the liquid crystal layer 48 are in a direction at a counterclockwise angle of 20 deg. relative to the right side of the display screen as a reference. An optical axis 93 of the TAC film 46 and the optical axis 94 of the ¼ wave plate 44 provided on the viewer's side of the liquid crystal layer 48 are in a direction at a counterclockwise angle of 110 deg. relative to the right side of the display screen as a reference. The absorbing axis 95 of the polarizer 84 is in a direction at a counterclockwise angle of 65 deg. relative to the right side of the display screen as a reference.

In the present embodiment, a plurality of electrodes units 26 are provided in a pixel region to form a plurality of regions at relatively small intervals, in which regions diagonal fields in different directions are applied to the liquid crystal layer. This increases the tilting angles of the diagonal fields applied to liquid crystal molecules and thereby increases the force of the same to regulate the alignment of liquid crystal molecules. This makes it possible to tilt liquid crystal molecules in desired directions without forming protrusions on the CF substrate 4.

Figure 70:
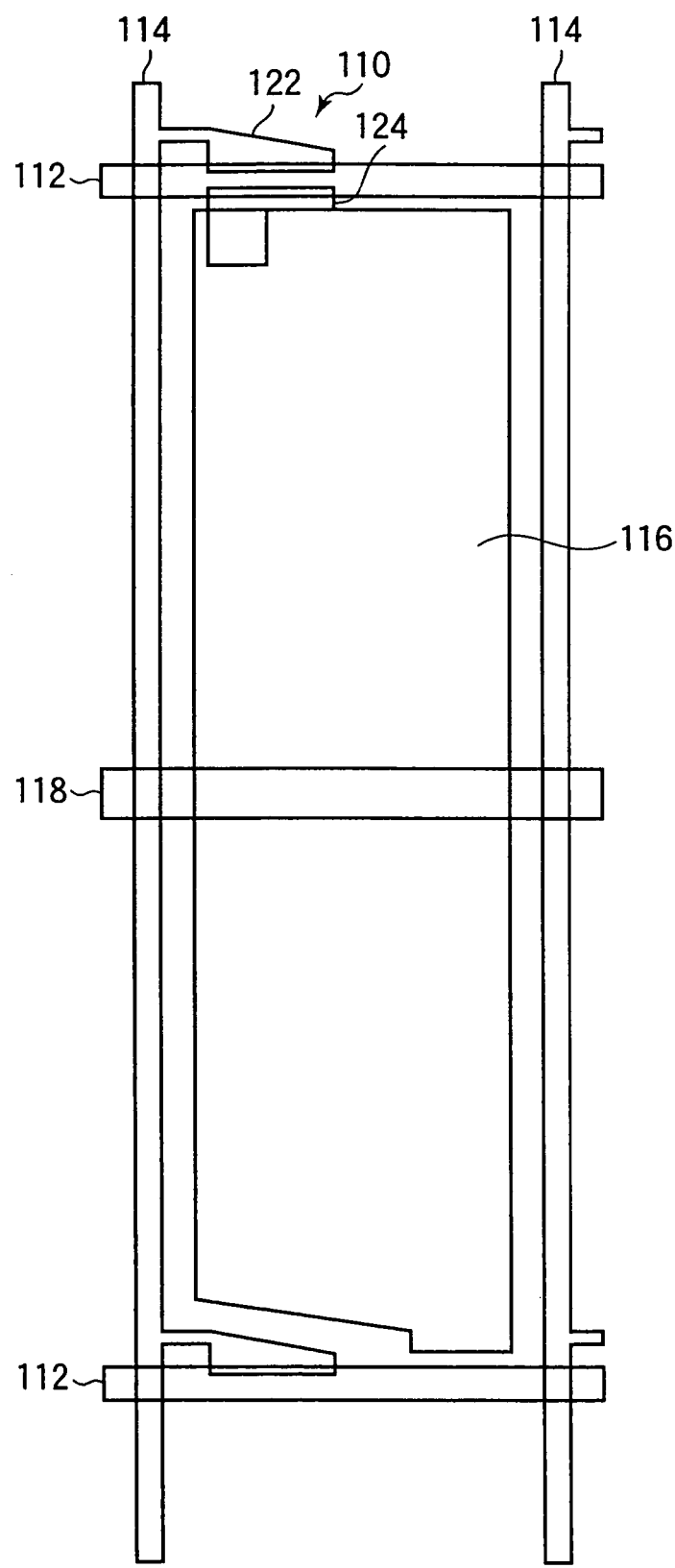
FIG. 70 shows a configuration of one pixel of a substrate for a liquid crystal display according to the related art.
Figure 71:
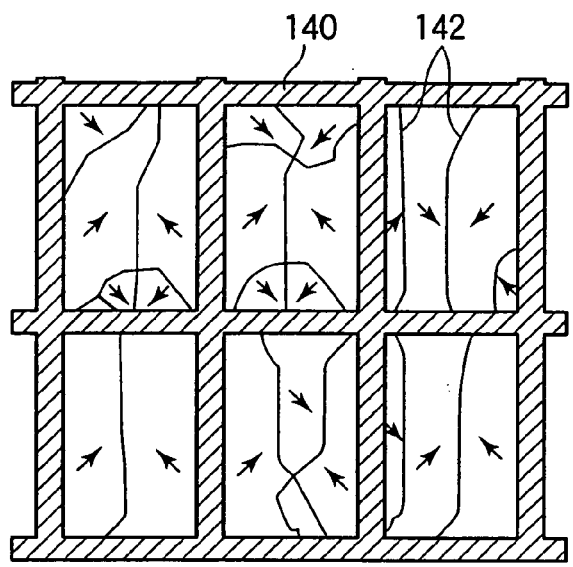
FIG. 71 shows a state of alignment of liquid crystal molecules and a state of display of a liquid crystal display according to the related art.
Figure 72A:
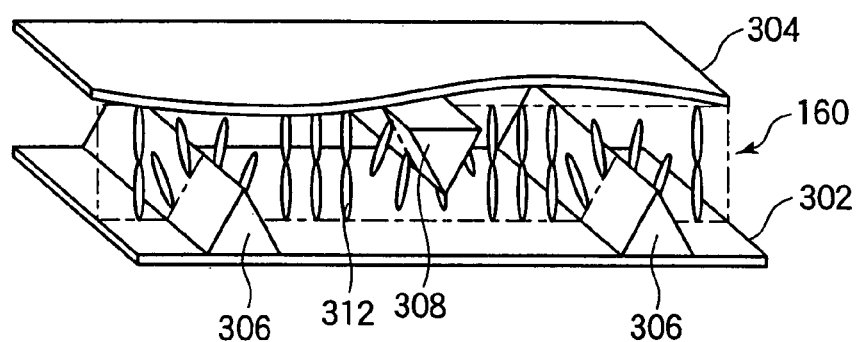
FIGS. 72A and 72B are sectional views showing a schematic configuration of an MVA LCD.
Figure 72B:
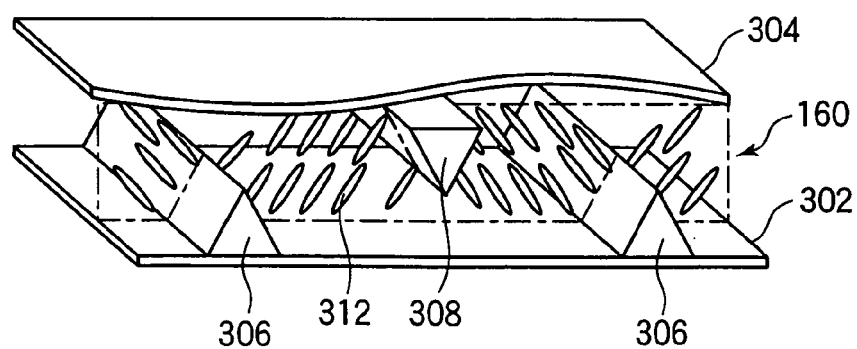
Figure 73:
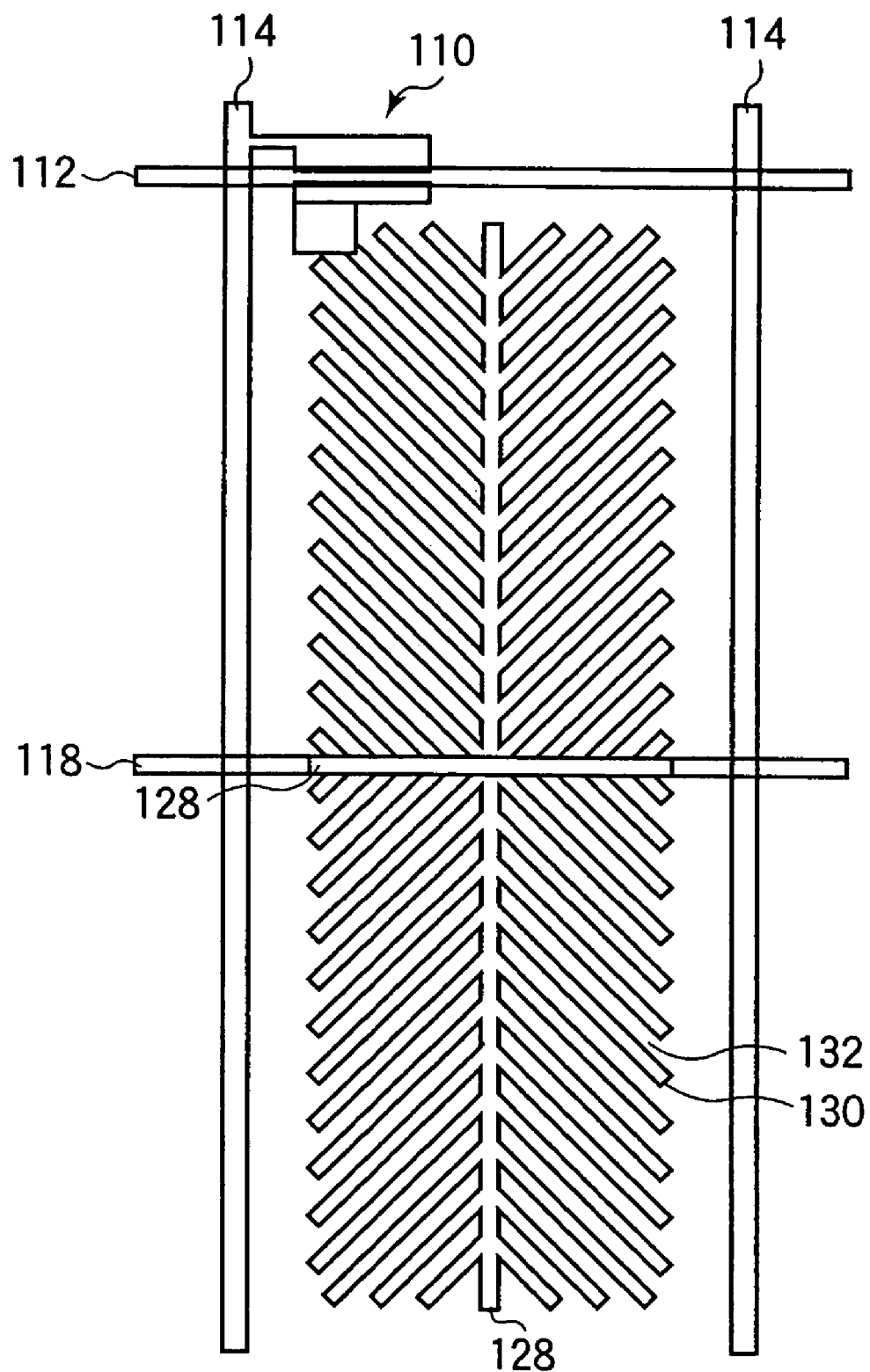
FIG. 73 shows a schematic configuration of a TFT substrate of an MVA LCD.

In the present embodiment, the ¼ wave plates 44 and 45 and the polarizers 83 and 84 are provided in the that order outside the substrates 2 and 4, respectively. This makes it possible to achieve optical transmittance of about 7% in displaying white while optical transmittance is only about 4% when only the polarizers 83 and 84 in a crossed Nicols configuration are used. Thus, the optical transmittance is about 1.5 times that of an MVA LCD (transmittance of about 5%) according to the related art having protrusions formed on the liquid crystal display substrate as shown in FIG. 70. It is therefore possible to provide a liquid crystal display that displays with light luminance.

Embodiment 1-2

Figure 5:
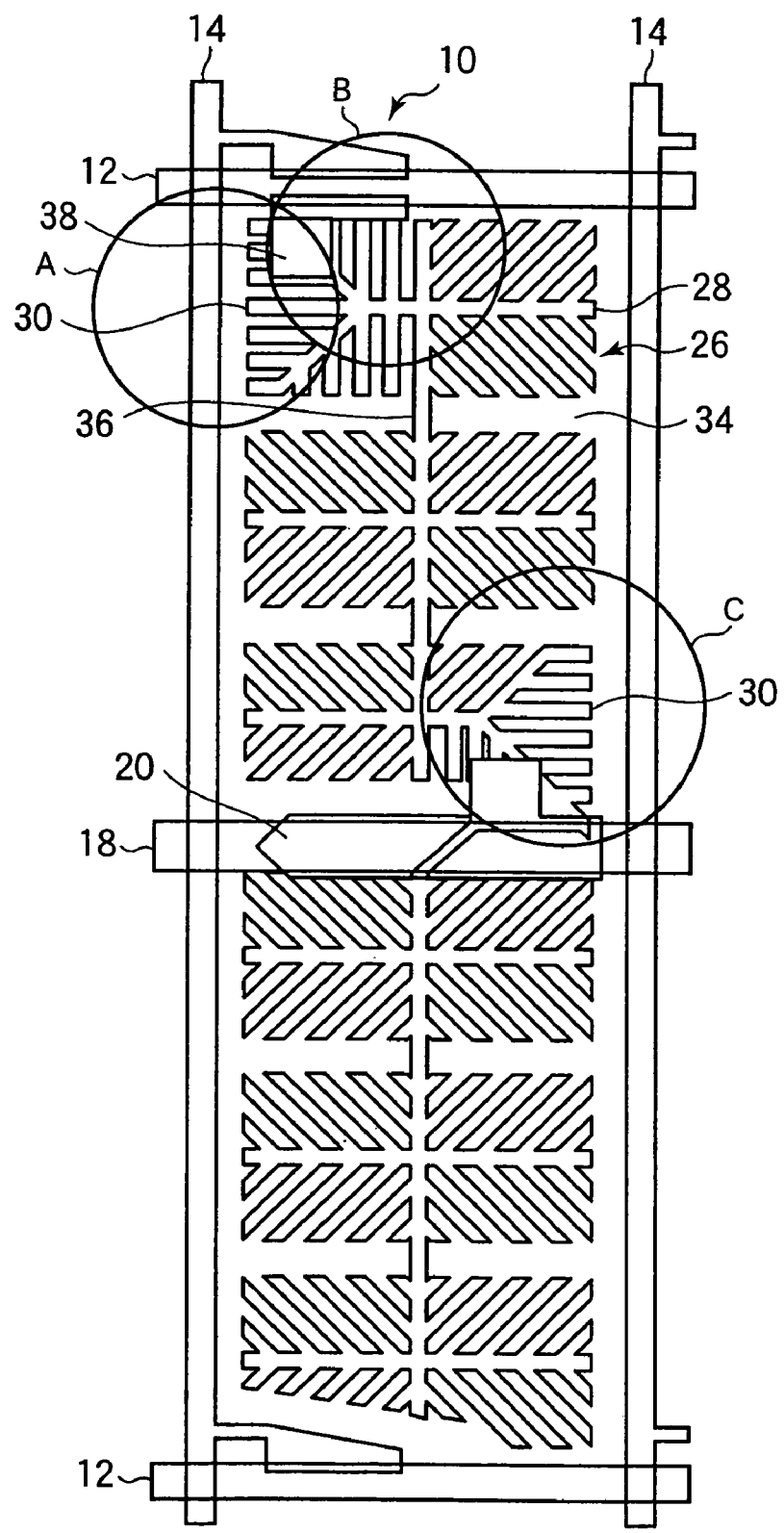
FIG. 5 shows a configuration of a substrate for a liquid crystal display according to Embodiment 1-2 in the first mode for carrying out the invention.

A substrate for a liquid crystal display according to Embodiment 1-2 in the present mode for carrying out the invention will now be described with reference to FIGS. 5 to 7. FIG. 5 shows a configuration of one pixel of the substrate for a liquid crystal display of the present embodiment. In the configuration of the TFT substrate 2 shown in FIG. 3, a predetermined gap is defined between the source electrodes 24 of the TFTs 10 and the pixel electrodes 16. The alignment of liquid crystal molecules can be improper in such a gap, which can result in a dark line. In a pixel electrode 16 of a TFT substrate 2 of the present embodiment, branch sections 30 are formed without limiting them to an angle of 45 deg. to trunk sections 30 in order to prevent the generation of a dark line. As shown in FIG. 5, branch sections 30 are formed substantially perpendicularly to a drain bus line 14 in a region A in the vicinity of a source electrode 24. Branch sections 30 are formed substantially perpendicularly to a gate bus line 12 in a region B. Branch sections 30 are formed substantially perpendicularly to a drain bus line 14 in a region C in the vicinity of a storage capacitor electrode 20.

Figure 6:
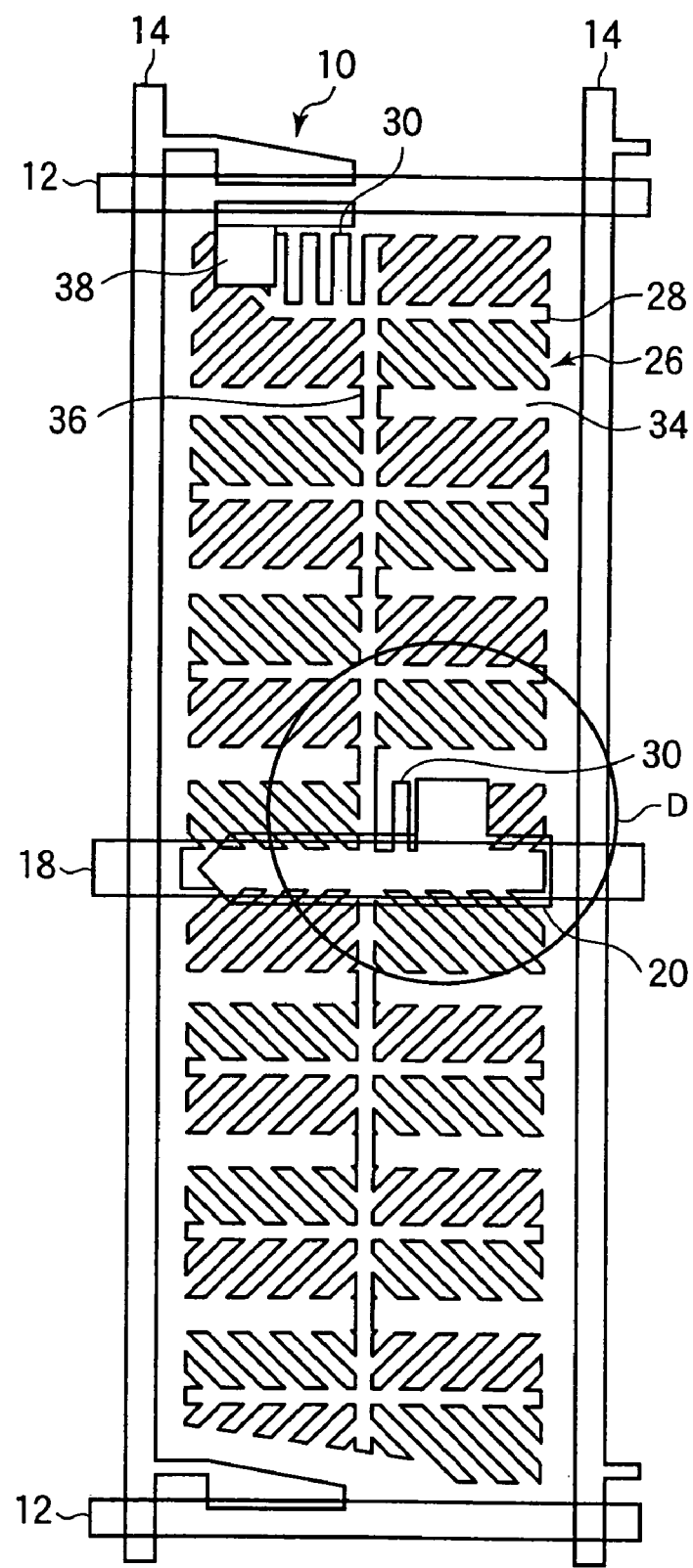
FIG. 6 shows a modification of the configuration of a substrate for a liquid crystal display according to Embodiment 1-2 in the first mode for carrying out the invention.

FIG. 6 shows a modification of the configuration of the substrate for a liquid crystal display of the present embodiment. As shown in FIG. 6, in a region D in the vicinity of a storage capacitor electrode 20, branch sections 30 are formed substantially perpendicularly to a storage capacitor bus line 18 or substantially in parallel with the projecting direction of connection electrodes that are formed such that they project from the storage capacitor electrode 20.

Figure 7:
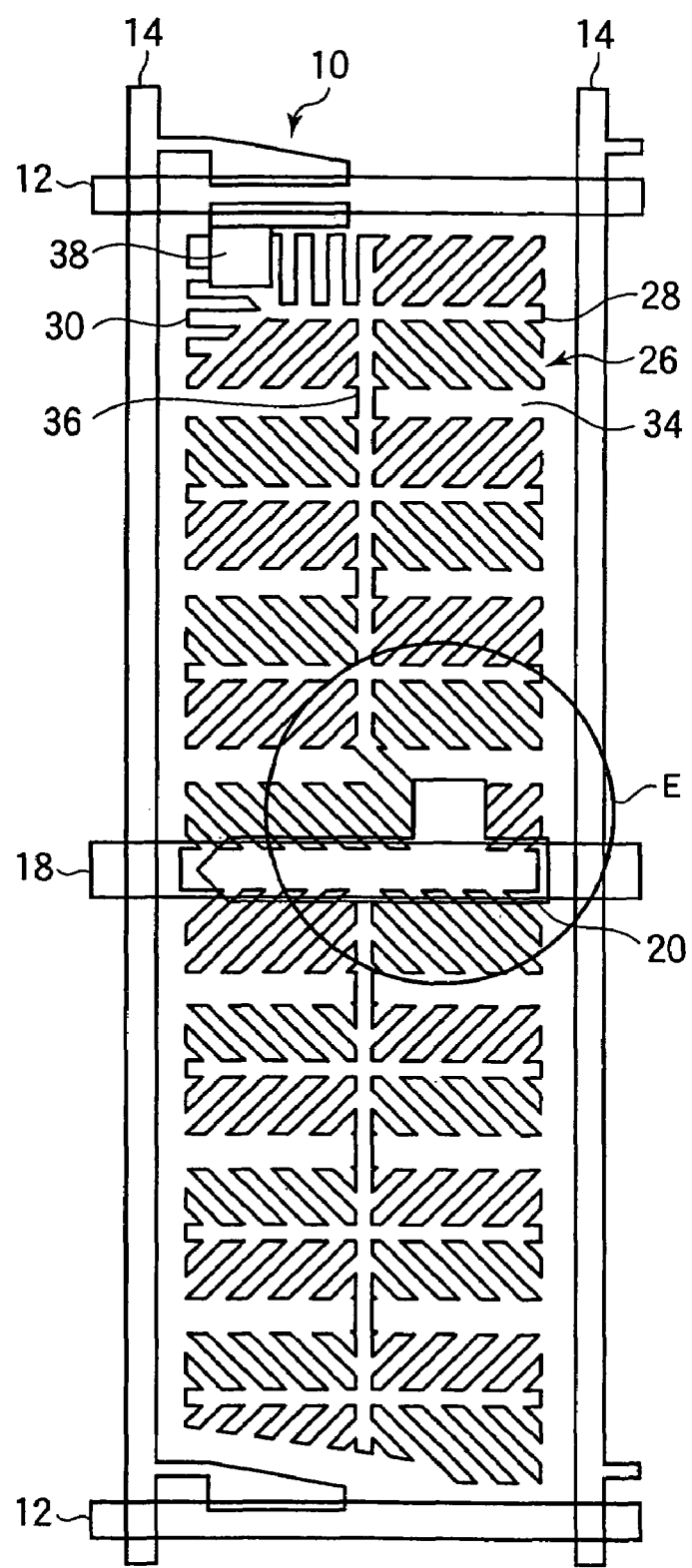
FIG. 7 shows another modification of the configuration of a substrate for a liquid crystal display according to Embodiment 1-2 in the first mode for carrying out the invention.

FIG. 7 shows another modification of the configuration of the substrate for a liquid crystal display of the present embodiment. As shown in FIG. 7, a trunk section 28 is formed diagonally to a gate bus line 12 and a drain bus line 14 and is located on an end of a connection electrode 36 in a region E in the vicinity of a storage capacitor electrode 20. As a result, the trunk section 28 extends substantially in parallel with branch section 30 to suppress improper alignment of liquid crystal molecules.

Embodiment 1-3

Figure 8:
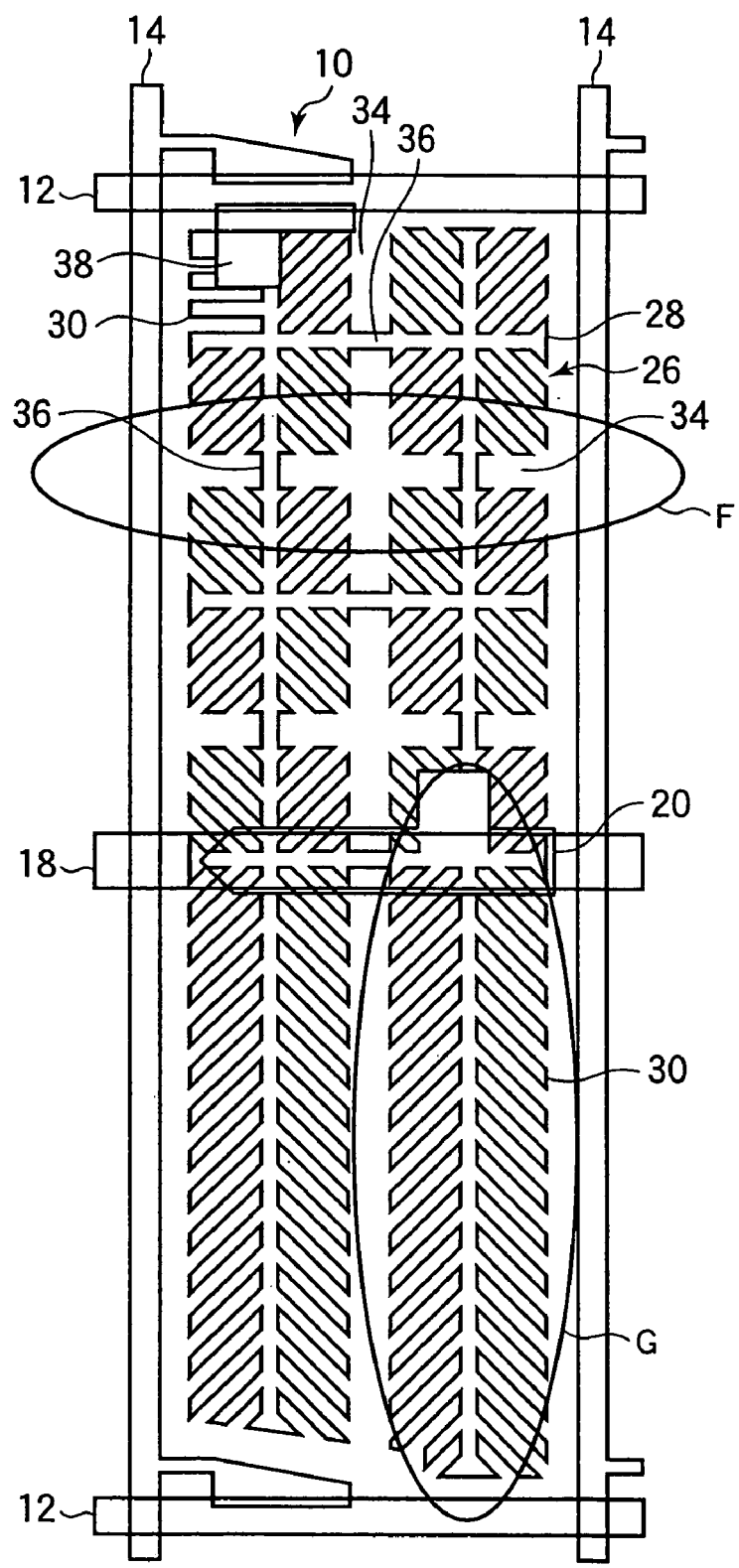
FIG. 8 shows a configuration of a substrate for a liquid crystal display according to Embodiment 1-3 in the first mode for carrying out the invention.

A substrate for a liquid crystal display according to Embodiment 1-3 in the present mode for carrying out the invention will now be described with reference to FIG. 8. FIG. 8 shows a configuration of one pixel of a substrate for a liquid crystal display of the present embodiment. As shown in FIG. 8, slits 34 extending substantially in parallel with drain bus lines 14 are formed in the pixel region. In the upper half of the pixel region in the figure, slits 34 extending substantially in parallel with gate bus lines 12 are formed in a region F. On the contrary, no such slit extending substantially in parallel with the gate bus lines 12 is formed in a region G in the lower half of the pixel region in the figure. Thus, a greater number of electrode units 26 are formed in the upper half of the pixel region compared to the lower half of the pixel region.

As a result, in the lower half of the pixel region, liquid crystal molecules on trunk sections 28 extending substantially in parallel with the drain bus lines 14 move inadequately, which results in a long response time. On the contrary, in the upper half of the pixel region, since liquid crystal molecules can be aligned in regions that are more minutely divided, the response time of the liquid crystal molecules can be reduced to achieve good display characteristics.

Embodiment 1-4

Figure 9:
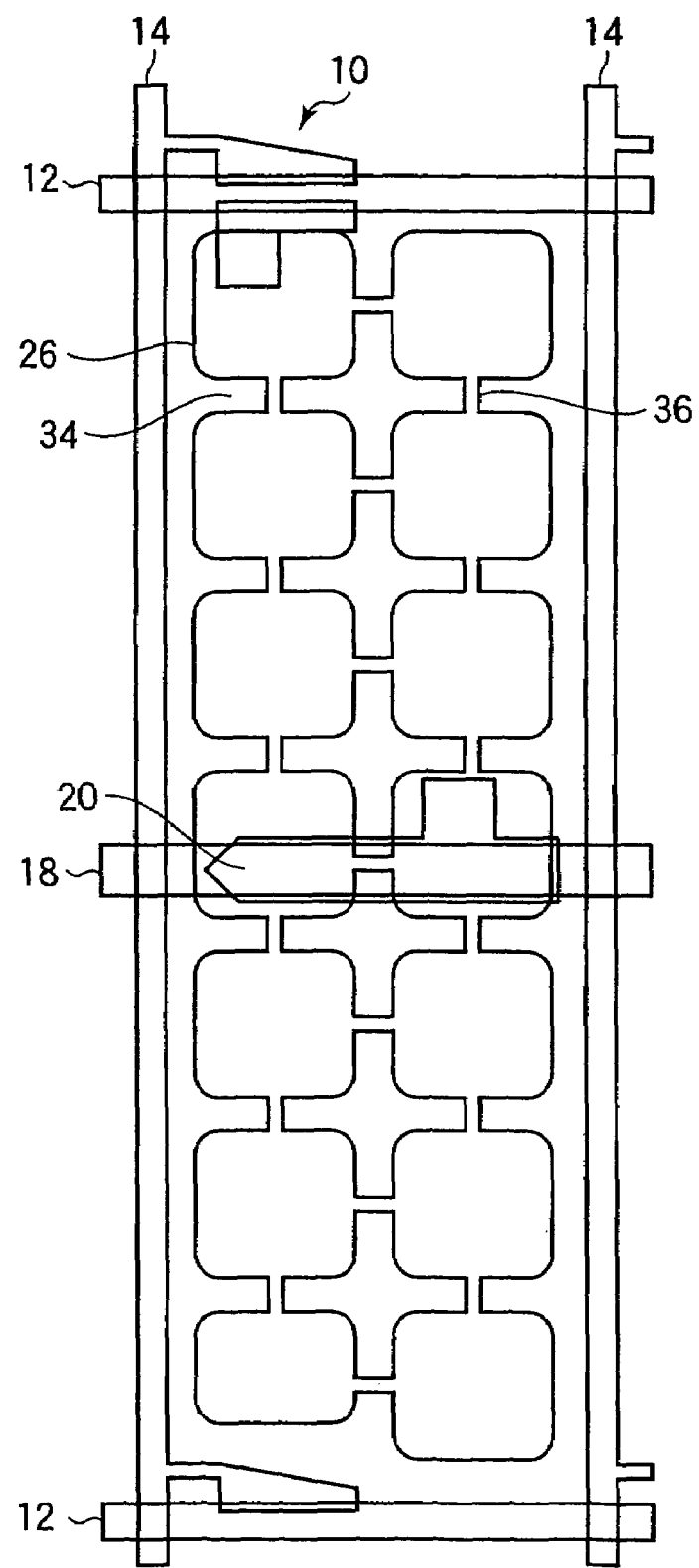
FIG. 9 shows a configuration of a substrate for a liquid crystal display according to Embodiment 1-4 in the first mode for carrying out the invention.

A substrate for a liquid crystal display according to Embodiment 1-4 in the present mode for carrying out the invention will now be described with reference to FIG. 9. FIG. 9 shows a configuration of one pixel of a substrate for a liquid crystal display of the present embodiment. As shown in FIG. 9, a pixel electrode 16 has a plurality of electrode units 26, slits 34 formed between the electrode units 26 and connection electrodes 36 for connecting the plurality of electrode units 26 with each other. Unlike Embodiments 1-1, 1-2 and 1-3, the electrode units 26 have none of the trunk sections 28, branch sections 30 and spaces 32.

According to the present embodiment, light transmittance that is 10% higher than that achievable in Embodiments 1-2 and 1-3 can be achieved, the response time of liquid crystal molecules is long.

Embodiment 1-5

Figure 10:
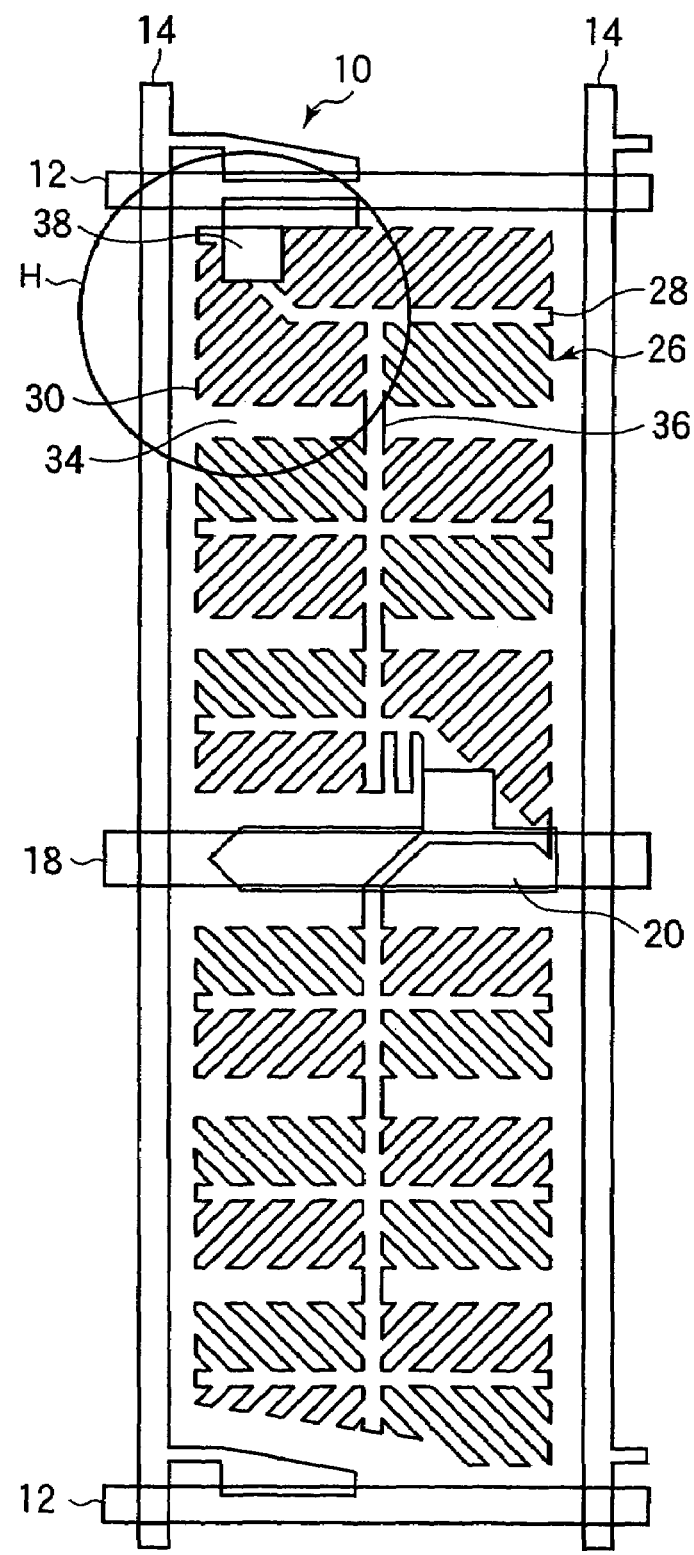
FIG. 10 shows a configuration of a substrate for a liquid crystal display according to Embodiment 1-5 in the first mode for carrying out the invention.

A substrate for a liquid crystal display according to Embodiment 1-5 in the present mode for carrying out the invention will now be described with reference to FIGS. 10 and 11. FIG. 10 shows a configuration of one pixel of a substrate for a liquid crystal display of the present embodiment. As shown in FIG. 10, branch sections 30 extend only in a direction that is diagonal to gate bus lines 12 and drain bus lines 14 in a region H. This makes it possible to align liquid crystal molecules in a preferable manner because there is no region in which an abrupt change occurs in the aligning direction of liquid crystal molecules.

Figure 11:
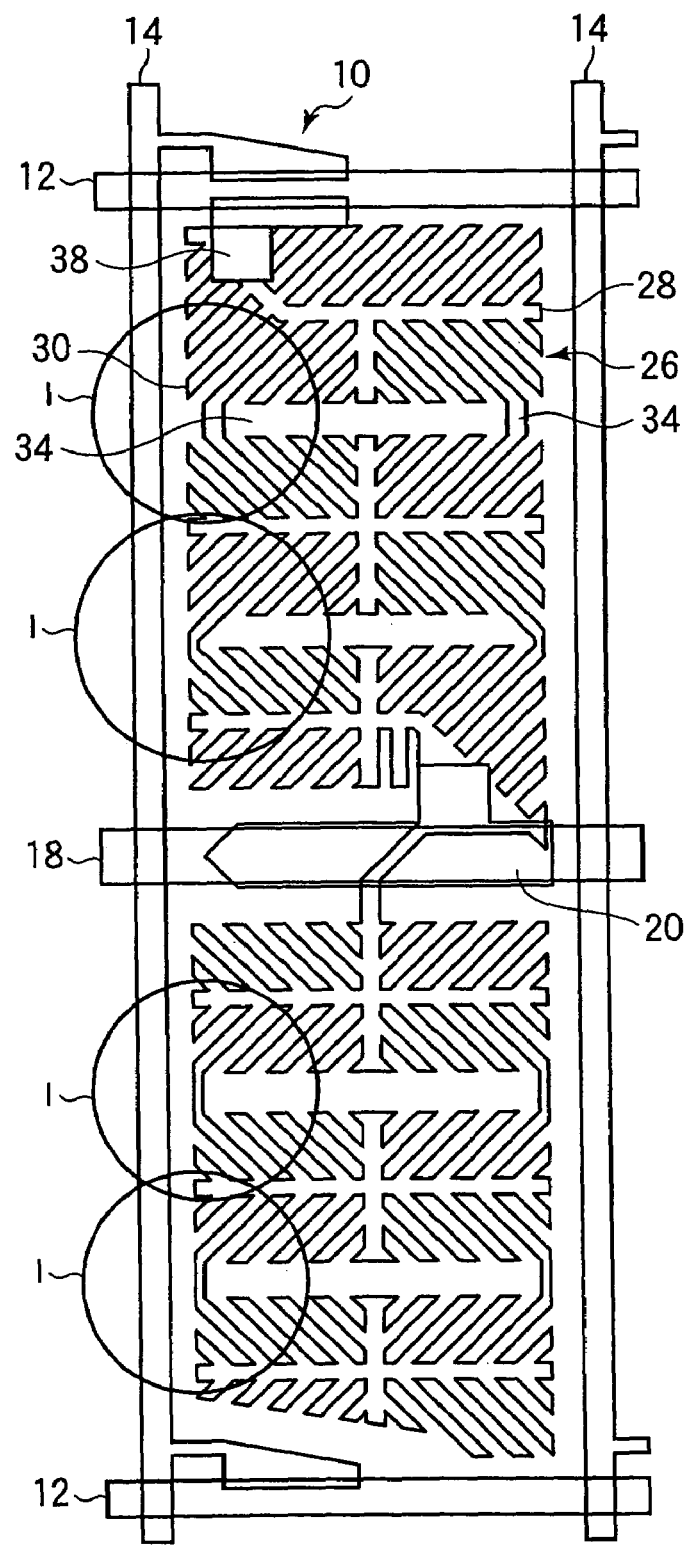
FIG. 11 shows a modification of the configuration of a substrate for a liquid crystal display according to Embodiment 1-5 in the first mode for carrying out the invention.

FIG. 11 shows a modification of the configuration of the substrate for a liquid crystal display of the present embodiment. As shown in FIG. 11, the present modification is different from the substrate for a liquid crystal display shown in FIG. 10 in that connection electrodes 36 are formed at an end (regions I) of the pixel region. When the connection electrodes 36 are formed between central portions of electrode units 26, trunk sections 28 of the plurality of electrode units 26 are connected with the connection electrodes 36, which consequently forms a linear electrode substantially in parallel with drain bus lines 14. This substantially increases the length of the trunk sections 28 and prevents a singular point from being formed in a fixed position, which can result in coarseness in display. On the contrary, the present modification makes it possible to fix the position of a singular point, thereby suppressing coarseness in display.

Embodiment 1-6

Figure 12:
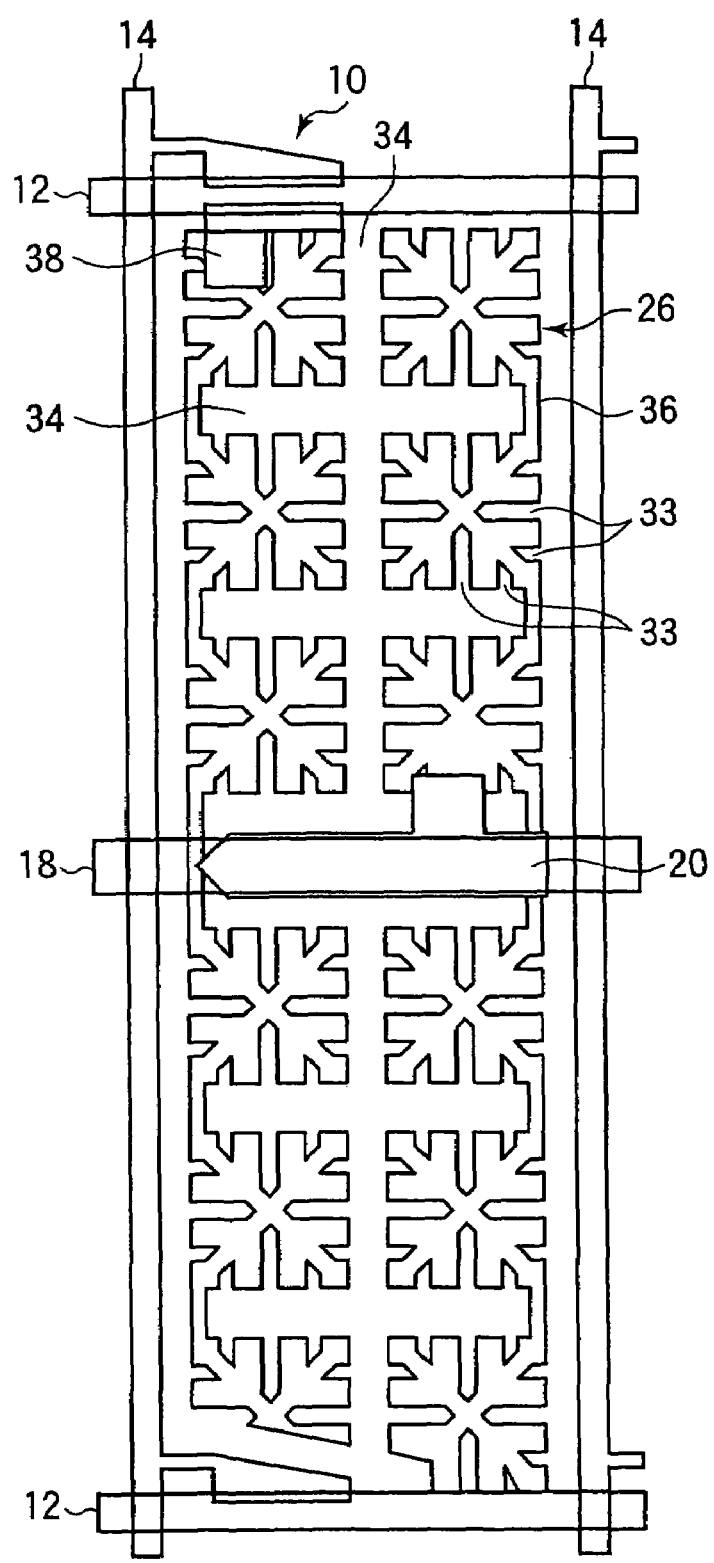
FIG. 12 shows a configuration of a substrate for a liquid crystal display according to Embodiment 1-6 in the first mode for carrying out the invention.

A substrate for a liquid crystal display according to Embodiment 1-6 in the present mode for carrying out the invention will now be described with reference to FIGS. 12 to 15. FIG. 12 shows a configuration of one pixel of a substrate for a liquid crystal display of the present embodiment. As shown in FIG. 12, in the present embodiment, electrode units 26 similar to those in Embodiment 1-4 shown in FIG. 9 are formed with a plurality of spaces 33 that extend from peripheral sections of the electrode units 26 substantially in parallel with or perpendicularly to gate bus lines 12 and drain bus lines 14. This provides a configuration in which the electrode units 26 consisting of trunk sections 28, branch sections 30 and the spaces 33 have a simplified pattern. In the present embodiment, since the spaces 33 extending substantially perpendicularly to the gate bus lines 12 and the drain bus lines 14 are formed at the periphery of the pixel region, stable alignment of liquid crystal molecules can be achieved.

Figure 13:
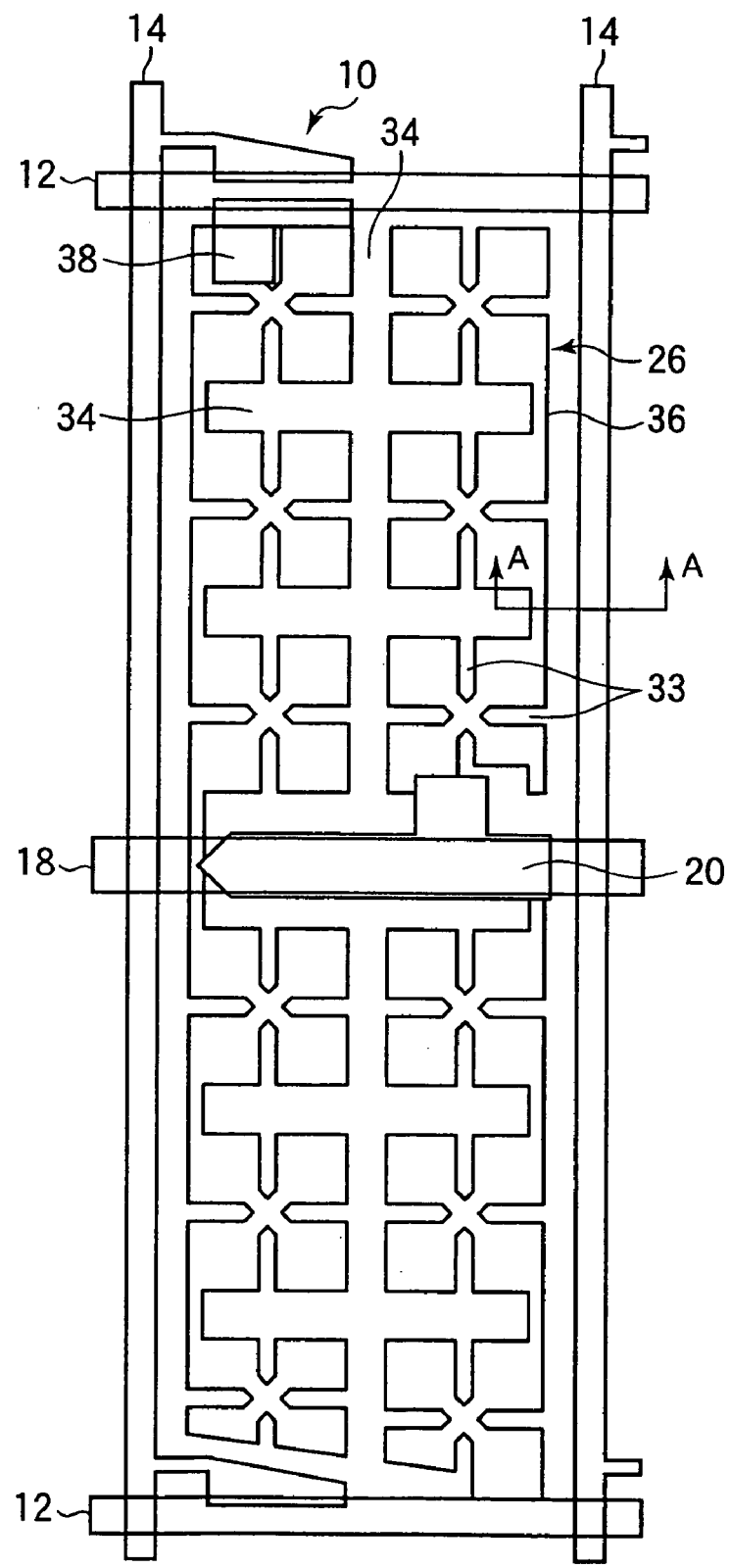
FIG. 13 shows a modification of the configuration of a substrate for a liquid crystal display according to Embodiment 1-6 in the first mode for carrying out the invention.
Figure 14:
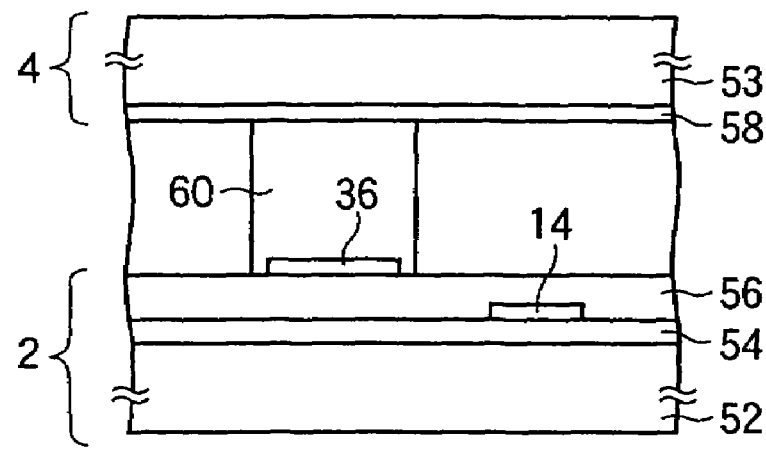
FIG. 14 is a sectional view showing the modification of the configuration of a substrate for a liquid crystal display according to Embodiment 1-6 in the first mode for carrying out the invention.

FIG. 13 shows a modification of the configuration of the substrate for a liquid crystal display of the present embodiment. As shown in FIG. 13, electrode units 26 are formed in a still simpler pattern in the present modification. FIG. 14 shows a sectional configuration of the liquid crystal display taken along the line A-A in FIG. 13. As shown in FIG. 14, for example, an insulation film 54 constituted by a silicon nitride film (SiN film) is formed on an entire top surface of a glass substrate 52 that constitutes a TFT substrate 2. A drain bus line 14 is formed on the insulation film 54. For example, a protective film 56 constituted by a SiN film is formed on an entire top surface of the drain bus line 14. A connection electrode 36 located at the periphery of the pixel region is formed on the protective film 56. ACF substrate 4 provided in a face-to-face relationship with the TFT substrate 2 has a glass substrate 53 and a common electrode 58 formed on the glass substrate 53. A cell gap is maintained between the TFT substrate 2 and the CF substrate 4 by a columnar spacer 60 formed of resin on the connection electrodes 36 of the TFT substrate 2.

In the present modification, since an electric field from the connection electrode 36 is blocked by the columnar spacer 60, disclination occurs in the vicinity of the columnar spacer 60 without fail. This makes it possible to achieve stable alignment of liquid crystal molecules and to achieve good display characteristics. A liquid crystal display according to the modification has transmittance that is about 40% higher than the transmittance of an MVA LCD according to the related art. Further, since the electrode unit 26 is formed in a simple pattern, the shape of the electrode unit 26 will not vary from pixel to pixel when it is patterned. This makes it possible to achieve good display characteristics without irregularities in luminance.

Figure 15:
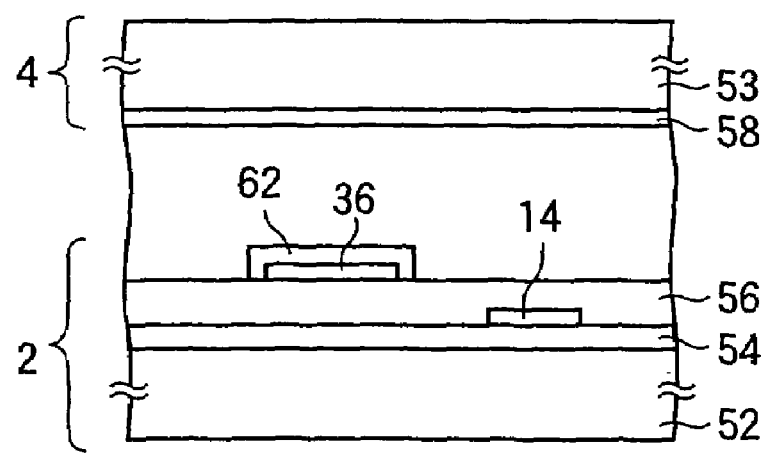
FIG. 15 is a sectional view showing another modification of the configuration of a substrate for a liquid crystal display according to Embodiment 1-6 in the first mode for carrying out the invention.

FIG. 15 shows another modification of the configuration of the substrate for a liquid crystal display of the present embodiment, FIG. 15 showing a section corresponding to that in FIG. 14. As shown in FIG. 15, for example, a dielectric body 62 constituted by an SiN film is formed on a connection electrode 36. The present modification provides the same advantages as those of the modification shown in FIG. 14 because an electric field originating from the connection electrode 36 is blocked by the dielectric body 62.

Figure 16:
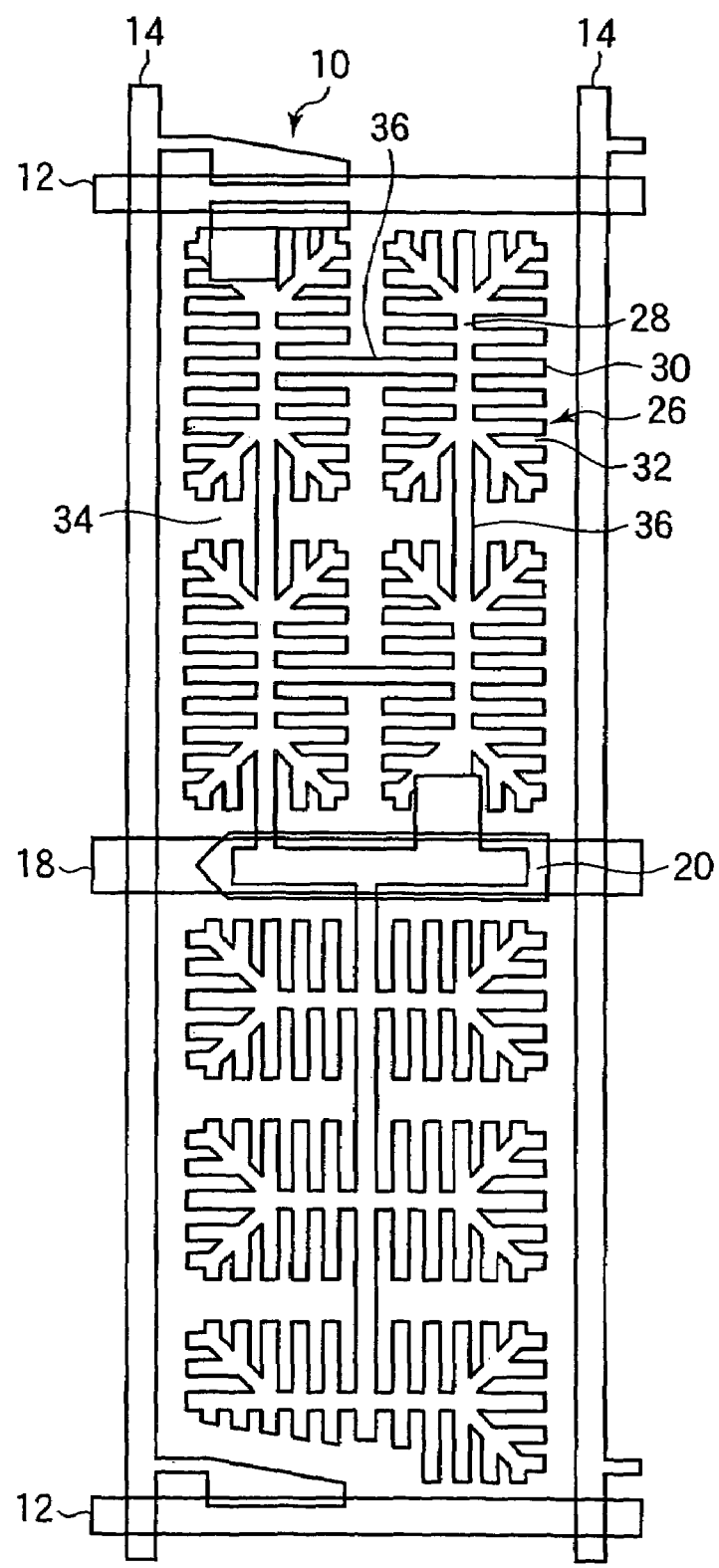
FIG. 16 shows an example of a configuration of a substrate for a liquid crystal display in the first mode for carrying out the invention.

A substrate for a liquid crystal display in the present mode for carrying out the invention is not limited to the configurations described in Embodiments 1-1 to 1-5. FIG. 16 shows an example of a configuration of a substrate for a liquid crystal display in the present mode for carrying out the invention As shown in FIG. 16, electrode units 26 that are longer in the extending direction of drain bus lines 14 are formed in an upper half of a pixel region, and electrode units 26 that are longer in the extending direction of gate bus lines 12 are formed in a lower half of the pixel region.

Figure 17:
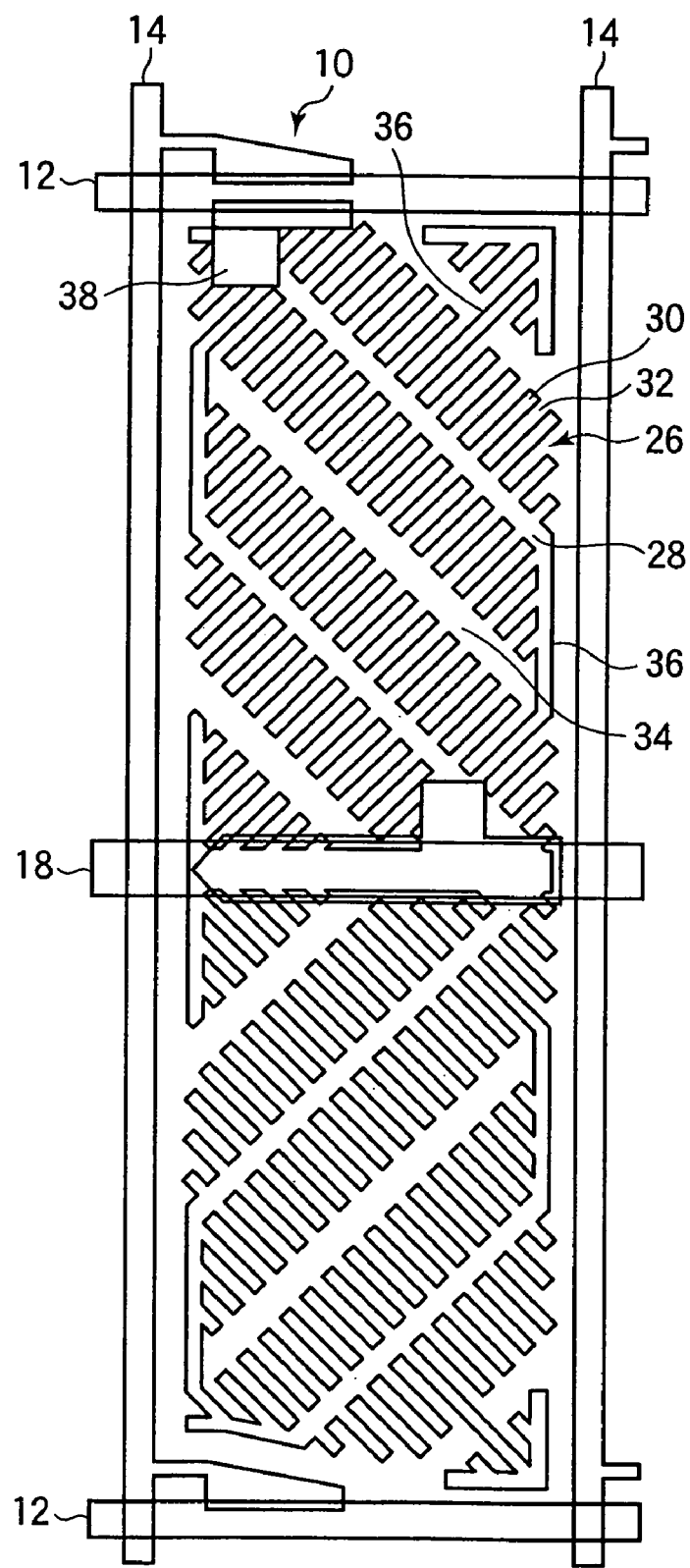
FIG. 17 shows an example of a configuration of a substrate for a liquid crystal display in the first mode for carrying out the invention.

FIG. 17 shows another example of a configuration of a substrate for a liquid crystal display in the present mode for carrying out the invention. As shown in FIG. 17, electrode units 26 extending diagonally to bus lines 12 and 14 are formed in a pixel region. Slits 34 are provided at intervals that are smaller than those in an MVA LCD according to the related art.

Figure 18:
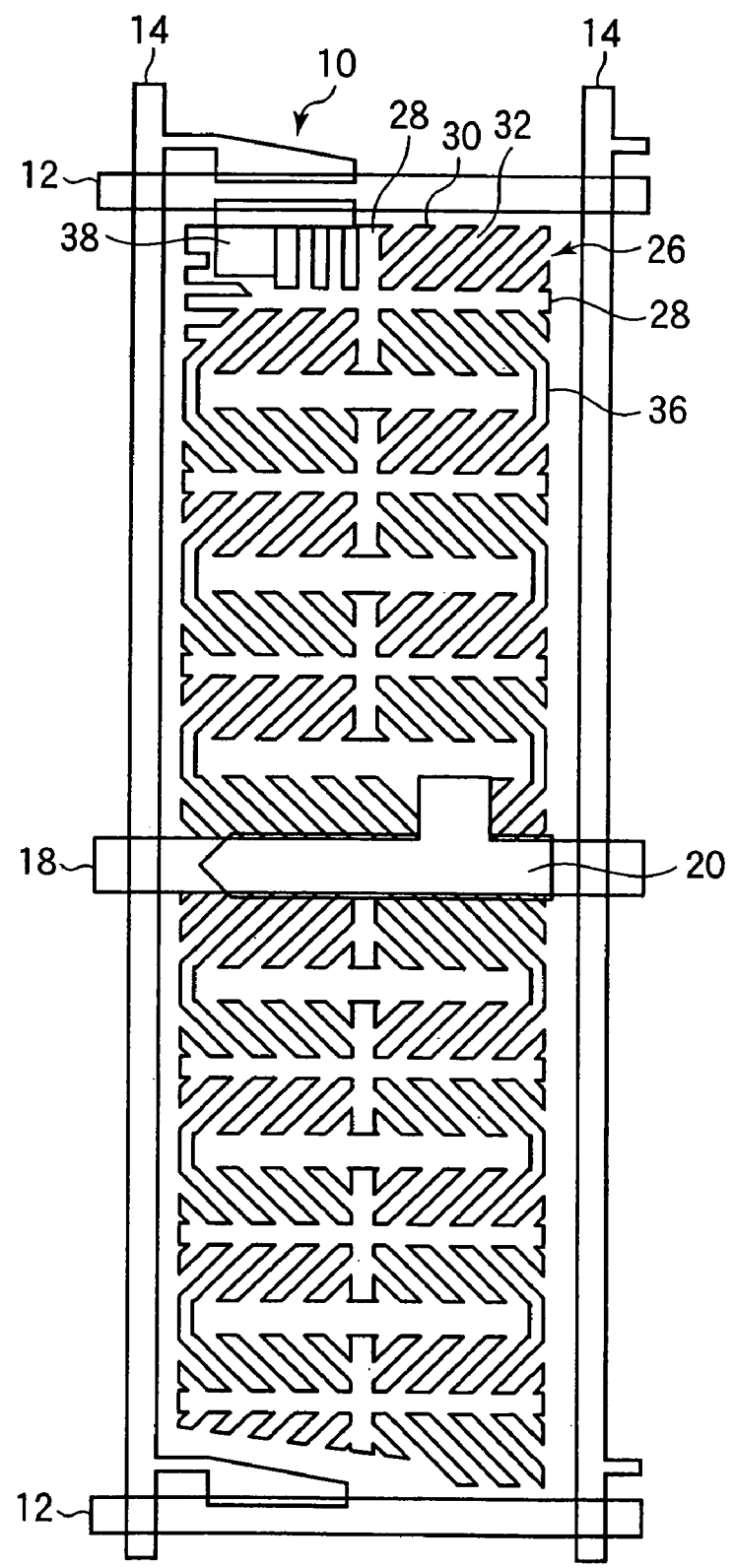
FIG. 18 shows an example of a configuration of a substrate for a liquid crystal display in the first mode for carrying out the invention.

FIG. 18 shows still another example of a configuration of a substrate for a liquid crystal display in the present mode for carrying out the invention. As shown in FIG. 18, the shape of electrode units 26 is similar to that in the substrate for a liquid crystal display shown in FIG. 6. While connection electrodes 36 are formed in the middle of a pixel region in the substrate for a liquid crystal display shown in FIG. 6, connection electrodes 36 in the present example are formed at the periphery of a pixel region.

In the present mode for carrying out the invention, it is possible to provide a substrate for a liquid crystal display having good display quality and a liquid crystal display having the same without increasing manufacturing steps.

(Second Mode for Carrying Out the Invention)

A description will now be made on a substrate for a liquid crystal display and a liquid crystal display having the same in a second mode for carrying out the invention. In the present mode for carrying out the invention, liquid crystal molecules are tilted in a plurality of desired directions when a voltage is applied thereto while satisfying three conditions that (1) no protrusion made of resin is provided; (2) no alignment regulating force is applied to an alignment film by rubbing the same (i.e., liquid crystal molecules are aligned in a direction perpendicular to a substrate surface); and (3) the aligning direction of liquid crystal molecules is regulated only by changing the pattern in which pixel electrodes 16 on a TFT substrate 2 are formed.

A substrate for a liquid crystal display in the present mode for carrying out the invention has a plurality of electrode units 26 in a pixel region, the units being smaller than the pixel region. An electrode unit 26 has trunk sections 28 extending in the form of a cross and branch sections 30 that branch from the trunk sections 28 and extend toward the outside of the electrode unit 26.

When the size of the electrode units 26 is large, the trunk sections 28 are undesirably long. This makes it difficult to regulate the aligning direction of liquid crystal molecules above the trunk sections 28, which increases the possibility of an alignment defect. When the size of the electrode units 26 is small, the force of the branch sections 30 to regulate the alignment of liquid crystal molecules becomes small. Further, since slits 34 provided to arrange a plurality of electrode units 26 occupy a greater area in a pixel region, display luminance is reduced. It is therefore necessary to form the electrode units 26 in an appropriate size. Specifically, they are to be formed such that the maximum length of the branch sections 30 is 25 μm or less.

The present mode for carrying out the invention provides the following advantages.

(1) Manufacturing processes can be reduced because there is no need for providing alignment regulating structures such as protrusions on a CF substrate 4.

(2) The tilting direction of liquid crystal molecules is regulated only by the pattern of the pixel electrodes 16 formed on a TFT substrate 2. Since the pixel electrodes 16 can be formed through a process similar to a process for forming the same according to the related art, there is no increase in manufacturing processes.

(3) Alignment films on the substrates 2 and 4 can be formed only by applying vertical alignment films on the same, and there is no need for processes for providing an alignment regulating force such as rubbing with cloth and optical alignment.

Since there is no reduction in yield of manufacture attributable to an increase in manufacturing processes as described above, yield of manufacture can be consequently improved.

In the present mode for carrying out the invention, the following advantages can be achieved by forming a pixel electrode 16 with a plurality of relatively small electrode units 26.

(4) Since the tilting direction of liquid crystal molecules is regulated by branch sections 30 extending in four direction with one electrode unit 26, the alignment of liquid crystal molecules can be regulated by a force greater than that provided by configurations according to the related art, which makes reduces the possibility of irregularities in alignment. Since a plurality of electrode units 26 are provided, the influence of an alignment defect can be reduced.

(5) Since the length of trunk sections 28 to serve as boundaries between alignment regions is small, a stronger alignment regulating force (orientation) occurs at the trunk sections 28 than in the case of short trunk sections. This makes it possible to prevent the occurrence of a singular point at the trunk sections 28.

(6) Since the electrode units 26 are small, a great alignment regulating force can be generated by an electric field of the pixel electrode 16, which makes it possible to reduce the response time.

Further, a pair of ¼ wave plates 44 and 45 having optical axes orthogonal to each other are provided between a liquid crystal display panel and polarizers 83 and 84 fabricated in the present mode for carrying out the invention. As a result, light can be transmitted even at boundaries between alignment regions when only the polarizers 83 and 84 are provided. Since this prevents the generation of dark lines, it is possible to improve the luminance of the panel as a whole.

Connection electrodes 36 for electrically connecting adjoining electrode units 26 are formed at an end of the pixel region that is adjacent to a drain bus line 14. Since this prevents the trunk sections 28 of the adjoining electrode units 28 from being connected in a straight line, it is possible to prevent an alignment defect from being coupled between the adjoining electrode units 26. High display characteristics can be thus achieved. Substrates for a liquid crystal displays and liquid crystal displays having the same in the present mode for carrying out the invention will be specifically described below with reference to Embodiments 2-1 to 2-3.

Embodiment 2-1

Figure 19:
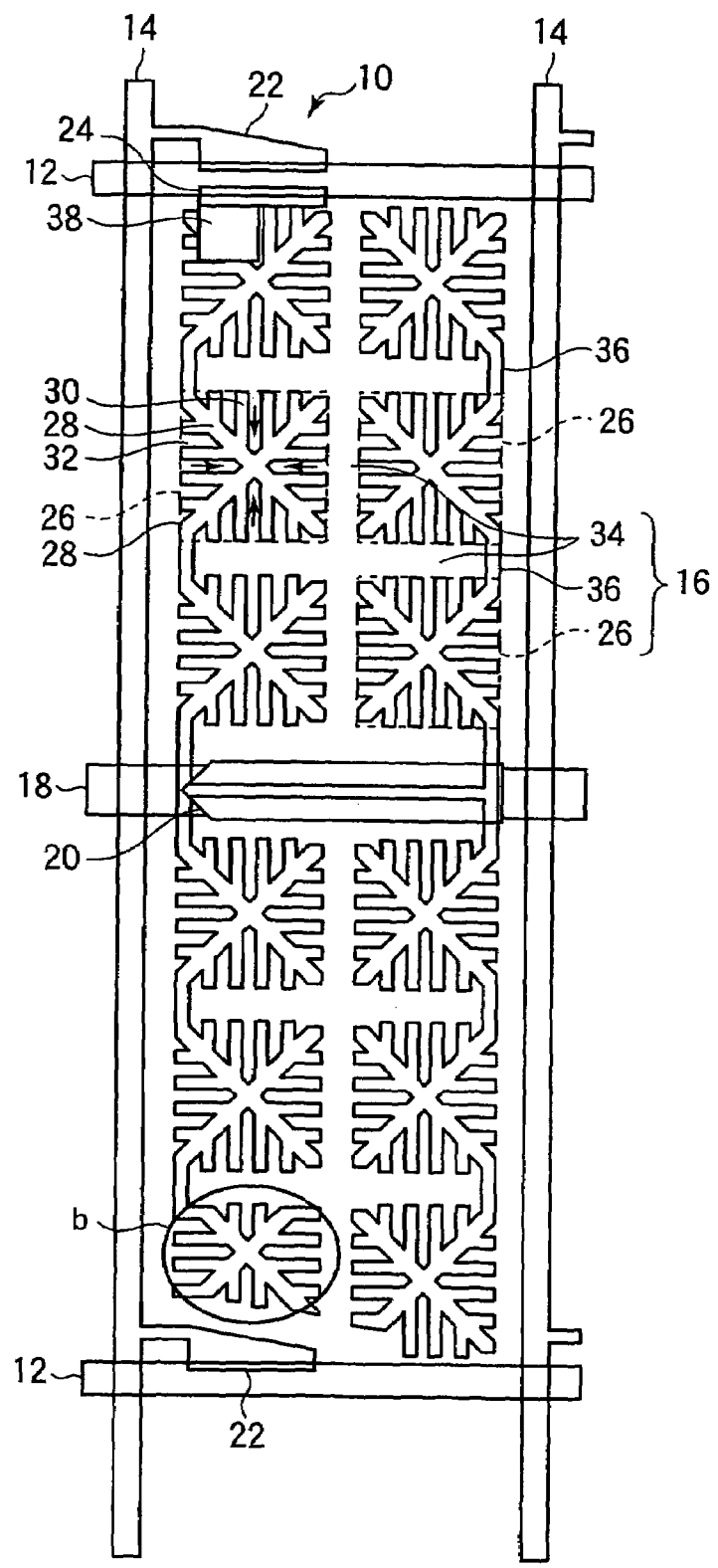
FIG. 19 shows a configuration of a substrate for a liquid crystal display according to Embodiment 2-1 in a second mode for carrying out the invention.

A substrate for a liquid crystal display according to Embodiment 2-1 in the present mode for carrying out the invention will now be described with reference to FIGS. 19 to 26D. FIG. 19 shows a configuration of a substrate for a liquid crystal display of the present embodiment. As shown in FIG. 19, a plurality of gate bus lines extending in the horizontal direction in the figure are formed at intervals of 300 μm for example, and a plurality of drain bus lines 14 extending in the vertical direction in the figure are formed at intervals of 100 μm for example. The gate bus lines 12 and the drain bus lines 14 have a width of 7 μm, for example. Intervals between edges of a gate bus line 12 and a drain bus line 14 and an edge of a pixel electrode 16 are 8 μm, for example. Shorter sides of the pixel electrode 16 that has a substantially rectangular outline are about 77 μm long.

The pixel electrode 16 has a plurality of electrode units 26 having a circumference in the form of a rectangle each side of which has a length in the range from 20 μm to 80 μm (twelve electrode units 26 having a circumference in the form of a square of 35 μm×35 μm are formed in FIG. 19). Two electrode units 26 are provided in the direction in which the gate bus lines 12 extend, and six electrode units 26 are provided in the direction in which the drain bus lines 14 extend (three each are provided on both sides of a storage capacitor bus line 18). Each of the electrode units 26 has a circumference in the form of a square having four sides that are substantially in parallel with or perpendicular to the gate bus lines 12 and drain bus lines 14. An electrode unit 26 is formed with crossed trunk sections 28 that linearly extend from a point where lines connecting the vertices of the circumferential square intersect each other to respective end points that are the four vertices of the circumferential square. A trunk section 28 is in the form of a rectangle having a substantially constant width (two sides in the longitudinal direction of the same are substantially in parallel with each other), and the end of the same (in the vicinity of the endpoint) is tapered into a triangular shape in adaptation to the circumferential shape of the electrode unit 26. A trunk section 28 has a width in the range from 3 μm to 10 μm. An electrode unit 26 has four alignment regions that are defined by the trunk sections 28 and that align liquid crystal molecules in different directions respectively.

An electrode unit 26 has a plurality of branch sections 30 that branch from the trunk sections 28 and extend substantially in parallel with or perpendicular to the gate bus lines 12 or the drain bus lines 14 (diagonally to the trunk sections 28). A branch section 30 has a width in the range from 2 μm to 10 μm (e.g., 3 μm) and a length of 25 μm or less. A space 32 is defined between branch sections 30 adjacent to each other. A space 32 has a width in the range from 2 μm to 10 μm (e.g., 3 μm). For example, the trunk sections 28 and the branch sections 30 define an angle of 45 deg. For example, each side of the circumference of an electrode unit 26 and the branch sections 30 define an angle of 90 deg.

While the twelve electrode units 26 have substantially the same configuration, the configuration of some of the electrode units 26 is modified. The pixel electrode 16 must be electrically connected to a source electrode 24 of a TFT 10. Therefore, the pixel electrode 16 and the source electrode 24 are connected through a contact hole (not shown) formed in a protective film 56 (not shown in FIG. 19). A somewhat large pixel electrode forming layer is required in the region where the pixel electrode 16 and the source electrode 24 are connected to accommodate a margin for a shift of patterning for forming the contact hole. For this reason, the electrode unit 26 at the top left corner of the pixel region shown in FIG. 19 is provided with a contact region (solid electrode) 38 which is a square region of about 15 μm×15 μm and on which the material of the pixel electrode is formed on the entire surface thereof.

A drain electrode 22 of the TFT 10 of the adjacent pixel region located below the illustrated pixel region is formed such that it projects into a lower part of the illustrated pixel region. When the pixel electrode 16 is formed in an overlapping relationship with the drain electrode 22 as viewed in a direction perpendicular to the substrate surface, the alignment of liquid crystal molecules in that region is disturbed, which can result in crosstalk. It is therefore necessary to form the pixel electrode 16 and the drain electrode 22 such that they will not overlap each other. For this purpose, the electrode unit 26 located in that region (the bottom left corner in FIG. 19) must be formed in a configuration that is shorter in the direction in parallel with the drain bus lines 14 (vertical direction). Specifically, the circumferential configuration of the electrode unit 26 in that region is a rectangle of 25 μm×35 μm that is 10 μm shorter in the vertical direction than the other electrode units 26 having a circumferential configuration in the form of a square of 35 μm×35 μm. The starting point of the trunk sections 28 of the same electrode unit 26 is located substantially in the middle thereof, and there are two end points on each side of the circumferential rectangle that is substantially in parallel with the gate bus lines 12.

When a plurality of electrode units 26 are arranged, slits 34 are formed between electrode units 26 adjacent to each other for electrically isolating the electrode units 26 from each other. A slit 34 has a width in the range from 4 μm to 10 μm (e.g., 7 μm). The electrode units 26 in the same pixel region must be electrically connected. Therefore, connection electrodes 36 for electrically connecting the electrode units 26 are provided between the electrode units 26. The connection electrodes 36 are provided in the vicinity of the drain bus lines 14 (the periphery of the pixel region). Specifically, a connection electrode 36 is formed such that it connects two of the four trunk sections 28 of an electrode unit 26 located adjacent to a drain bus line 14. The connection electrodes 36 extend in a direction that is at an inclination of about 45 deg. from the direction in which the trunk sections 28 extend. Electrode units 26 that are adjacent to each other in the direction of the gate bus lines 12 are connected by a connection electrode 36 formed on a storage capacitor bus line 18 (a storage capacitor electrode 20). The storage capacitor bus line 18 is formed such that it overlaps the slits 34 when viewed in a direction perpendicular to the substrate surface.

Although not shown in FIG. 19, a black matrix 40 for shading edges of the pixel region is formed on a CF substrate 4 that is provided in a face-to-face relationship with the TFT substrate 2. The black matrix 40 is formed like a grid having a width of 23 μm, for example. The intervals of the grid in the extending direction of the gate bus lines 12 is 100 μm, and the intervals of the grid in the extending direction of the drain bus lines 14 is 300 μm. A CF resin layer in any of red (R), green (G) or blue (B) is formed at each opening of the BM 40. For example, a common electrode constituted by an ITO is formed on the entire surface of the CF resin layers.

Alignment films are formed on surfaces the substrates 2 and 4 that face each other. The alignment films have a vertically aligning property and align liquid crystal molecules in a direction perpendicular to substrate surfaces (surfaces of the alignment films) in a normal state. A liquid crystal display is manufactured by injecting and sealing a liquid crystal having negative dielectric constant anisotropy in a liquid crystal cell provided by combining such substrates 2 and 4.

Figure 20:
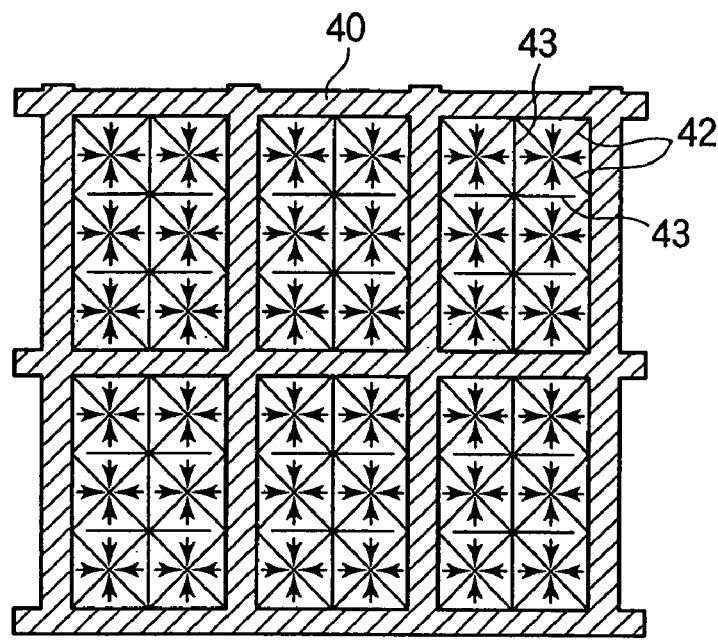
FIG. 20 shows a state of alignment of liquid crystal molecules and a state of display of the substrate for a liquid crystal display according to Embodiment 2-1 in the second mode for carrying out the invention.

FIG. 20 shows a state of alignment of liquid crystal molecules in a liquid crystal display according to the present embodiment and a state of display of the same. The arrows in the figure indicate directions in which liquid crystal molecules are tilted when a voltage is applied to the liquid crystal layer. FIG. 20 shows three pixels defined by a black matrix 40. As shown in FIG. 20, in the liquid crystal display of the present embodiment, four alignment regions are formed in each electrode unit 26, the diagonal lines of the circumferential square of the unit serving as boundaries. In each of the alignment regions, liquid crystal molecules are tilted toward the center of the electrode unit 26. The alignment regions in one pixel have substantially equal areas.

One electrode unit 26 is formed in a size of about 35 μm×35 μm that is smaller than the size of the pixel region. Therefore, electric fields at the ends of trunk sections 28 and branch sections 30 of a pixel electrode 16 exhibit a relatively great effect, which makes it possible to provide a strong force to regulate the alignment of liquid crystal molecules. In the liquid crystal display of the present embodiment, connection electrodes 36 connecting the electrode units 26 are provided in the vicinity of drain bus lines 14. Since this reduces the possibility of an alignment defect caused by coupling of tilting directions of liquid crystal molecules on two adjoining electrode units 36 through slits 34, reduction in display quality can be prevented.

Boundaries between alignment regions are visually perceived as dark lines 42, and regions where the slits 34 are formed are visually perceived as dark lines 43. However, since such dark lines 42 and 43 are generated in the same position in each pixel, no reduction of display quality occurs.

Figure 21:
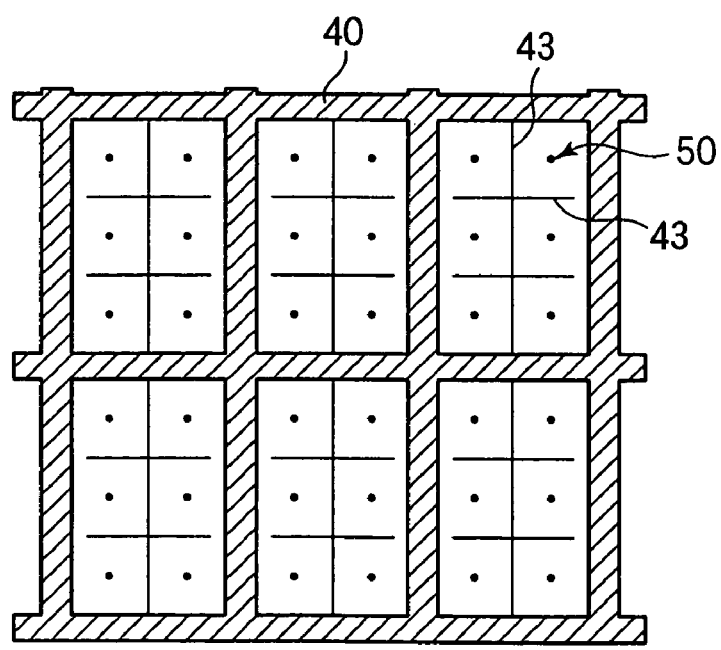
FIG. 21 shows a state of alignment of liquid crystal molecules and a state of display of the substrate for a liquid crystal display according to Embodiment 2-1 in the second mode for carrying out the invention.

FIG. 21 shows a state of alignment of liquid crystal molecules and a state of display of a liquid crystal display in which ¼ wave plates 44 and 45 and polarizers 83 and 84 are provided in the same order outside respective substrates 2 and 4 for a liquid crystal display according to the present embodiment. As shown in FIG. 21, in the liquid crystal display having the ¼ wave plates 44 and 45 and the polarizers 83 and 84 provided in the same order outside the substrates 2 and 4, since optical transmittance is not dependent upon tilting directions of liquid crystal molecules, no dark line 42 is visually perceived except that singular points formed in the middle of electrode units 36 are visually perceived as dark spots 50. This makes it possible to present display with high luminance.

FIGS. 22A to 25B show patterns in which an electrode unit 26 may be formed. In FIGS. 22A to 25B, the arrow shown in each alignment region indicates a tilting direction of liquid crystal molecules. FIG. 22A shows a pattern of formation of an electrode unit 26 similar to the electrode unit 26 shown in FIG. 19. As shown in FIG. 22A, end points G1 to G4 of trunk sections 28 are located at respective vertices of the circumferential rectangle. A starting point S of the trunk sections 28 is located at the intersection of diagonal lines connecting two of the end points G1 to G4 that are not adjacent to each other (i.e., connecting the endpoints G1 and G3 and the endpoints G2 and G4, respectively) In the case of a square circumference, the diagonal lines are orthogonal to each other. Straight lines connecting the starting point S and the four end points G1 to G4 serve as boundaries that define alignment regions and appear as dark lines 42 when the liquid crystal display is completed. The branch sections 30 diagonally branch from the trunk sections 28. The extending direction of the branch sections 30 is at an angle of 90 deg. to any side of the circumference of the electrode unit 26.

The coordinate of the starting point S is a coordinate in the middle of two adjoining end points (i.e., between the end points G1 and G2, G2 and G3, G3 and G4, or G4 and G1). Two straight lines connecting the starting point S and two adjoining end points define an angle that is smaller than 180 deg. The angle is desirably about 90 deg. By setting such a configuration of the trunk sections 28, the alignment regions can be provided as four divisions whose configurations are not distorted and whose areas are as close to each other as possible. The configuration of the electrode units 26 may be changed as long as such conditions are satisfied.

FIG. 22B shows a first modification of the pattern in which an electrode unit 26 is formed. As shown in FIG. 22B, a starting point S is located in any position in an electrode unit 26. One of end points G1 to G4 is located on each side of a rectangle that defines the outline of the electrode unit 26. In the context of the present mode for carrying out the invention, "a side" includes vertices on both ends of the side.

FIG. 22C shows a second modification of the pattern in which an electrode unit 26 is formed. As shown in FIG. 22C, a starting point S is located in any position in an electrode unit 26. End points G1 and G4 are located on one side of a rectangle that defines the outline of the electrode unit 26, and an end point G3 is located on the side opposite to that side. And, an end point G2 is located on the another side.

FIG. 22D shows a third modification of the pattern in which an electrode unit 26 is formed. As shown in FIG. 22D, a starting point S is located in any position in an electrode unit 26. End points G1 and G4 are located on one side of a rectangle that defines the outline of the electrode unit 26, and end points G2 and G3 are respectively located on the two sides other than the side opposite to the above-mentioned side.

FIG. 22E shows a fourth modification of the pattern in which an electrode unit 26 is formed. As shown in FIG. 22E, a starting point S is located in any position in an electrode unit 26. End points G1 and G4 are located on one side of a rectangle that defines the outline of the electrode unit 26, and end points G2 and G3 are located on the side opposite to that side.

FIG. 22F shows a fifth modification of the pattern in which an electrode unit 26 is formed. As shown in FIG. 22F, a starting point S is located in any position in an electrode unit 26. End points G1 to G4 are respectively located on the vertices of a rectangle that defines the outline of the electrode unit 26.

FIG. 22G shows a sixth modification of the pattern in which an electrode unit 26 is formed. As shown in FIG. 22G, end points G1 to G4 are respectively located on the sides of a rectangle that defines the outline of an electrode unit 26, and a starting point S is located on the intersection of straight lines that cross each other to connect two of end points G1 to G4 that are not adjacent each other (i.e., to connect the end points G1 and G3 and the end points G2 and G4, respectively).

FIG. 22H shows a seventh modification of the pattern in which an electrode unit 26 is formed. As shown in FIG. 22H, end points G1 to G4 are located in positions on respective sides of a rectangle that define the outline of an electrode unit 26, each side being equally divided in the respective position. A starting point S is located on the intersection of straight lines that cross each other to connect two of end points G1 to G4 that are not adjacent to each other (i.e., to connect the end points G1 and G3 and the end points G2 and G4, respectively).

Figure 23A:
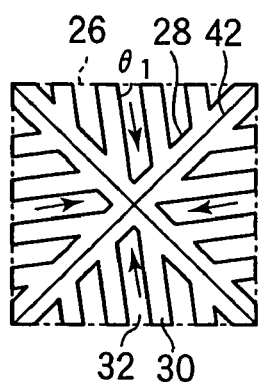
FIGS. 23A to 23C show modifications of the configuration of a substrate for a liquid crystal display according to Embodiment 2-1 in the second mode for carrying out the invention.

FIG. 23A shows an eighth modification of the pattern in which an electrode unit 26 is formed. As shown in FIG. 23A, end points G1 to G4 are respectively located on the vertices of a rectangle that defines the outline of an electrode unit 26. A starting point S is located on the intersection of straight lines that cross each other to connect two of the end points G1 to G4 that are not adjacent to each other (i.e., to connect the endpoints Gland G3 and the endpoints G2 and G4, respectively) Branch sections 30 extend in a direction at an angle θ1 in the range from 45 deg. to 90 deg. to one side of the circumference of the electrode unit 26. In each alignment region, the branch sections 30 extend in directions that are substantially in parallel with each other. In the present modification, the azimuth direction of liquid crystal molecules will be different from those in the above-described embodiment and modifications. However, the present modification can be put in use by providing ¼ wave plates 44 and 45 and polarizers 83 and 84 in the same order outside the substrates 2 and 4 of a liquid crystal display because this makes optical transmittance independent upon the azimuth direction of liquid crystal molecules.

Figure 23B:
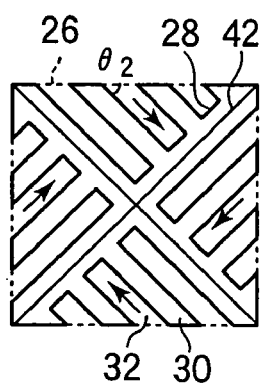

FIG. 23B shows a ninth modification of the pattern in which an electrode unit 26 is formed. As shown in FIG. 23B, trunk sections 28 have the same configuration as that in the eighth modification. Branch sections 30 extend in a direction at an angle θ2 of about 45 deg. to one side of the circumference of the electrode unit 26. In this case, the branch sections 30 branch from only one side of the trunk sections 28. In each alignment region, the branch sections 30 extend in directions that are substantially in parallel with each other.

Figure 23C:
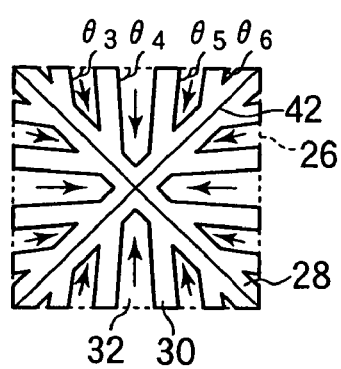

FIG. 23C shows a tenth modification of the pattern in which an electrode unit 26 is formed. As shown in FIG. 23C, trunk sections 28 have the same configuration as that in the eighth and ninth modifications. Branch sections 30 extend in directions that are not in parallel with each other in each alignment region. For example, let us assume that four branch sections 30 extend in directions (clockwise directions with respect to the starting point S) at angles θ3 (θ3≦90 deg.), θ4, θ5 and θ6, respectively, to one side of the circumference of the electrode unit 26. Then, there is a relationship expressed by 45 deg. ≦θ3≦θ4≦θ5≦θ6≦135 deg. That is, the plurality of branch sections 30 extend such that they spread substantially in the form of a fan. When there is a too great difference between the angles θ3 and θ6, the intervals between the branch sections 30 becomes too great at the circumference and too small in the vicinity of the trunk section 28. This naturally sets a limit on the range of values at which the angles θ3 to θ6 can be set.

Figure 24A:
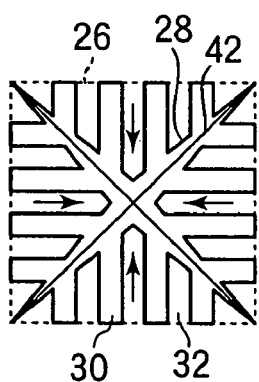
FIGS. 24A to 24C show modifications of the configuration of a substrate for a liquid crystal display according to Embodiment 2-1 in the second mode for carrying out the invention.

FIG. 24A shows an eleventh modification of the pattern in which an electrode unit 26 is formed. As shown in FIG. 24A, trunk sections 28 have a width that gradually decreases from a value at the base portion thereof (starting point) to a value at the ends thereof (end points).

Figure 24B:
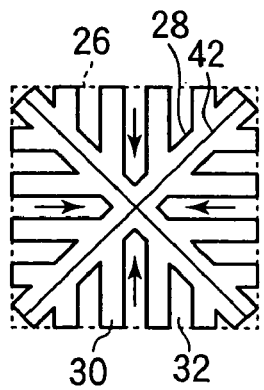

FIG. 24B shows a twelfth modification of the pattern in which an electrode unit 26 is formed. As shown in FIG. 24B, trunk sections 28 are formed in a rectangular configuration having a substantially constant width. The ends of the trunk sections 28 may stay within the circumferential rectangle and may protrude from the circumferential rectangle.

Figure 24C:
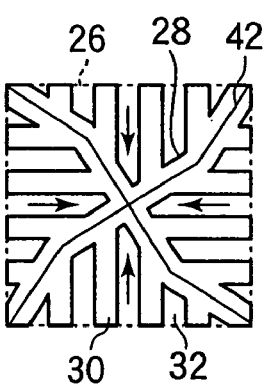

FIG. 24C shows a thirteenth modification of the pattern in which an electrode unit 26 is formed. As shown in FIG. 24C, trunk sections 28 are bent in the form of the character "V" in the middle thereof. Since the trunk sections 28 still function as boundaries of alignment regions even when their configuration is modified as shown in FIGS. 24A, 24B and 24C, there will be no significant change in the alignment of liquid crystal molecules.

Figure 25A:
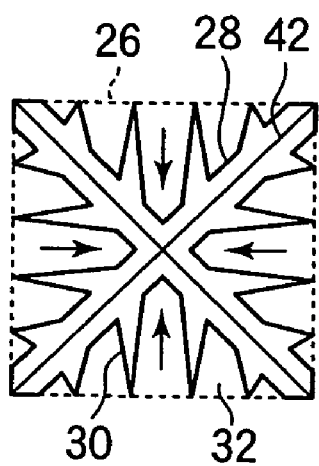
FIGS. 25A and 25B show modifications of the configuration of a substrate for a liquid crystal display according to Embodiment 2-1 in the second mode for carrying out the invention.

FIG. 25A shows a fourteenth modification of the pattern in which an electrode unit 26 is formed. As shown in FIG. 25A, branch sections 30 have a width that gradually decreases from a value at the base portion thereof connected to a trunk section 28 to a value at the end portions thereof. Although not shown, the branch sections 30 may be formed such that they have a reduced width only at the ends thereof or such that they are bent in the middle thereof.

Figure 25B:
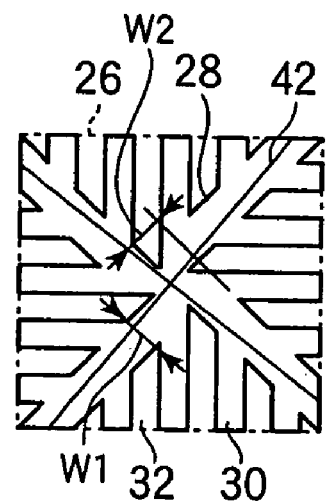

FIG. 25B shows a fifteenth modification of the pattern in which an electrode unit 26 is formed. As shown in FIG. 25B, trunk sections 28 located opposite to each other on both sides of a starting point are formed with an offset from each other. Specifically, a width W2 of the offset is made equal to or greater than a width W1 of the trunk sections 28 (W2≧W1). This makes it possible to fix the rotating direction of liquid crystal molecules in the vicinity of a singular point (the rotating direction of a boundary domain). Since the trunk sections 28 still function as boundaries of separate alignments even when their configuration is thus modified, there is no significant change in the alignment of liquid crystal molecules. The offset width W2 may be smaller than the width W1 of the trunk sections 28 (W2<W1).

Figure 26A:
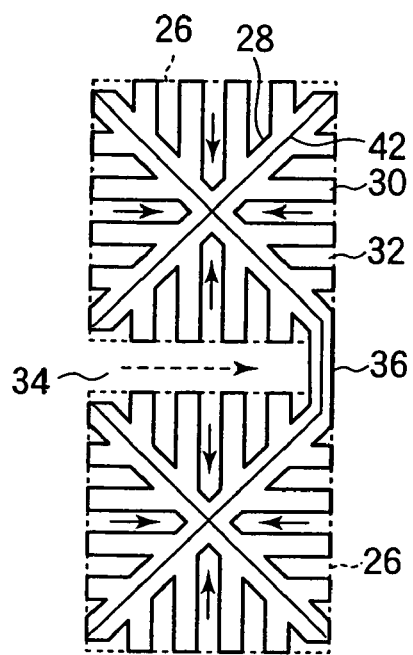
FIGS. 26A to 26D show modifications of the configuration of a substrate for a liquid crystal display according to Embodiment 2-1 in the second mode for carrying out the invention.

FIGS. 26A to 26D show patterns in which a connection electrode 36 is formed. In FIGS. 26A to 26D, the arrows in broken lines shown at a slit 34 indicate tilting directions of liquid crystal molecules above the slit 34. FIG. 26A shows a pattern for formation of a connection electrode 36 that is similar to the connection electrode 36 shown in FIG. 19. As shown in FIG. 26A, the connection electrode 36 is formed between ends of trunk sections 28 face each other with a slit 34 interposed therebetween.

Figure 26B:
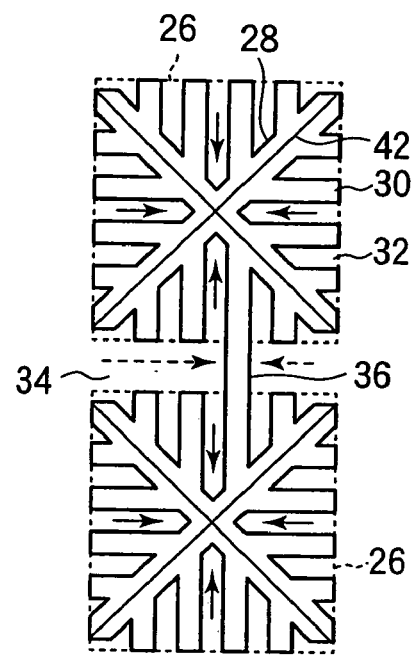

FIG. 26B shows a first modification of the pattern in which a connection electrode 36 is formed. As shown in FIG. 26B, a connection electrode 36 is formed between ends of branch sections 30 that extend substantially in parallel with each other and that face each other with a slit 34 interposed therebetween. The extending direction of the connection electrode 36 is substantially in parallel with the extending direction of the branch sections 30.

Figure 26C:
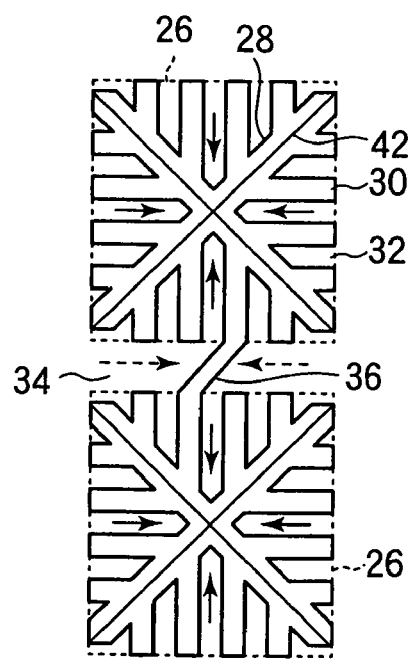

FIG. 26C shows a second modification of the pattern in which a connection electrode 36 is formed. As shown in FIG. 26C, a connection electrode 36 is formed between ends of branch sections 30 other than branch sections 30 that face each other with a slit 34 interposed therebetween. The extending direction of the connection electrode 36 is diagonal to the extending direction of the branch sections 30.

Figure 26D:
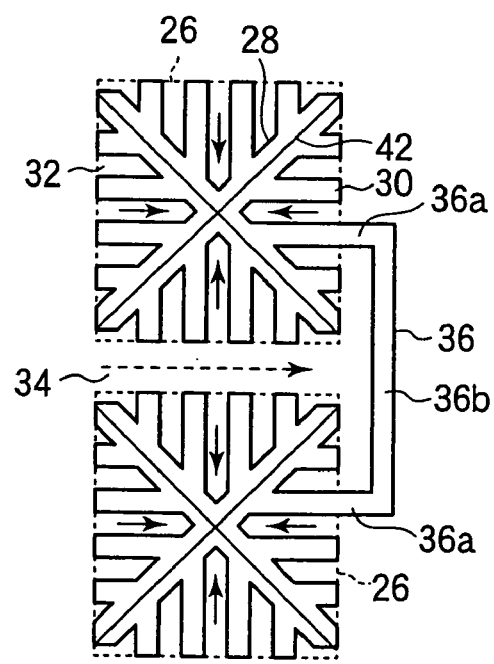

FIG. 26D shows a third modification of the pattern in which a connection electrode 36 is formed. Although not shown, a drain bus line 14 extending in the vertical direction in the figure is formed adjacent to the electrode units 26 on the right side thereof in the figure. As shown in FIG. 26D, a connection electrode 36 is formed between ends of branch sections 30 that extend toward the drain bus line 14. It has extensions 36a extending substantially in parallel with the extending direction of the branch sections 30 and a connecting portion 36b that connects the extensions 36a and extends substantially in parallel with the drain bus line 14.

The connection electrode 36 may be replaced with a second connection electrode that is formed from a material different from the materials of the trunk sections 28 and the branch sections 30 and that connects a source electrode 24 and the electrode units 26. For example, the second connection electrode is formed between the source electrode 24 and the neighborhood of the starting points of the electrode units 26.

The first through fifteenth modifications can provide the same advantages as those of the above-described embodiments. While FIGS. 22A to 25B show electrode units 26 having a substantially square circumference, the electrode units 26 may have a rectangular circumference instead. The electrode units 26 may have a circumference in a configuration similar to a rectangle. By way of example, a configuration may be employed in which the neighborhood of each vertex of a rectangle is rounded with a predetermined radius.

Embodiment 2-2

Figure 27:
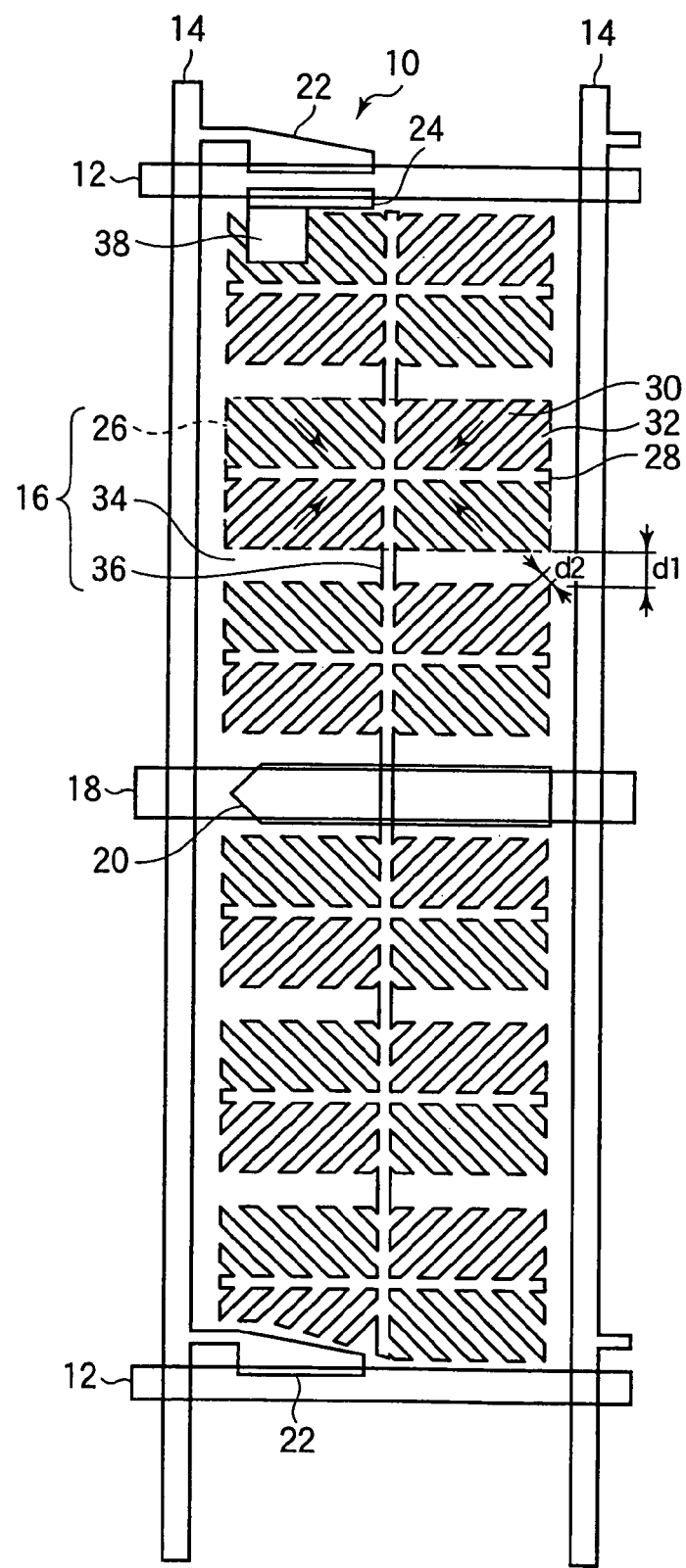
FIG. 27 shows a configuration of a substrate for a liquid crystal display according to Embodiment 2-2 in the second mode for carrying out the invention.

A substrate for a liquid crystal display according to Embodiment 2-2 in the present mode for carrying out the invention will now be described with reference to FIGS. 27 to 29. FIG. 27 shows a configuration of a substrate for a liquid crystal display of the present embodiment. In the present embodiment, an electrode unit 26 has a rectangular circumference of 77 μm×35 μm. A starting point of trunk sections 28 of the same is located in the middle of the electrode unit 26, and end points of the trunk sections 28 are located in positions where respective sides of the circumferential rectangle are equally divided. That is, the electrode unit 26 is divided into four alignment regions, i.e., top left, top right, bottom left, and bottom right regions in the figure. Branch sections 30 for regulating the aligning direction of liquid crystal molecules are formed such that they diagonally branch from the trunk sections 28 and define an angle of 45 deg. to gate bus lines 12 and drain bus lines 14.

One electrode unit 26 is provided in the direction in which the gate bus lines 12 extend, and six electrode units 26 are provided in the direction in which the drain bus lines 14 extend (three each are provided on both sides of a storage capacitor bus line 18). A connection electrode 36 for connecting adjoining electrode units 26 is formed between trunk sections 28 that face each other with a slit 34 interposed therebetween.

Figure 28:
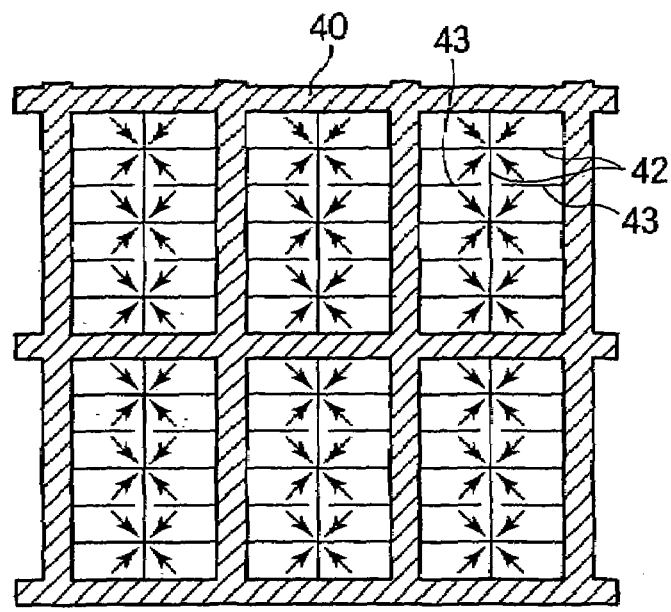
FIG. 28 shows a state of alignment of liquid crystal molecules and a state of display of the substrate for a liquid crystal display according to Embodiment 2-2 in the second mode for carrying out the invention.

FIG. 28 shows a state of alignment of liquid crystal molecules in a liquid crystal display according to the present embodiment and a state of display of the same. The arrows in the figure indicate directions in which liquid crystal molecules are tilted when a voltage is applied to the liquid crystal layer. FIG. 28 shows three pixels defined by a black matrix 40. As shown in FIG. 28, in the liquid crystal display of the present embodiment, four alignment regions are formed in each electrode unit 26, the regions being bounded by the trunk sections 28. In each of the alignment regions, liquid crystal molecules are tilted toward the center of the electrode unit 26. The alignment regions in one pixel have substantially equal areas.

One electrode unit 26 is formed in a size of about 77 μm×35 μm that is smaller than the size of the pixel region. Therefore, electric fields at the ends of trunk sections 28 and branch sections 30 of a pixel electrode 16 exhibit a relatively great effect, which makes it possible to provide a strong force to regulate the alignment of liquid crystal molecules. Boundaries between alignment regions are visually perceived as dark lines 42, and regions where the slits 34 are formed are visually perceived as dark lines 43. However, since such dark lines 42 and 43 are generated in the same position in each pixel, no reduction of display quality occurs.

Figure 29:
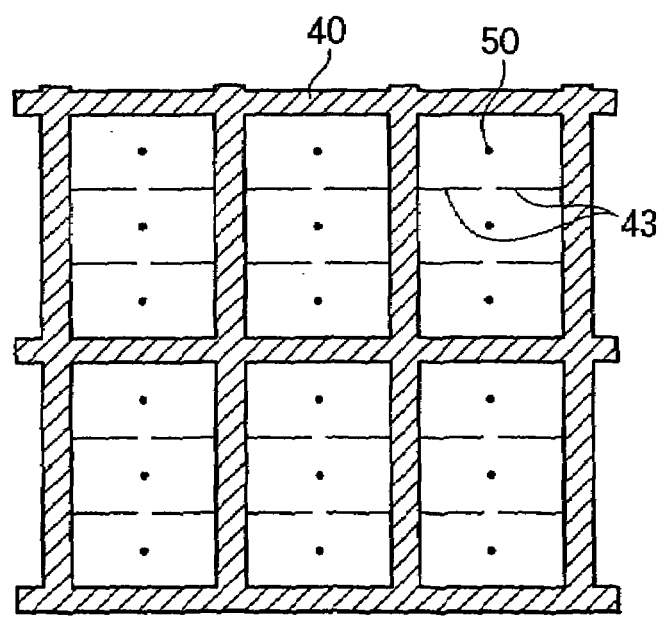
FIG. 29 shows a state of alignment of liquid crystal molecules and a state of display of the substrate for a liquid crystal display according to Embodiment 2-2 in the second mode for carrying out the invention.

FIG. 29 shows a state of alignment of liquid crystal molecules and a state of display of a liquid crystal display in which ¼ wave plates 44 and 45 and polarizers 83 and 84 are provided in the same order outside respective substrates 2 and 4 for a liquid crystal display according to the present embodiment. As shown in FIG. 29, in the liquid crystal display having the ¼ wave plates 44 and 45 and the polarizers 83 and 84 provided in the same order outside the substrates 2 and 4, since optical transmittance is not dependent upon tilting directions of liquid crystal molecules, no dark line 42 is visually perceived except that singular points formed in the middle of electrode units 36 are visually perceived as dark spots 50. This makes it possible to present display with high luminance.

Embodiment 2-3

Figure 30:
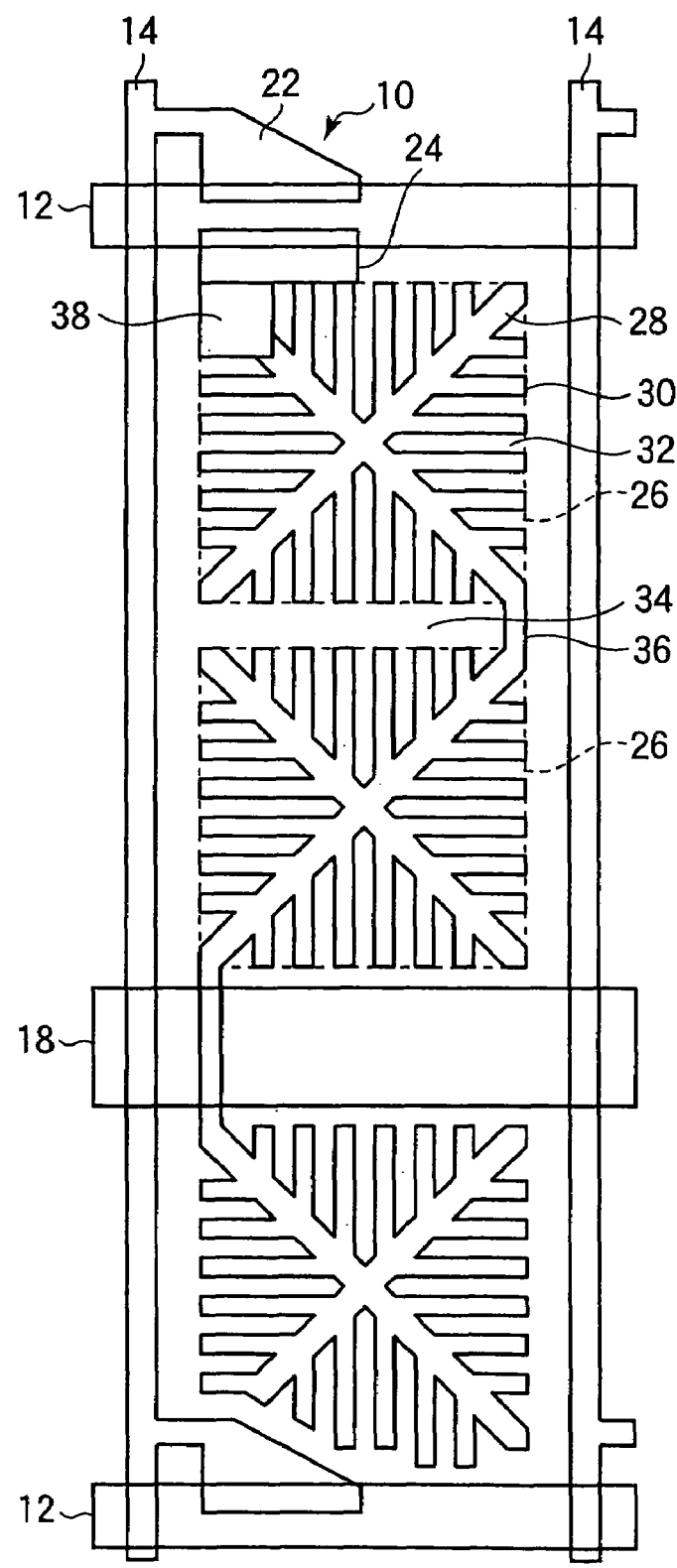
FIG. 30 shows a configuration of a substrate for a liquid crystal display according to Embodiment 2-2 in the second mode for carrying out the invention.

A substrate for a liquid crystal display according to Embodiment 2-3 in the present mode for carrying out the invention will now be described with reference to FIGS. 30 to 32. FIG. 30 shows a configuration of a substrate for a liquid crystal display of the present embodiment. In the present embodiment, a plurality of gate bus line 12 extending in the horizontal direction in the figure are formed at intervals of 225 μm for example, and a plurality of drain bus lines 14 extending in the vertical direction in the figure are formed at intervals of 75 μm, for example. The pixel region is smaller than those in the Embodiments 2-1 and 2-2. For example, the gate bus lines 12 and the drain bus lines 14 have a width of 6 μm. The interval between edges of a gate bus line 12 and a drain bus line 14 and an edge of a pixel electrode 16 is 7 μm, for example. That is, shorter sides of the pixel electrode 16 that has a substantially rectangular circumference are about 55 μm long.

An electrode unit 26 has a circumference in the form of a square of 55 μm×55 μm. A starting point of trunk sections 28 is located in the middle of the electrode unit 26, and end points of the trunk sections 28 are located at the vertices of the circumferential rectangle of the electrode unit 26, respectively. Branch sections 30 for regulating the aligning direction of liquid crystal molecules are formed such that they diagonally branch from the trunk sections 28 and extend substantially in parallel with or perpendicularly to the gate bus lines 12 or the drain bus lines 14. For example, the branch sections 30 have a width of 3 μm. Spaces 32 have a width of 3 μm. The trunk sections 28 and the branch sections 30 define an angle of 45 deg., for example. For example, an angle of 90 deg. is defined between the branch sections 30 and each side of the circumference of the electrode unit 26.

One electrode unit 26 is provided in the direction in which the gate bus lines 12 extend, and three electrode units 26 are provided in the direction in which the drain bus lines 14 extend. A storage capacitor bus line 18 is provided such that it overlaps the slits 34 when viewed in a direction perpendicular to a substrate surface. Therefore, the storage capacitor bus line 18 is eccentrically provided in an upper or lower part of the pixel region instead of being provided in the middle of the same. Specifically, a storage capacitor bus line 18 (a storage capacitor electrode 20) having a width of 20 μm, for example, is formed, the bus line being centered in a position that is about 150 μm away from the upper gate bus line 12 and about 75 μm away from the lower gate bus line 12.

Two electrode units 26 are provided in an upper open area, and one electrode unit 26 is provided in a lower open area, the storage capacitor bus line 18 bounding those areas. Like Embodiment 2-1, some of the electrode units 26 are modified in configuration. The electrode unit 26 at the top of the pixel region is provided with a contact region 38 which is a square region of about 15 µm×15 µm and on which the material of the pixel electrode is formed on the entire surface thereof. The electrode unit 26 at the bottom of the pixel region is provided with a cutout such that an edge of a drain electrode 22 and the edge of the pixel electrode 16 is spaced from each other by 7 µm, for example.

Connection electrodes 36 for connecting adjoining electrode units 26 are provided in the vicinity of the drain bus lines 14 (the periphery of the pixel region). The connection electrodes 36 are formed substantially in parallel with the drain bus lines 14 to connect the trunk sections 28 facing each other with the slits 34 interposed therebetween. The slits 34 have a width of 7 µm, for example.

Although not shown in FIG. 30, a black matrix 40 for shading edges of the pixel region is formed on a CF substrate 4 that is provided in a face-to-face relationship with the TFT substrate 2. The black matrix 40 is formed like a grid having a width of 20 µm, for example. The intervals of the grid in the extending direction of the gate bus lines 12 is 75 µm, and the intervals of the grid in the extending direction of the drain bus lines 14 is 225 µm. A CF resin layer in any of red (R), green (G) or blue (B) is formed at each opening of the BM 40. For example, a common electrode constituted by an ITO is formed on the entire surface of the CF resin layers.

Figure 31:
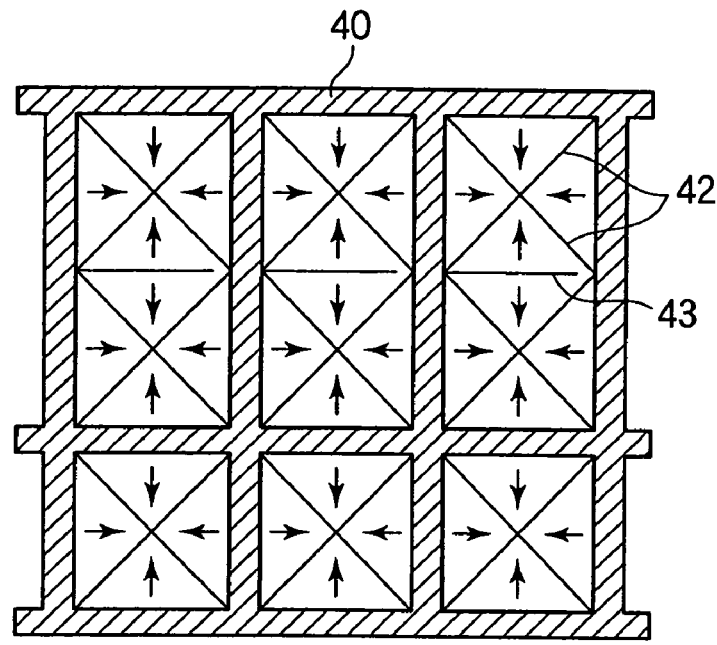
FIG. 31 shows a state of alignment of liquid crystal molecules and a state of display of the substrate for a liquid crystal display according to Embodiment 2-2 in the second mode for carrying out the invention.

FIG. 31 shows a state of alignment of liquid crystal molecules in a liquid crystal display according to the present embodiment and a state of display of the same. The arrows in the figure indicate directions in which liquid crystal molecules are tilted when a voltage is applied to the liquid crystal layer. FIG. 31 shows three pixels defined by a black matrix 40. As shown in FIG. 31, in the liquid crystal display of the present embodiment, four alignment regions are formed in each electrode unit 26, the trunk sections 28 bounding those regions. In each of the alignment regions, liquid crystal molecules are tilted toward the center of the electrode unit 26. The alignment regions in one pixel have substantially equal areas.

One electrode unit 26 is formed in a size of about 55 µm×55 µm that is smaller than the size of the pixel region. Therefore, electric fields at the ends of trunk sections 28 and branch sections 30 of a pixel electrode 16 exhibit a relatively great effect, which makes it possible to provide a strong force to regulate the alignment of liquid crystal molecules. Boundaries between alignment regions are visually perceived as dark lines 42, and regions where the slits 34 are formed are visually perceived as dark lines 43. However, since such dark lines 42 and 43 are generated in the same position in each pixel, no reduction of display quality occurs.

Figure 32:
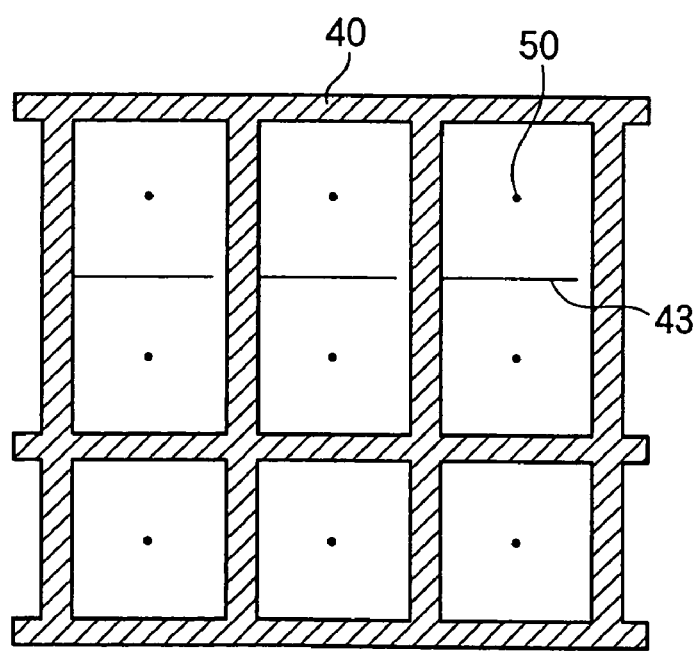
FIG. 32 shows a state of alignment of liquid crystal molecules and a state of display of the substrate for a liquid crystal display according to Embodiment 2-2 in the second mode for carrying out the invention.

FIG. 32 shows a state of alignment of liquid crystal molecules and a state of display of a liquid crystal display in which ¼ wave plates 44 and 45 and polarizers 83 and 84 are provided in the same order outside respective substrates 2 and 4 for a liquid crystal display according to the present embodiment. As shown in FIG. 32, in the liquid crystal display having the ¼ wave plates 44 and 45 and the polarizers 83 and 84 provided in the same order outside the substrates 2 and 4, since optical transmittance is not dependent upon tilting directions of liquid crystal molecules, no dark line 42 is visually perceived except that singular points formed in the middle of electrode units 36 are visually perceived as dark spots 50. This makes it possible to present display with high luminance.

As described above, in the present mode for carrying out the invention, a force to regulate the alignment of liquid crystal molecules can be provided only by changing the pattern in which pixel electrodes 16 are formed. Further, since defects in alignment of liquid crystal molecules can be reduced, liquid crystal displays having high display quality can be provided with a high yield of manufacture at a low manufacturing cost. When ¼ wave plates 44 and 45 and polarizers 83 and 84 are provided in the same order outside substrates 2 and 4 for a liquid crystal display in the present mode for carrying out the invention, a liquid crystal display having higher luminance can be easily provided.

The number of electrode units 26 in one pixel is not limited to the quantities mentioned in the above embodiments. For example, when one electrode unit 26 is provided along gate bus lines 12, electrode units 26 in a quantity in the range from 2 to 6 are provided along drain bus lines 14. When two electrode units 26 are provided along gate bus lines 12, electrode units 26 in a quantity in the range from 4 to 12 are provided along drain bus lines 14. When three electrode units 26 are provided along gate bus lines 12, electrode units 26 in a quantity in the range from 6 to 18 are provided along drain bus lines 14.

(Third Mode for Carrying Out the Invention)

A substrate for a liquid crystal display and a liquid crystal display having the same in a third mode for carrying out the invention will now be described. The present mode for carrying out the invention relates to improvement of display characteristics of a liquid crystal display in which alignment control is carried out utilizing fine electrode patterns, and a description will now be made on a liquid crystal display which exhibits stable alignment and suffers from no display defect such as irregularities in display even when subjected to some shock that can be caused in practice by pushing the panel with a finger, for example.

Existing mass-produced MVA LCDs are advantageous in that they have higher contrast and wider viewing angles compared to TN type liquid crystal displays that have been widely used. On the contrary, they are sometimes not as good as TN type LCDs in transmittance. This is attributable to the method of alignment control used in MVA type displays. MVA LCDs have linear electrode blank patterns or structures in each pixel to control the alignment of liquid crystal molecules in desired directions taking advantage of a topological effect provided by the linear structures and the effect of distortion of electrical fields acting on the liquid crystal layer that occurs when a voltage is applied. Since it is difficult to apply a predetermined voltage to liquid crystal molecules in the vicinity of the linear structures and blank sections of electrodes, the liquid crystal molecules in such a region are not sufficiently tilted. This reduces transmittance of the pixel.

In the case of MVA type alignment control, liquid crystal molecules that are somewhat apart from linear structures or blank sections of electrodes are aligned orthogonally to the longitudinal direction of the linear structures to form a large domain when a voltage is applied. On the contrary, liquid crystal molecules above the linear structures or electrode blank sections are aligned in parallel with the linear structures to form a long and narrow domain. Since alignment of a liquid crystal changes continuously, a region that is at an angle of 45 deg. to the linear structures or a region aligned in the same direction as the polarization axis of polarizers will exist between those domains. This also reduces transmittance.

In an attempt to mitigate the problem of low transmittance, studies are being made on a novel MVA method that is a combination of the following two methods.

One method is to use circular polarizers. This improves transmittance because transmittance will theoretically be determined only by retardation and will not be dependent upon the aligning direction of liquid crystal molecules. Specifically, while light is not transmitted by a region that is aligned in the same direction as the direction of a polarization axis in a configuration according to the related art, the circular polarization method makes it possible to improve the transmittance of such a region to a value equivalent to the transmittance of a region that is at an angle of 45 deg. to the polarization axis.

The other method is to control alignment using electrode units 26 having fine electrode patterns. According to the related art, several electrode blank sections or linear structures in the form of lines having a width of about 10 μm are provided in a pixel of about 100 μm×300 μm, which has resulted in a great loss of transmittance. On the contrary, it was revealed that liquid crystal molecules can be controlled in a certain direction by using a plurality of electrode units 26 having fine electrode patterns comprised of repetitive lines and spaces having a width of about 3 μm, for example, as described above as first and second modes for carrying out the invention. In this case, liquid crystal molecules are aligned in parallel with the longitudinal direction of the fine patterns, and substantially no reduction in transmittance is observed. Thus, the use of the group of electrode units 26 also makes it possible to improve transmittance.

However, it was revealed that a liquid crystal display employing such methods suffers from irregularities in display when subjected to some shock that can be caused in practice by pressing the panel with a finger, for example. The state of alignment of such a panel was examined to identify the cause. The results are shown in FIGS. 33A to 33D. The results were obtained by observing the panel with the circular polarizers replaced by ordinary linear polarizers in order to observe the state of alignment in detail.

Figure 33A:
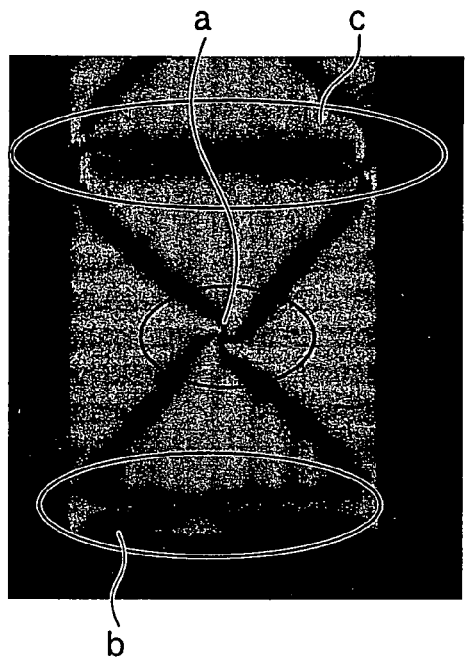
FIGS. 33A to 33D show a state of alignment of liquid crystal molecules and a state of display of a liquid crystal display that are the background of a substrate for a liquid crystal display in a third mode for carrying out the invention.
Figure 33B:
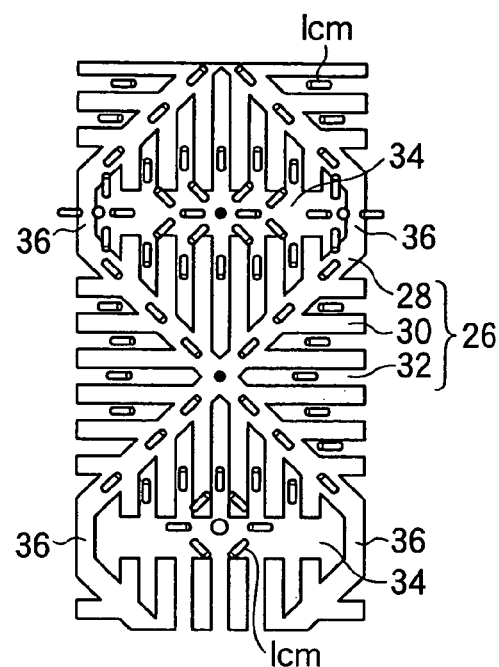

FIGS. 33A and 33B show the panel displaying in a normal state without being subjected to any shock. FIG. 33A is a microphotograph showing the state of display of a predetermined display area. FIG. 33B shows the configuration of an electrode unit 26 and the state of occurrence of singular points. In the present example, a pixel electrode 16 is used which has substantially the same electrode pattern as that shown in FIG. 26A in the second mode for carrying out the invention and which is accompanied by connection electrodes 36 formed on both sides thereof. Small rod-shaped objects present in the electrode patterns shown in FIGS. 33B and 33D indicate the aligning direction of liquid crystal molecules 1 cm. In the following description, elements identical to those used in the first and second modes for carrying out the invention will be indicated by like reference numerals and will not be described here. As shown in FIGS. 33A and 33B, when a voltage is applied to the electrode unit 26, domains are formed according to alignment control performed by a group of fine electrode patterns of the electrode unit 26. Singular points of alignment vectors (vertically aligned spot-like regions) are formed at boundaries between the domains. As shown in FIGS. 33A and 33B, three regions were observed, i.e., a region having a singular point with strength s=+1 (represented as "region a" in FIG. 33A), a region having a singular point with strength s=−1 (represented as "region b" in FIG. 33A) and a region having singular points with strength s=−1, +1 and −1 which line up in the that order of strength (represented as "region c" in FIG. 33A). In FIGS. 33B and 33D, the singular points with strength s=+1 are marked with the dots, and the singular points with strength s=−1 are marked with the circles.

Figure 33C:
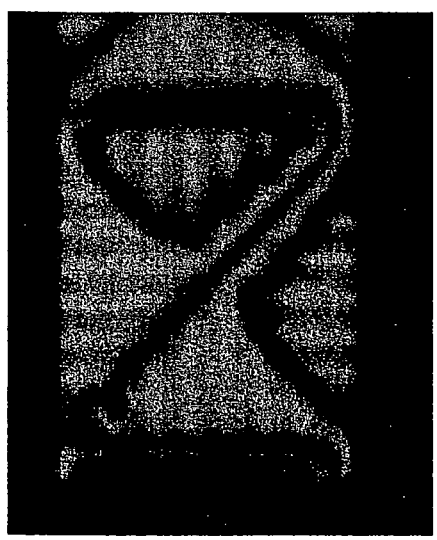
Figure 33D:
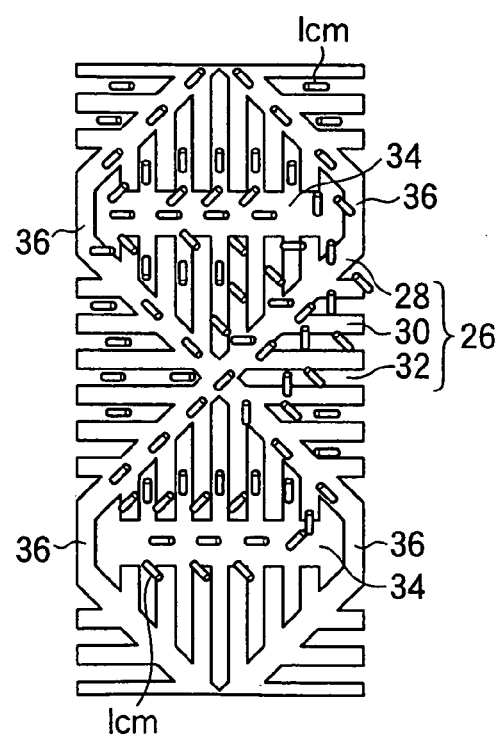

Next, FIGS. 33C and 33D show the panel with a shock given to the same by pressing the display surface of the panel with a finger. FIG. 33C is a microphotograph showing the state of display of the predetermined display area, and FIG. 33D shows the configuration of the electrode unit 26 and the state of occurrence of singular points. As shown in FIGS. 33C and 33D, the state of alignment significantly changes in the part that has been shocked by pressing the panel display surface with a finger and the neighborhood of the same, and the aligning direction is stabilized in such a state. As will be understood by comparing them with FIGS. 33A and 33B, display domains are connected with each other across the regions where domain boundaries have existed, and the singular points have disappeared.

According to the method of display using circular polarizers, in theory, a change in the state of alignment (aligning direction) is not visually perceived as a difference in luminance when the panel is viewed in a direction normal to the same. However, if the panel is viewed at whatever small angle, the apparent angle defined by the polarization axis of a linear polarizer that forms a part of the circular polarizer and the optical axis of a phase difference plate (λ/4 plate) will be different from the angle between them as viewed in the normal direction, and the apparent phase difference of the phase difference plate itself will change. Thus, the characteristics of the circular polarizer will deviate from idealistic circular polarization. As a result, when there is a significant change in alignment, irregularities of luminance will be observed on the panel in practice even if a circular polarizer is used.

As thus described, irregularities in display are considered attributable to the fact that a press with a finger can change the alignment of liquid crystal molecules in a pixel significantly. In the present mode for carrying out the invention, a liquid crystal display will be described which is kept in a stable state of alignment to prevent any display defect such as irregularity of display even when subjected to some shock that can be caused in practice by pressing the panel with a finger, for example.

A first principle behind stabilization of alignment in the present mode for carrying out the invention will now be described. Singular points are thus formed at boundaries between liquid crystal domains in most cases, as shown in FIGS. 33A to 33D. In the configuration shown in FIGS. 33A to 33D, no active control is performed over the positions where singular points are formed. This seems to be a reason for the fact that singular points easily move or disappear when subjected to a shock such as a press with a finger. Further, movement or disappearance of singular points is accompanied by significant changes in alignment such as coupling of domains across domain boundaries.

That is, it is assumed that liquid crystal domains are coupled with each other as a result of disappearance of singular points. Conversely, it is assumed that coupling of liquid crystal domains will not occur when singular points are formed with stability. In particular, the three states of formation of singular points are states that the electrode structure shown in FIGS. 33A to 33D can inherently produce with stability. It is therefore considered most preferable to provide a measure to produce such states of singular points easily in order to achieve stable alignment.

Figure 34A:
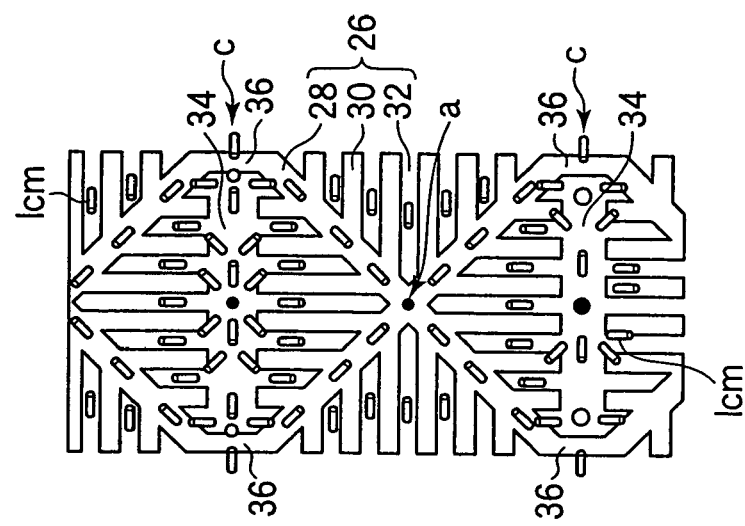
FIGS. 34A to 34C show configurations of a substrate for a liquid crystal display in the third mode for carrying out the invention.
Figure 34B:
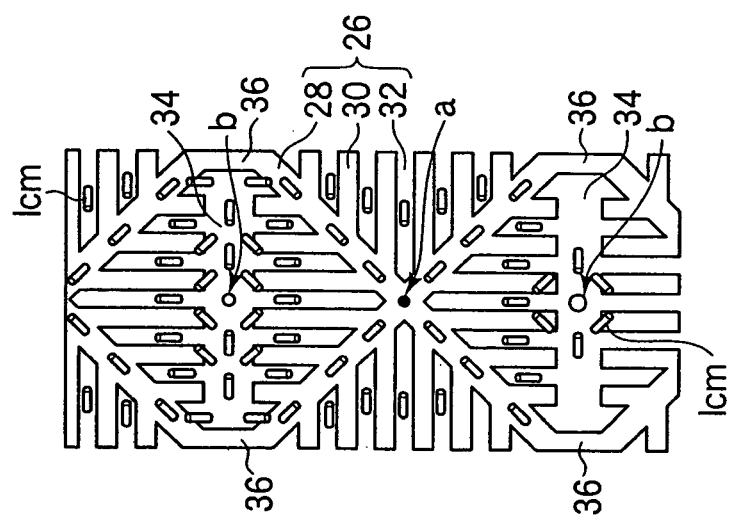
Figure 34C:
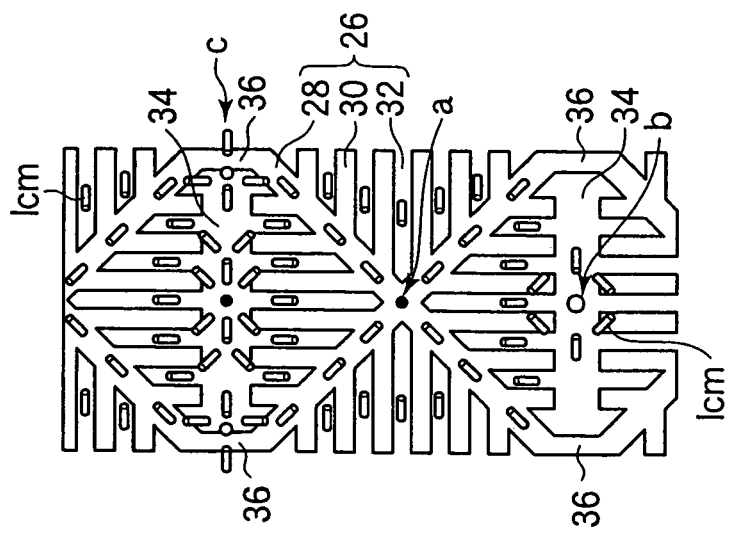

From such a point of view, the stable formation of regions a, b and c as shown in FIGS. 33A to 33D may be achieved in configurations as shown in FIG. 34A to 34C. In the configuration shown in FIG. 34A, a region a having a singular point with strength s=+1 is formed at the intersection of crossed trunk sections 28 of an electrode unit 26; a region c having singular points with strength s=−1, +1 and −1 which line up in that order of strength is formed at a slit 34 in an upper part of the figure; and a region b having a singular point with strength s=−1 is formed at a slit 34 in a lower part of the figure. In the configuration shown in FIG. 34B, a region a having a singular point with strength s=+1 is formed at the intersection of crossed trunk sections 28 of an electrode unit 26, and a region b having a singular point with strength s=−1 is formed at both of upper and lower slits 34 in the figure. Further, in the configuration shown in FIG. 34C, a region a having a singular point with strength s=+1 is formed at the intersection of crossed trunk sections 28 of an electrode unit 26, and a region c having singular points with strength s=−1, +1 and −1 which line up in that order of strength is formed at both of upper and lower slits 34 in the figure.

A singular point control section for fixing singular points must be provided to prevent the singular points from moving away the respective positions shown in FIGS. 34A to 34C. Structures for the singular point control section and positions to provide the same will be described later with reference to specific embodiments. A significant movement of a singular point can be suppressed even in the presence of a shock caused by a press with a finger by providing the singular point control section. Further, domain boundaries will be formed with stability, which makes it possible to prevent domains from being coupled with each other across domain boundaries. Thus, significant turbulences in alignment of a liquid crystal can be reduced to mitigate irregularities in display.

Figure 35A:
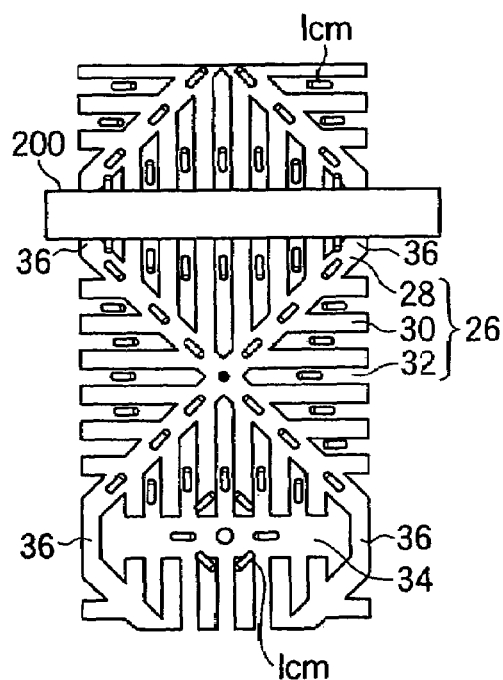
FIGS. 35A and 35B show configurations of a substrate for a liquid crystal display in the third mode for carrying out the invention.
Figure 35B:
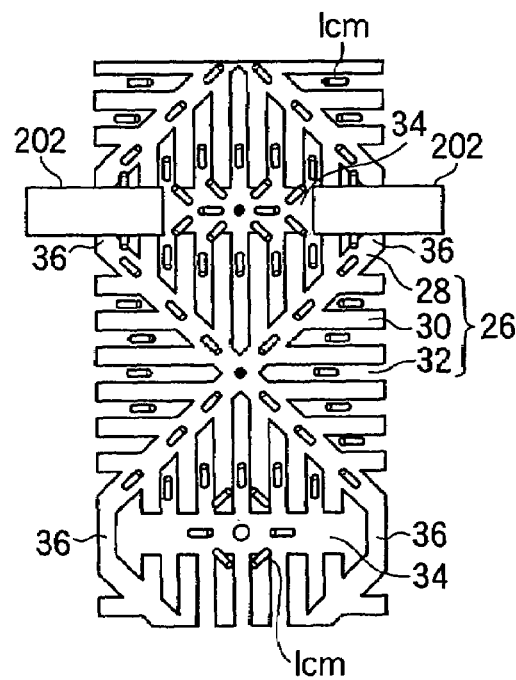

FIGS. 35A and 35B show a second principle behind alignment stabilization in the present mode for carrying out the invention. According to the principle, a linear vertical alignment control section 200 for vertically and linearly aligning liquid crystal molecules 1 cm is provided in a predetermined position of a boundary between liquid crystal domains, as shown in FIG. 35A. Further, a linear vertical alignment control section 202 for vertically and linearly aligning liquid crystal molecules 1 cm is provided in a predetermined position of a boundary between liquid crystal domains, as shown in FIG. 35B. Both of the vertical alignment control sections 200 and 202 have the same effect as that of the singular point control section described above in relation to the first principle, and they can prevent domains from being coupled with each other across boundaries to suppress significant turbulences in alignment of a liquid crystal and to thereby mitigate irregularities in display. Liquid crystal molecules are vertically aligned at a singular point, and the singular point control section may therefore be regarded as a vertical alignment control section in a broader sense.

In order to achieve more stable alignment, the linear vertical alignment control sections 200 and 202 according to the second principle are more effective than the method of control according to the first principle in which singular points are controlled primarily on a point-by-point basis. The reason is that linear control makes it possible to suppress coupling of liquid crystal domains over a wider range than the control on a point-by-point basis. Since a vertically aligned region under control appears as black display, a reduction in luminance occurs when a great number of regions are occupied by the vertical alignment control sections 200 or 202. Therefore, singular point control on a point-by-point basis according to the first principle is preferred when priority is given to luminance.

A substrate for a liquid crystal display and a liquid crystal display having the same in the present mode for carrying out the invention will now be specifically described with reference to Embodiments 3-1 to 3-11.

Embodiment 3-1

Figure 36A:
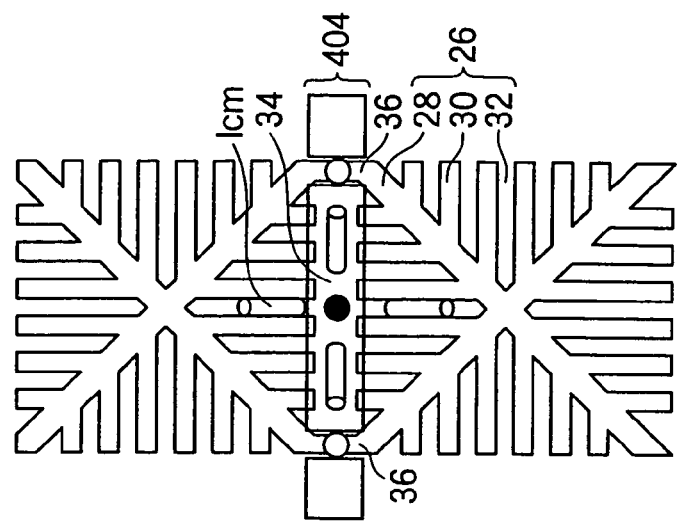
FIGS. 36A to 36C show configurations of a substrate for a liquid crystal display according to Embodiment 3-1 in the third mode for carrying out the invention.
Figure 36B:
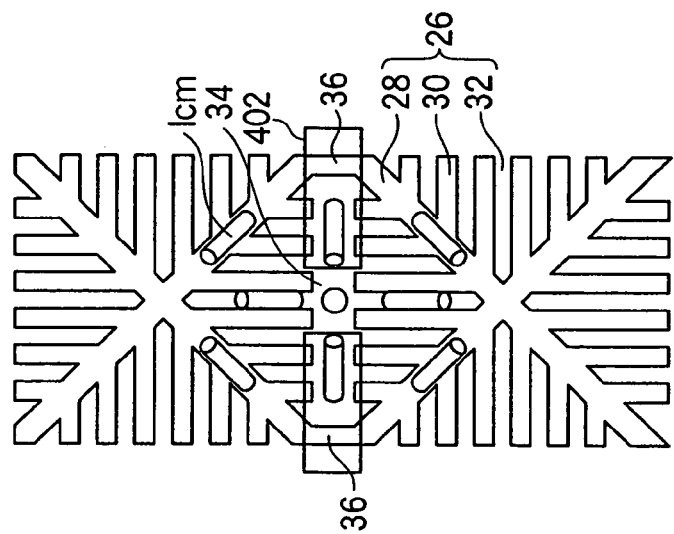
Figure 36C:
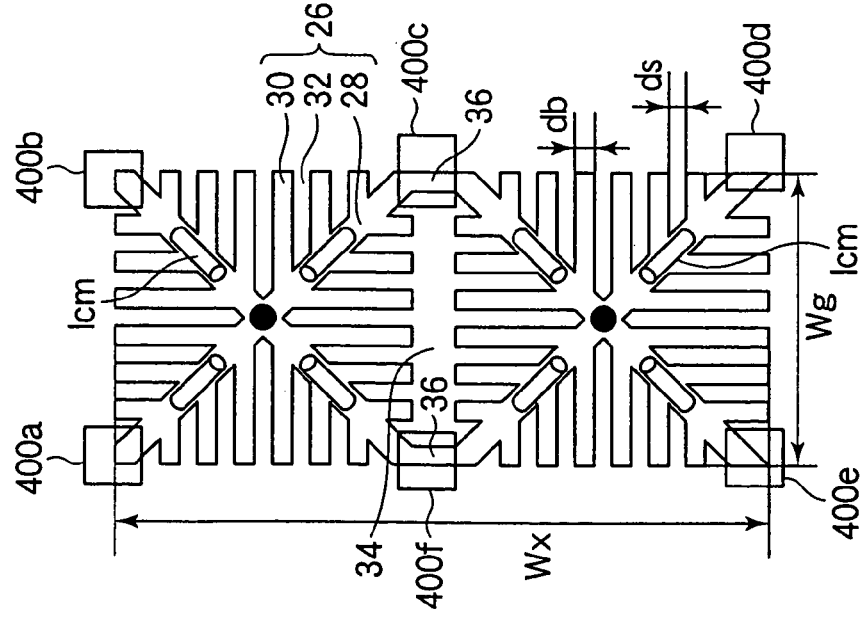

Embodiment 3-1 will now be described with reference to FIGS. 36A to 36C. In the present embodiment, as shown in FIGS. 36A to 36C, singular point control sections 400a to 400f, 402 and 404 as described in relation to the first principle were formed on a TFT substrate 2 on which pixel electrodes 16 were formed. In the example of arrangement shown in FIG. 36A, the singular point control sections 400a to 400f are formed as insulating convex structures having a substantially square bottom configuration on vertices of the circumference of each electrode unit 26 and on connection electrodes 36. By arranging the singular point control sections 400a to 400f in such a manner, singular points with strength s=+1 (regions a) can be provided at the intersection of the crossed trunk sections 28 of the electrode units 26.

In the example of arrangement shown in FIG. 36B, the singular point control section 402 is formed as an insulating convex structure above a slit 34 between electrode units 26, the structure having a substantially rectangular bottom configuration whose longitudinal direction is in alignment with the longitudinal direction of the slit 34. The singular point control section (convex structure) 402 has a linear convex configuration that is discontinuous in the middle thereof. A singular point with strength s=−1 (a region b) can be provided substantially in the middle of the slit 34 between the electrode units 26 by providing the singular point control section 402.

In the example of arrangement shown in FIG. 36C, the singular point control section 404 is formed as an insulating convex structure above a slit 34 between electrode units 26, the structure having a substantially rectangular bottom configuration whose longitudinal direction is in alignment with the longitudinal direction of the slit 34. The singular point control section (convex structure) 404 has a linear convex configuration that is discontinuous above two connection electrodes 36. Singular points with strength s=−1, +1 and −1 that line up in that order of strength (a region c) can be provided at the slit 34 between the electrode units 26 by providing the singular point control section 404.

A method of manufacturing an LCD according to the present embodiment will now be briefly described.

A substrate OA-2 having a thickness of 0.7 mm (manufactured by Nippon Electric Glass Co., Ltd.) is used as a TFT substrate 2, the substrate being a substrate for a liquid crystal display as shown in FIGS. 1 and 2 similar to those described in the first and second modes for carrying out the invention. Although not shown in FIGS. 36A to 36C, TFTs 10 and bus lines 12 and 14 are formed in addition to pixel electrodes 16 on the TFT substrate 2. A pixel electrode 16 is configured by combining a plurality of electrode units 26 similar to that shown in FIG. 26A. Trunk sections 30 of the electrode unit 26 have a width db of 3 μm, and spaces 32 of the same have a width ds of 3 μm. The layout of the pixel electrodes comprised of a plurality of electrode units, the TFTs and the bus lines is similar to that shown in FIG. 30. Specifically, while FIGS. 36A to 36C show examples in which two electrode units are provided, three electrode units were provided in one pixel on the actual TFT substrate.

A photosensitive resin was applied to the TFT substrate 2 which was then patterned using a photolithographic process, and insulating convex sections to become singular point control sections 400a to 400f, 402 and 404 were formed in respective positions as shown in FIGS. 36A to 36C. An acryl type material manufactured by JSR was used as the photosensitive resin material. The bottoms of the singular point control sections 400a to 400f are in the form of a square which is 10 μm in the vertical and horizontal directions. The bottom of the singular point control section 402 is in the form of two rectangles each of which is 10 μm and 30 μm in the vertical and horizontal directions, respectively. Referring to the configuration of the bottom of the singular point control section 404, it has square configurations which are 10 μm in the vertical and horizontal directions on both sides thereof and has a rectangular configuration which is 10 μm and 40 μm in the vertical and horizontal directions respectively in the middle thereof. Any of the convex sections has a height of about 1.5 μm.

An opposite electrode is formed on an opposite substrate. Color filters may be provided on either substrate. Next, vertical alignment films were applied to the TFT substrate and the opposite substrate. A polyimide material manufactured by JSR may be used as the material of the alignment films. Next, the substrates were combined with spacers interposed therebetween to fabricate an open cell. Resin spacers manufactured by Sumitomo Fine Chemicals Co., Ltd were used as the spacers. The spacers had a diameter of 4 μm. The function of the spacers can be provided by forming protrusions having a height equivalent to the cell gap using the material from which the singular point control sections are formed. This eliminates a need for dispersing bead spacers or forming resin spacers separately.

A liquid crystal was injected into the open cell using a vacuum injection process. The liquid crystal material used was a material having negative dielectric anisotropy manufactured by Merck Japan Company. A voltage was applied to a panel thus obtained, and the state of alignment of the same was observed. As a result, singular points having strength s=+1 and −1 of alignment vectors had been formed in the positions indicated by dots and circles in the figures, respectively. When the panel was shocked by pressing the same with a finger, although slight changes occurred in the state of liquid crystal domains at the singular points and their neighborhood immediately after the press, the state of alignment before to the press was quickly restored. Then, any irregularity in display was no longer observed.

Embodiment 3-2

Embodiment 3-2 will now be described with reference to FIGS. 37A to 37C. In the present embodiment, as shown in FIGS. 37A, 37B and 37C, singular point control sections 406, 408 and 410 as described in relation to the first principle were formed on an opposite substrate that was provided opposite to a TFT substrate 2. In the example of arrangement shown in FIG. 37A, the singular point control sections 406 are formed as insulating convex structures having a substantially square bottom configuration on the opposite substrate at intersections between trunk sections 28 of electrode units 26. By arranging the singular point control sections 406 in such a manner, singular points with strength s=+1 (regions a) can be provided at the intersection of the crossed trunk sections 28 of the electrode units 26.

In the example of arrangement shown in FIG. 37B, the singular point control section 408 is formed as a square insulating convex structure on the opposite substrate such that it is located in the middle of a slit 34 between electrode units 26. A singular point with strength s=−1 (a region b) can be provided substantially in the middle of the slit 34 between the electrode units 26 by providing the singular point control section 408.

In the example of arrangement shown in FIG. 37C, the singular point control sections 410 are formed as insulating convex structures having a square bottom configuration on the opposite substrate such that they are located above connection electrodes 36 on both sides of a slit 34 between electrode units 26. Singular points with strength s=−1, +1 and −1 that line up in that order of strength (a region c) can be provided at the slit 34 between the electrode units 26 by providing the singular point control section 410.

Each of the singular point control sections 406, 408 and 410 is a square of about 10 μm. Instead of forming the insulating convex sections, electrode blank sections corresponding to the convex patterns may be provided on an opposite electrode.

A voltage was applied to a liquid crystal panel fabricated according to the present embodiment, and the state of alignment of the same was observed. As a result, singular points having strength s=+1 and −1 of alignment vectors had been formed in the positions indicated by dots and circles in the figures, respectively. When the panel was shocked by pressing the same with a finger, although slight changes occurred in the state of liquid crystal domains at the singular points and their neighborhood immediately after the press, the state of alignment before to the press was quickly restored. Then, any irregularity in display was no longer observed.

Figure 38:
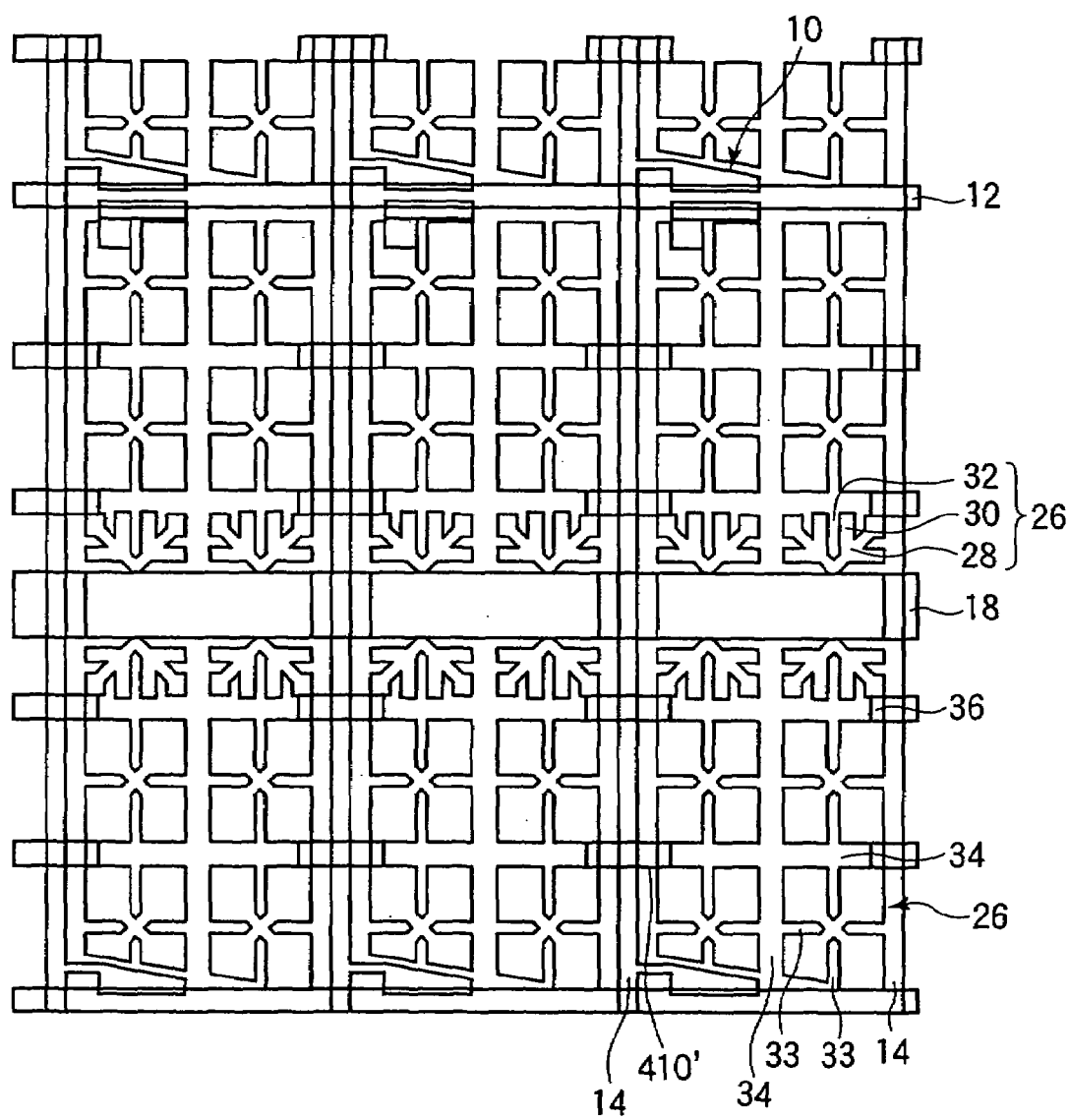
FIG. 38 shows an example of a specific configuration of a substrate for a liquid crystal display according to Embodiment 3-2 in the third mode for carrying out the invention.

FIG. 38 shows a specific example of a configuration according to Embodiment 3-1. FIG. 38 is a plan view showing a configuration of three pixels adjacent to each other in the horizontal direction in the figure and the neighborhood of the same. Each of the pixels has a substantially rectangular outline. Each of the pixels has a pixel electrode 16 in which electrode units 26 are formed in three rows and two columns above and below a storage capacitor bus line 18 that extends through the pixel substantially in the middle thereof. The electrode units 26 in FIG. 38 are a combination of electrode units 26 as shown in FIGS. 13 and 19. Connection electrodes 36 are formed on the side of drain bus lines 14. Singular point control sections 410' constituted by insulating convex structures are formed on the substrate that has the connection electrodes 36. This configuration is equivalent to a configuration provided by removing one side of the structure 402 in FIG. 36B. In such a configuration, it is also possible to provide singular points with strength s=−1 (regions b) substantially in the middle of gaps between the electrode units 26.

Figure 39:
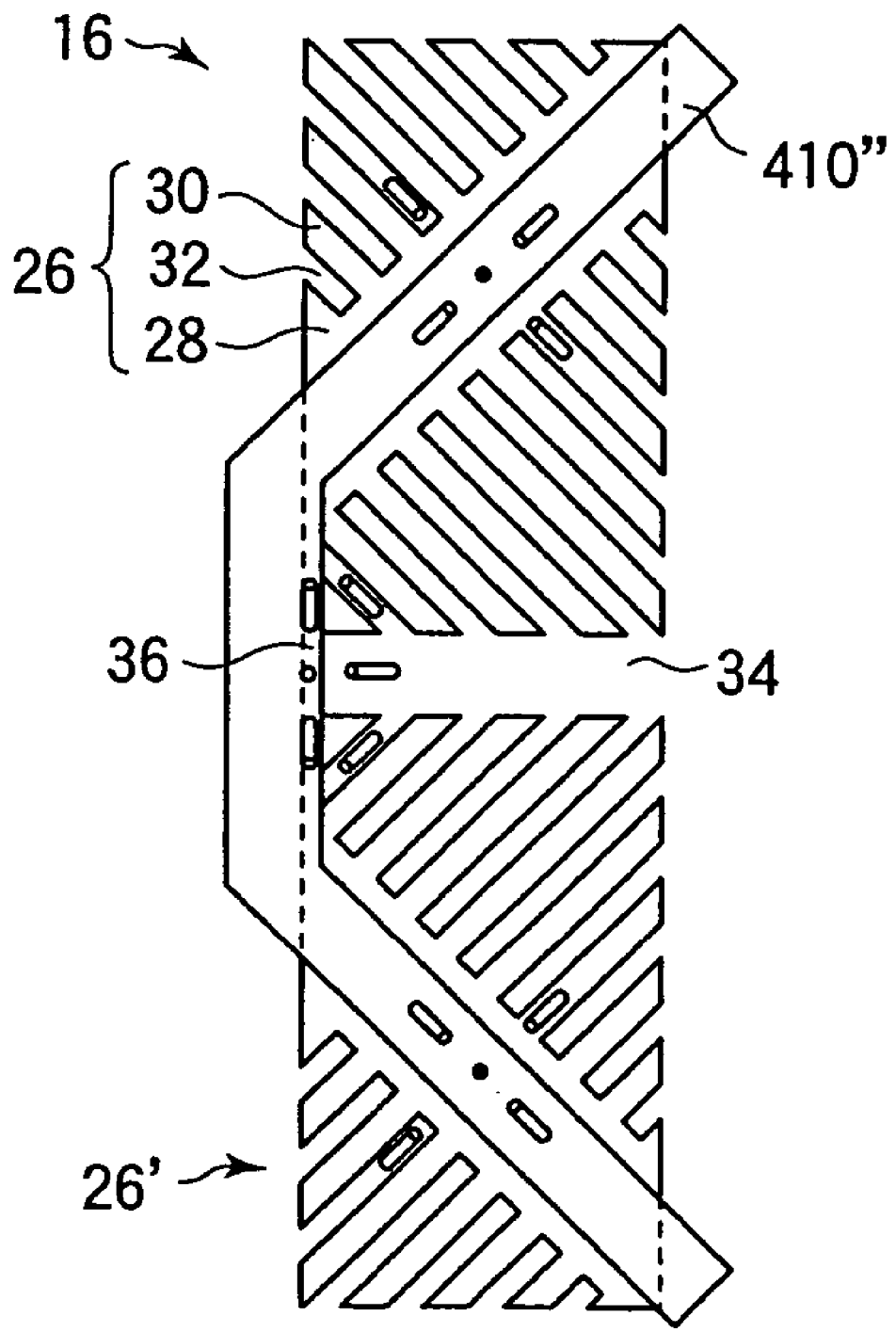
FIG. 39 shows a modification of the configuration of a substrate for a liquid crystal display according to Embodiment 3-2 in the third mode for carrying out the invention.

FIG. 39 shows another modification of the present embodiment. The pixel shown in FIG. 39 has electrode units 26 and 26' which are line-symmetrically configured about a slit 34 located substantially in the middle of them. On the left side of the slit 34 in the figure, a connection electrode 36 is formed to connect the electrode units 26 and 26'. A singular point control section 410" constituted by an insulating convex structure is formed on an opposite substrate in association with trunk sections 28 and the connection electrode 36. In such a configuration, it is also possible to provide a singular point with strength s=−1 (a region b) above the connection electrode 36 at the slit 34 between the electrode units 26 and 26' and to provide singular points with strength s=+1 within the ranges where the structure traverses the electrodes (the ranges where the structure diagonally traverses in FIG. 39).

Embodiment 3-3

Embodiment 3-3 will now be described with reference to FIGS. 40A to 40C. In the present embodiment, as shown in FIGS. 40A, 40B and 40C, singular point control sections 412, 414 and 416 constituted by conductive convex structures were formed on a TFT substrate. In the example of arrangement shown in FIG. 40A, an insulating convex structure having a substantially square bottom configuration are formed under an intersection of trunk sections 28 of each electrode unit 26. A photosensitive material similar to that in Embodiment 3-1 is used for the insulating convex structure. Alternatively, the insulating convex structure can be formed by selectively leaving an insulation layer or wiring layer that has been formed on the TFT substrate for forming TFTs in the position where the convex section is to be formed. Thus, there is formed singular point control sections 412 constituted by conductive convex structures which protrude at the intersections of the electrode trunk sections 28. By arranging the singular point control sections 412 in such a manner, singular points with strength s=+1 (regions a) can be provided at the intersection of the crossed trunk sections 28 of the electrode units 26.

In the example of arrangement shown in FIG. 40B, the singular point control section 414 is located on a TFT substrate. An insulating convex structure having a substantially square bottom configuration is formed under a central portion of a slit 34 between electrode units 26., thereby forming the singular point control section 414 into which electrode branch sections 30 in the vicinity of the slit 34 protrude. A singular point with strength s=−1 (a region b) can be provided substantially in the middle of the slit 34 between the electrode units 26 by providing the singular point control section 414.

In the example of arrangement shown in FIG. 40C, the singular point control sections 416 are located on a TFT substrate. Insulating convex structures having a substantially square bottom configuration are formed under connection electrodes 36, 36 on both sides of a slit 34 between electrode units 26, thereby forming the singular point control sections 416 into which the connection electrodes 36 protrude. Singular points with strength s=−1, +1 and −1 that line up in that order of strength (a region c) can be provided at the slit 34 between the electrode units 26 by providing the singular point control sections 416.

Each of the singular point control sections 412, 414 and 416 is a square of about 10 μm, and they have a height of about 1.5 μm.

A voltage was applied to a liquid crystal panel fabricated according to the present embodiment, and the state of alignment of the same was observed. As a result, singular points having strength s=+1 and −1 of alignment vectors had been formed in the positions indicated by dots and circles in the figures, respectively. When the panel was shocked by pressing the same with a finger, although slight changes occurred in the state of liquid crystal domains at the singular points and their neighborhood immediately after the press, the state of alignment before to the press was quickly restored. Then, any irregularity in display was no longer observed.

Embodiment 3-4

Figure 41C:
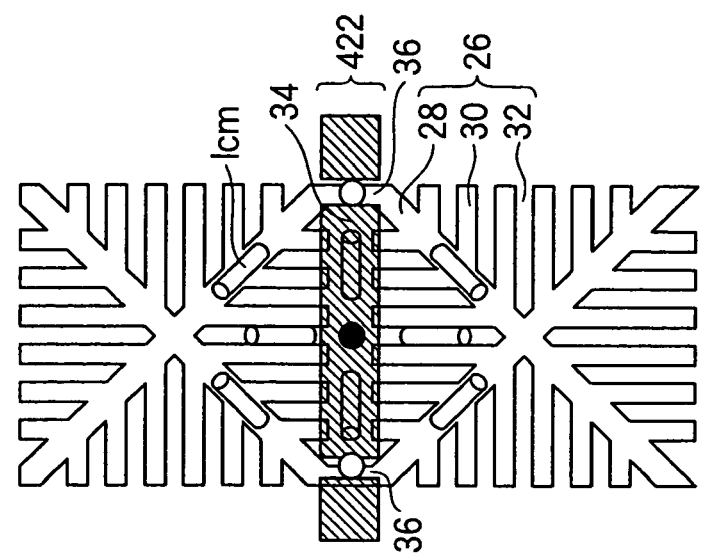
FIGS. 41A to 41C show configurations of a substrate for a liquid crystal display according to Embodiment 3-4 in the third mode for carrying out the invention.
Figure 41B:
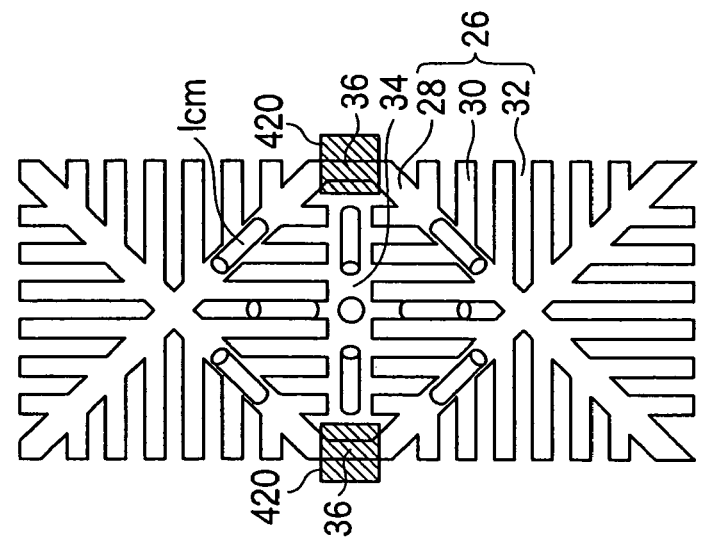
Figure 41A:
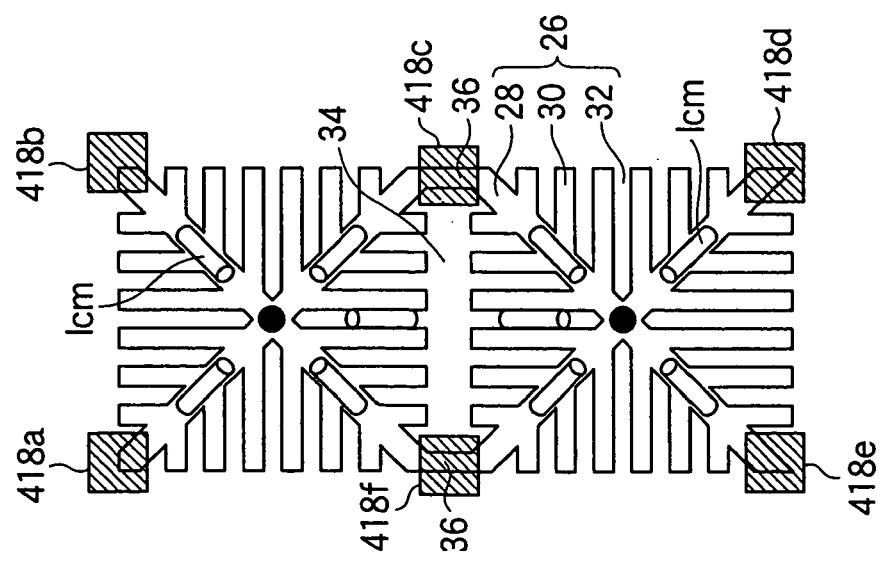

Embodiment 3-4 will now be described with reference to FIGS. 41A to 41C. In the present embodiment, as shown in FIGS. 41A, 41B and 41C, singular point control sections 418a to 418f, 420 and 422 constituted by conductive convex structures were formed on an opposite substrate. In the example of arrangement shown in FIG. 41A, the singular point control sections 418a to 418f are formed by forming insulating convex structures having a substantially square bottom configuration (with an area of about 10 m square and a height of about 1.5 μm) under an opposite electrode in positions opposite to vertices of the circumference of electrode units 26 and connection electrodes 36. A photosensitive material similar to that in embodiment 3-1 is used for the insulating convex structures. This forms conductive convex structures into which the opposite electrode protrudes. The conductive convex structures are provided as the singular point control sections 418a to 418f, which makes it possible to provide singular points with strength s=+1 (regions a) at the intersections of the crossed trunk sections 28 of the electrode units 26.

In the example of arrangement shown in FIG. 41B, the singular point control sections 420 are formed as conductive convex structures having a square bottom configuration (with an area of about 10 μm square and a height of about 1.5 μm) in respective positions opposite to two connection electrodes 36 on both sides of a slit 34. A singular point with strength s=−1 (a region b) can be provided substantially in the middle of the slit 34 between the electrode units 26 by providing the singular point control sections 420.

In the example of arrangement shown in FIG. 41C, the singular point control section 422 is formed as a rectangular conductive convex structure (which has side portions of about 10 μm square and a central portion of 10 μm×40 μm and which has a height of about 1.5 μm) on an opposite substrate above a slit 34 between electrode units 26, the longitudinal direction of the bottom of the structure being aligned with the longitudinal direction of the slit 34. The singular point control section 422 is in the form of a linear protrusion that is discontinuous in positions opposite to two connection electrodes 36. Singular points with strength s=−1, +1 and −1 that line up in that order of strength (a region c) can be provided at the slit 34 between the electrode units 26 by providing the singular point control section 422.

A voltage was applied to a liquid crystal panel thus obtained, and the state of alignment of the same was observed. As a result, singular points having strength s=+1 and −1 of alignment vectors had been formed in the positions indicated by dots and circles in the figures, respectively. When the panel was shocked by pressing the same with a finger, although slight changes occurred in the state of liquid crystal domains at the singular points and their neighborhood immediately after the press, the state of alignment before to the press was quickly restored. Then, any irregularity in display was no longer observed.

Embodiment 3-5

Figure 42A:
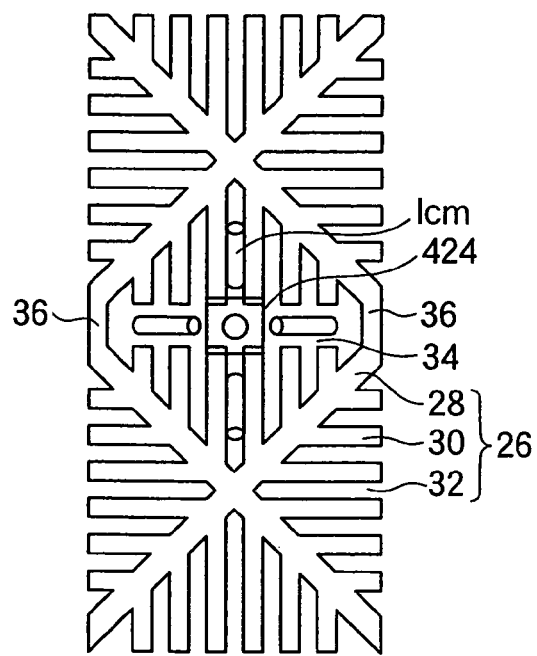
FIGS. 42A and 42B show configurations of a substrate for a liquid crystal display according to Embodiment 3-5 in the third mode for carrying out the invention.
Figure 42B:
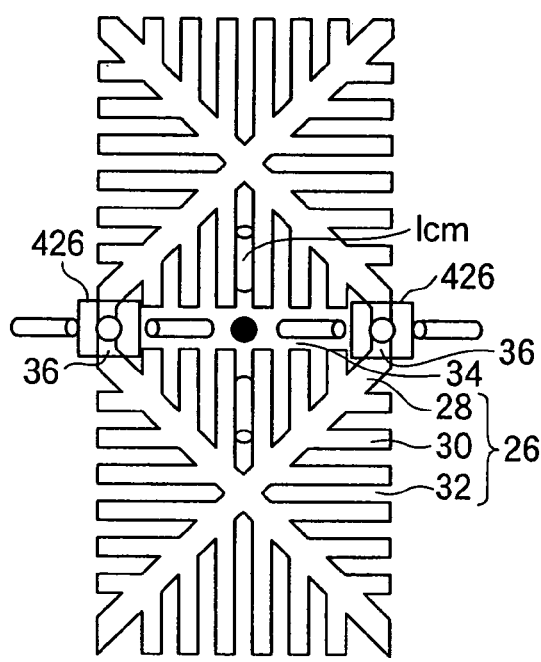

Embodiment 3-5 will now be described with reference to FIGS. 42A and 42B. In the present embodiment, as shown in FIGS. 42A and 42B, singular point control sections 424 and 426 constituted by insulating concave structures were formed on a TFT substrate. In the example of arrangement shown in FIG. 42A, the singular point control section 424 is formed substantially in the middle of a slit 34 as a concave structure having a square bottom configuration (with an area of about 10 μm square and a depth of about 1 μm). A singular point with strength s=−1 (a region b) can be provided substantially in the middle of a slit 34 between electrode units 26 by providing the singular point control section 424.

In the example of arrangement shown in FIG. 42B, the singular point control sections 426 are formed under connection electrodes 36 as concave structures having a square bottom configuration (with an area of about 10 μm square and a depth of about 1 μm). Singular points with strength s=−1, +1 and −1 that line up in that order of strength (a region c) can be provided at a slit 34 between electrode units 26 by providing the singular point control sections 426.

The concave sections were provided by applying the above-described photosensitive material to the entire surface of the substrate and thereafter removing the photosensitive material only from the locations to become the concave sections. Alternatively, the concave sections may be provided by forming holes in an insulation layer or wiring layer formed when TFTs are formed on the substrate.

A voltage was applied to a liquid crystal panel thus obtained, and the state of alignment of the same was observed. As a result, singular points having strength s=+1 and −1 of alignment vectors had been formed in the positions indicated by dots and circles in the figures, respectively. When the panel was shocked by pressing the same with a finger, although slight changes occurred in the state of liquid crystal domains at the singular points and their neighborhood immediately after the press, the state of alignment before to the press was quickly restored. Then, any irregularity in display was no longer observed.

Embodiment 3-6

Embodiment 3-6 will now be described with reference to FIGS. 43A to 43C. In the present embodiment, as shown in FIGS. 43A, 43B and 43C, singular point control sections 428a to 428f, 430 and 432 constituted by conductive concave structures were formed on a TFT substrate. In the example of arrangement shown in FIG. 43A, the singular point control sections 428a to 428f are formed as conductive concave structures having a square bottom configuration (with an area of about 10 μm square and a depth of about 1 μm) under vertices of the circumference of electrode units 26 and connection electrodes 36, respectively. Singular points with strength s=+1 (regions a) can be provided at the intersections of crossed trunk sections 28 of the electrode units 26 by providing the singular point control sections 428a to 428f.

In the example of arrangement shown in FIG. 43B, the singular point control section 430 is formed as a rectangular conductive concave structure (which has side portions of about 10 μm square and a central portion of 10 μm×40 μm and which has a depth of about 1 μm) above a slit 34 between electrode units 26, the longitudinal direction of the bottom of the structure being aligned with the longitudinal direction of the slit 34. The singular point control section 430 has a linear configuration that is discontinuous in the middle thereof.

A singular point with strength s=−1 (a region b) can be provided substantially in the middle of the slit 34 between the electrode units 26 by providing the singular point control section 430.

In the example of arrangement shown in FIG. 43C, the singular point control section 432 is formed as a rectangular conductive concave structure above a slit 34 between electrode units 26, the longitudinal direction of the bottom of the structure being aligned with the longitudinal direction of the slit 34. The singular point control section 432 has a linear configuration that is discontinuous above two connection electrodes 36. Singular points with strength s=−1, +1 and −1 that line up in that order of strength (a region c) can be provided at the slit 34 between the electrode units 26 by providing the singular point control section 432.

The concave sections were provided by applying the above-described photosensitive material to the entire surface of the substrate and thereafter removing the photosensitive material only from the locations to become the concave sections. Alternatively, the concave sections may be provided by forming holes in an insulation layer or wiring layer formed when TFTs are formed on the substrate.

A voltage was applied to a liquid crystal panel thus obtained, and the state of alignment of the same was observed. As a result, singular points having strength s=+1 and −1 of alignment vectors had been formed in the positions indicated by dots and circles in the figures, respectively. When the panel was shocked by pressing the same with a finger, although slight changes occurred in the state of liquid crystal domains at the singular points and their neighborhood immediately after the press, the state of alignment before to the press was quickly restored. Then, any irregularity in display was no longer observed.

Embodiment 3-7

Figure 44C:
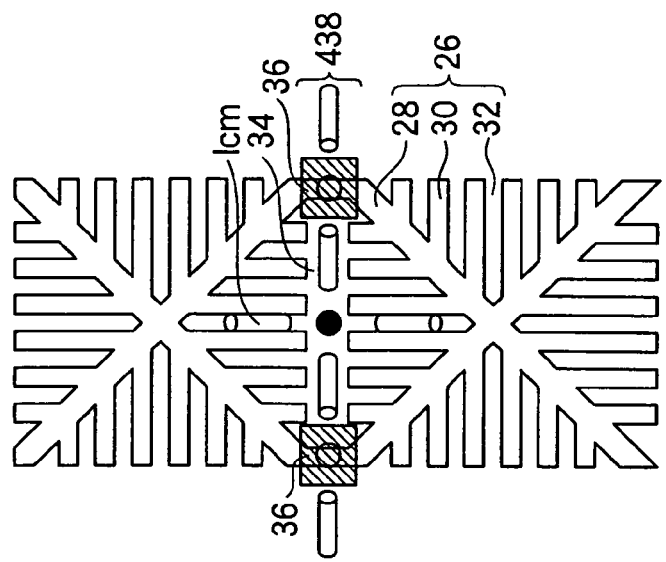
FIGS. 44A to 44C show configurations of a substrate for a liquid crystal display according to Embodiment 3-7 in the third mode for carrying out the invention.
Figure 44B:
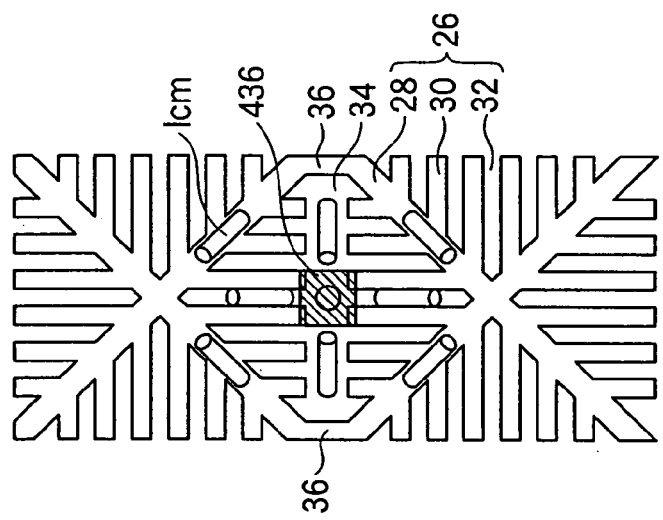
Figure 44A:
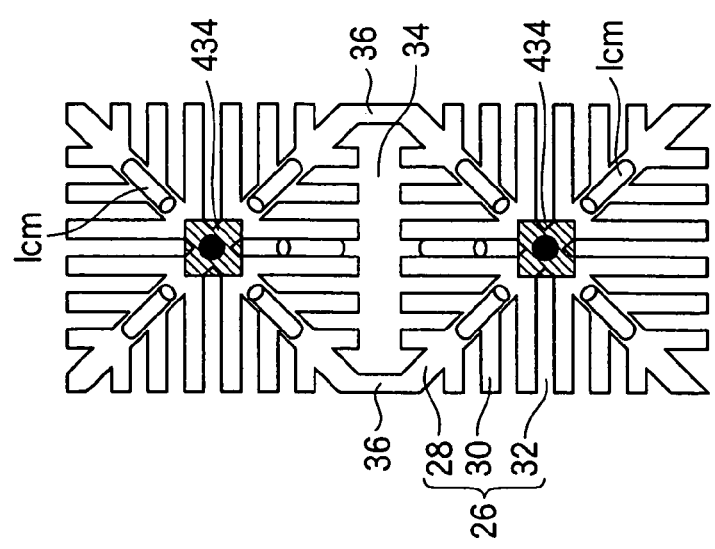

Embodiment 3-7 will now be described with reference to FIGS. 44A to 44C. In the present embodiment, as shown in FIGS. 44A, 44B and 44C, singular point control sections 434, 436 and 438 as described in relation to the first principle were formed on an opposite substrate provided in a face-to-face relationship with a TFT substrate. In the example of arrangement shown in FIG. 44A, the singular point control sections 434 are formed as conductive concave structures having a substantially square bottom configuration on the opposite substrate at intersections between trunk sections 28 of electrode units 26. Singular points with strength s=+1 (a region a) can be provided at the intersections between the crossed trunk sections 28 of the electrode units 26 by providing the singular point control sections 434 in such a manner.

In the example of arrangement shown in FIG. 44B, the singular point control section 436 is formed as a conductive concave structure having a square configuration such that it is located on an opposite substrate and in the middle of a slit 34 between electrode units 26. A singular point with strength s=−1 (a region b) can be provided substantially in the middle of the slit 34 between the electrode units 26 by providing the singular point control section 436.

In the example of arrangement shown in FIG. 44C, the singular point control sections 438 are formed as conductive concave structures having a square bottom configuration such that they are located above connection electrodes 36 on both sides of a slit 34 between electrode units 26. Singular points with strength s=−1, +1 and −1 that line up in that order of strength (a region c) can be provided at the slit 34 between the electrode units 26 by providing the singular point control sections 438.

The concave sections were provided by applying the above-described photosensitive material to the entire surface of the substrate and thereafter removing the photosensitive material only from the locations to become the concave sections. Further, the conductive concave sections were obtained by forming the opposite substrate above the concave sections. The concave sections were squares of 10 μm, and they had a depth of 1 μm.

A voltage was applied to a liquid crystal panel fabricated according to the present embodiment, and the state of alignment of the same was observed. As a result, singular points having strength s=+1 and −1 of alignment vectors had been formed in the positions indicated by dots and circles in the figures, respectively. When the panel was shocked by pressing the same with a finger, although slight changes occurred in the state of liquid crystal domains at the singular points and their neighborhood immediately after the press, the state of alignment before to the press was quickly restored. Then, any irregularity in display was no longer observed.

Embodiment 3-8

Figure 45A:
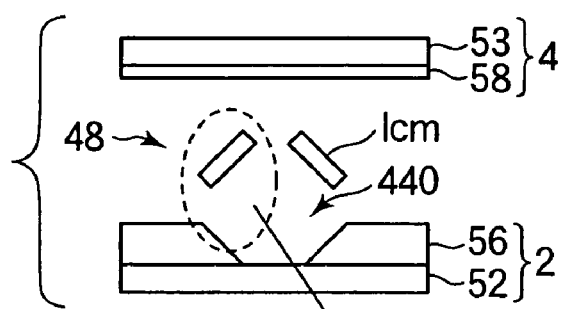
FIGS. 45A to 45C are sectional views showing configurations of a substrate for a liquid crystal display according to Embodiment 3-8 in the third mode for carrying out the invention.
Figure 45B:
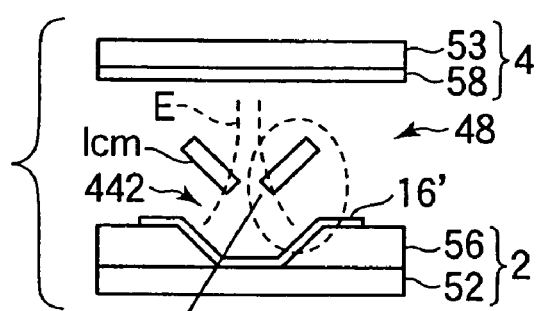
Figure 45C:
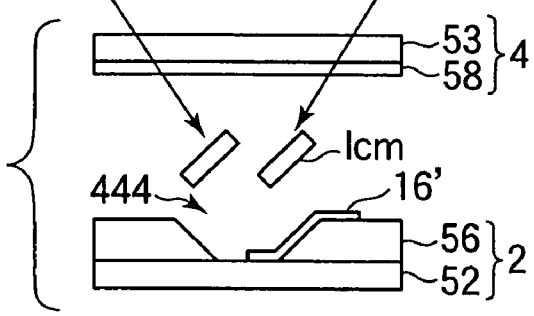

Embodiment 3-8 will now be described with reference to FIGS. 45A to 45D. A singular point control section in the present embodiment is characterized in that it is a concave or convex structure comprised of both of a portion having insulating properties and a portion having conductivity. FIGS. 45A to 45C show examples of such a feature. FIGS. 45A to 45C schematically show sections of an LCD panel taken vertically to the substrate surfaces. FIG. 45A shows a state in which a liquid crystal layer 48 is sealed between a TFT substrate 2 that is a glass substrate 52 having a protective film 56 formed thereon and a CF substrate 4 that is a glass substrate 53 having a common electrode 58 formed thereon.

A singular point control section 440 that is an insulating concave structure is formed in the protective film 56 on the TFT substrate 2. Vertical alignment films that are not shown are formed on the sides of the substrates 2 and 4 facing the liquid crystal layer 48. Therefore, liquid crystal molecules 1 cm above the singular point control section 440 are slightly tilted such that they converge toward the CF substrate 4 according to the concave configuration of the singular point control section 440 even when no voltage is applied, and they are tilted further in the same tilting direction when a voltage is applied.

Referring to FIG. 45B, a singular point control section 442 that is a conductive concave structure is formed in a protective film 56 on a TFT substrate 2, a conductive film 16' that is a part of a pixel electrode 16 being formed on the same. When a voltage is applied, since an electric line of force E having a shape as shown is generated, liquid crystal molecules 1 cm above the singular point control section 442 are tilted such that they spread toward a CF substrate 4.

FIG. 45C shows control carried out by combining the insulating concave section and the conductive concave section. As shown in FIGS. 45A and 45B, a singular point is formed above either of the insulating and conductive concave sections, and liquid crystal molecules 1 cm are aligned about the singular point. However, the insulating concave section and the conductive concave section control the alignment in opposite directions. When a singular point control section 444 having the conductive film 16' on only one half of a concave section thereof is formed as shown in FIG. 45C, liquid crystal molecules 1 cm can be controlled in one direction with the concave section.

Figure 46A:
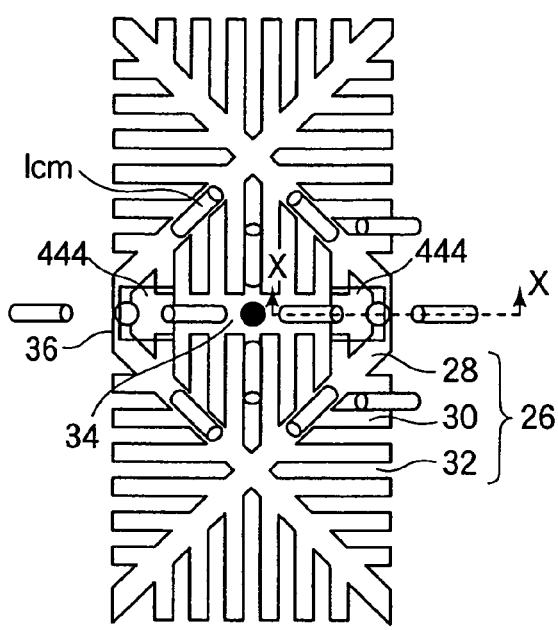
FIGS. 46A to 46D show configurations of a substrate for a liquid crystal display according to Embodiment 3-8 in the third mode for carrying out the invention.
Figure 46B:
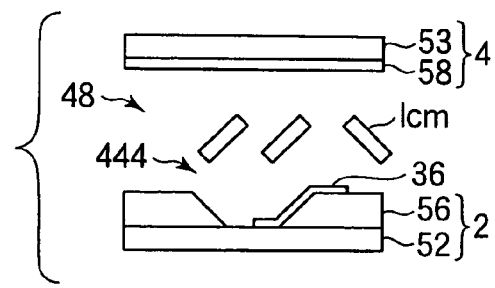

FIGS. 46A to 46D show applications of singular point control sections 444 as shown in FIG. 45C to actual electrode units 26. In an example that is shown in FIG. 46A and FIG. 46B showing a section taken along the line X-X in FIG. 46A, singular point control sections 444 are formed as concave structures having a square bottom configuration (with an area of about 10 μm square and a depth of about 1 μm) that are provided such that the right half of the concave sections (that is located outwardly of the pixel than the center of the concave section) is substantially covered by connection electrodes 36. By providing the singular point control sections 444 in such a manner, singular points with strength s=−1 are formed above the connection electrodes 36 without fail. Therefore, singular points that line up in the order of their strength s=−1, +1 and −1 (a region c) can be provided at a slit 34 between electrode units 26.

Figure 46C:
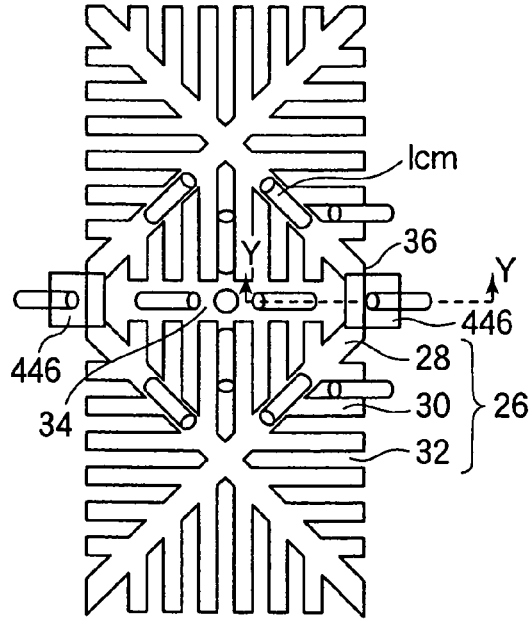
Figure 46D:
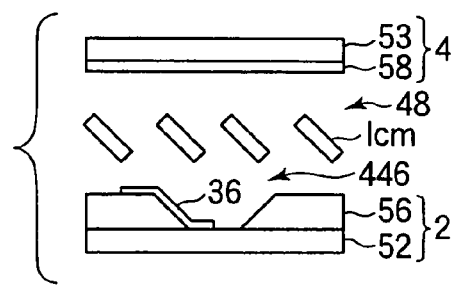

In an example that is shown in FIG. 46C and FIG. 46D showing a section taken along the line Y-Y in FIG. 46C, singular point control sections 446 are formed as concave structures having a square bottom configuration (with an area of about 10 μm square and a depth of about 1 μm) that are provided such that the left half of the concave sections (that is located inwardly of the pixel than the center of the concave section) is substantially covered by connection electrodes 36. By providing the singular point control sections 446 in such a manner, a singular point with strength s=−1 (a region b) can be fixed substantially in the middle of a slit 34 without forming singular points above the connection electrodes 36.

Embodiment 3-9

Figure 47A:
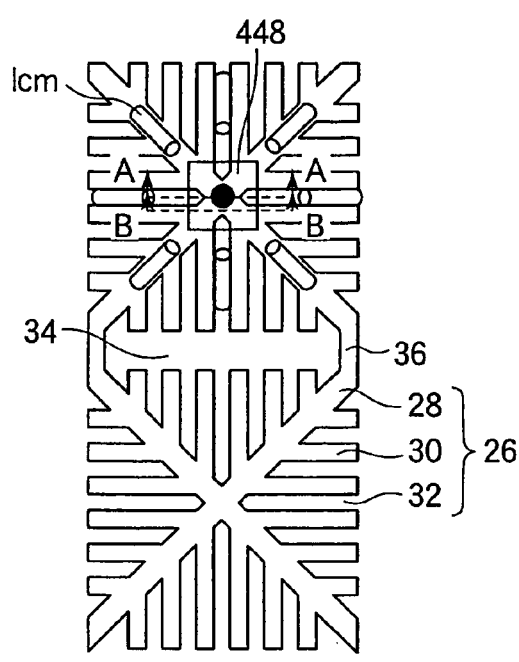
FIGS. 47A to 47C show configurations of a substrate for a liquid crystal display according to Embodiment 3-9 in the third mode for carrying out the invention.
Figure 47B:
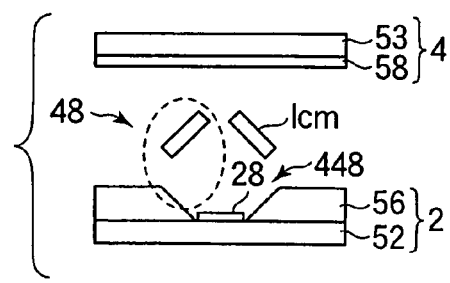
Figure 47C:
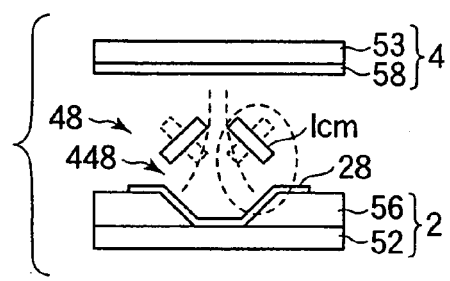

Embodiment 3-9 will now be described with reference to FIGS. 47A to 47C. FIG. 47A shows a state of a substrate surface as viewed in a direction normal to the same; FIG. 47B shows a section taken along the line A-A in FIG. 47A; and FIG. 47C shows a section taken along the line B-B in FIG. 47A. As shown in FIGS. 47A to 47C, a singular point control section 448 of the present embodiment is a single concave pattern that has both of a portion having insulating properties and a portion having conductivity. In a region where branch sections (groups of fine electrode patterns) 30 extending in the vertical and horizontal direction are connected to each other through trunk sections (X-shaped electrodes) 28, a concave section is provided in the middle of the character X. As a result, the concave section has both of a portion having insulating properties and a portion having conductivity, as shown in FIGS. 47B and 47C. While a concave section having conductivity and a concave section having insulating properties inherently control alignment in opposite directions as shown in FIGS. 45A and 45B, the concave section of the present embodiment follows alignment control exterted by a concave section having insulating properties and exhibits the state of alignment of a singular point with strength s=+1 (a region a). This is considered attributable to that fact that the section is inherently stable in the state of alignment of a region a and that a conductive concave or convex feature tends to exert weaker control than a concave or convex feature having insulating properties when they have the same width and height.

Embodiment 3-10

Figure 48:
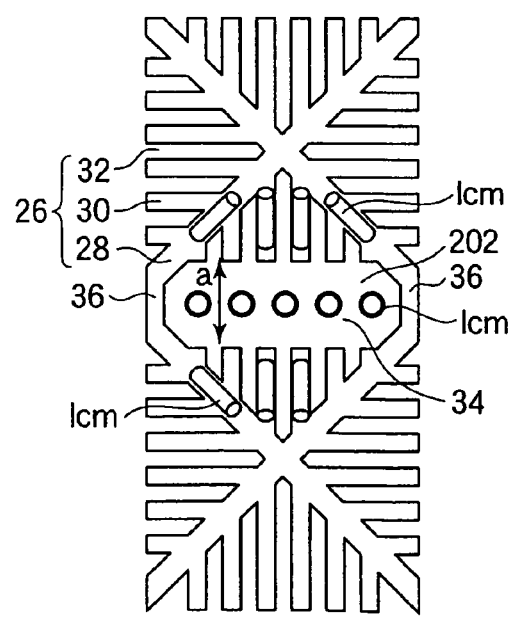
FIG. 48 shows a configuration of a substrate for a liquid crystal display according to Embodiment 3-10 in the third mode for carrying out the invention.

Embodiment 3-10 will now be described with reference to FIG. 48. The present embodiment adopts the second principle of alignment stabilization described with reference to FIGS. 35A and 35B. As shown in FIG. 48, neither convex section nor concave section was formed, and there was formed a vertical alignment control section 202 having an electrode blank section that was formed by providing a slit 34 having a great width (a blank width a) between electrode units 26. As a result, liquid crystal molecules 1 cm were linearly and vertically aligned with the slit 34 with stability.

When the panel was shocked by pressing the same with a finger, although slight changes occurred in the state of liquid crystal domains at the vertical alignment control section 202 and its neighborhood immediately after the press, the state of alignment before to the press was quickly restored. Then, any irregularity in display was no longer observed. While it preferred that the vertical alignment control section 202 has a great width a, transmittance is reduced when it is too great. The width is at least greater than the cell thickness and is preferably twice the cell thickness or more. In this case, the blank width a of the vertical alignment control section 202 was 12 μm while the cell thickness was 4 μm. A blank width a in the range from 4 to 6 μm resulted in irregularities of display when the panel was pressed with a finger and resulted in an unstable state of alignment.

Embodiment 3-11

Figure 49A:
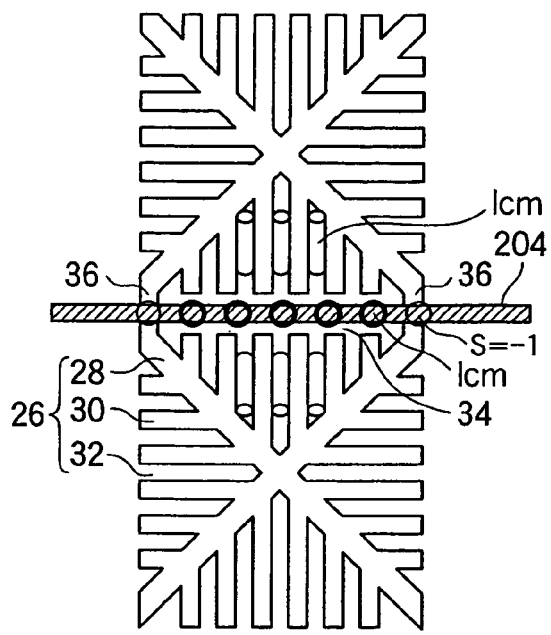
FIGS. 49A and 49B show configurations of a substrate for a liquid crystal display according to Embodiment 3-11 in the third mode for carrying out the invention.
Figure 49B:
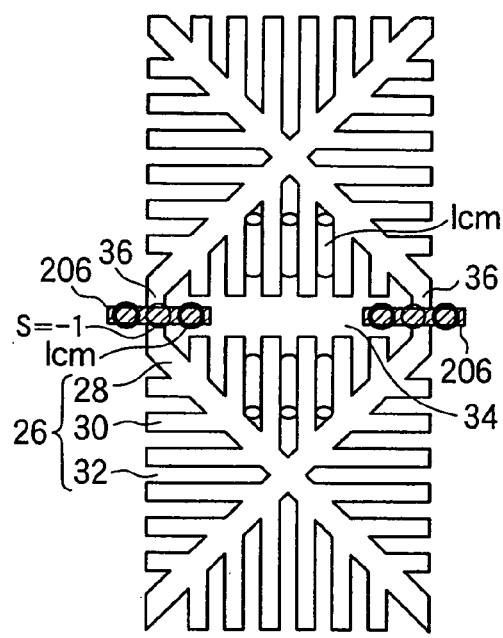

Embodiment 3-11 will now be described with reference to FIGS. 49A and 49B. The present embodiment also adopts the second principle. Neither convex section nor concave section was formed, and a vertical alignment control section 204 was formed by newly providing an electrode for vertical alignment control independent of a pixel electrode 16 in at least a part of a slit 34 between electrode unit 26. FIG. 49A shows an example in which the vertical alignment control section 204 is formed in the entire area of the slit 34 in the longitudinal direction thereof. FIG. 49B shows an example in which vertical alignment control sections 206 are formed in two regions where two slits 34 are present on both sides of a connection electrode 36.

A potential that is equal to a potential at an opposite electrode is applied to the vertical alignment control electrodes of the vertical alignment control sections 204 and 206. Since no voltage is therefore applied between the vertical alignment control electrodes of the vertical alignment control sections 204 and 206, liquid crystal molecules 1 cm above the vertical alignment control sections 204 and 206 can be vertically aligned with stability. Singular points with strength s=-1 are formed on those of the connection electrodes 36.

In the case of a liquid crystal panel that is driven by switching devices such as TFTs, the vertical alignment control electrodes of the vertical alignment control sections 204 and 206 can be formed using storage capacitor bus lines. Thus, the vertical alignment control sections 204 and 206 can be formed at the same time when the storage capacitor bus lines are formed. Since this eliminates a need for providing a separate process for forming the vertical alignment control sections 204 and 206, there will be an advantage in that yield of manufacture will be improved and manufacturing costs can be suppressed.

Figure 50A:
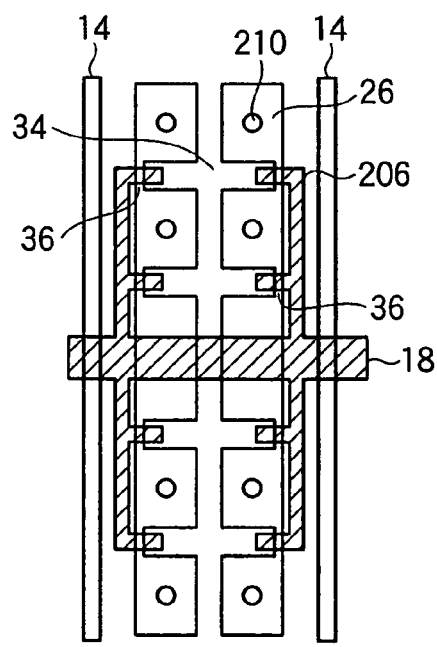
FIGS. 50A and 50B show configurations of a substrate for a liquid crystal display according to Embodiment 3-11 in the third mode for carrying out the invention.
Figure 50B:
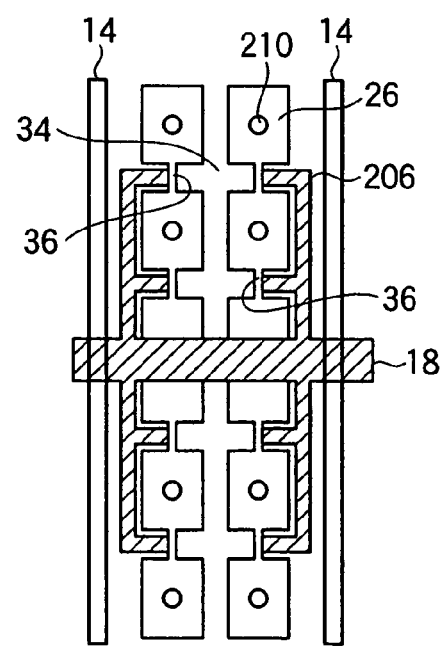

FIGS. 50A and 50B show schematic configurations in which the electrodes of the vertical alignment control sections 204 and 206 are formed utilizing a storage capacitor bus line 18 (a TFT is not shown). In FIG. 50A, connection electrodes 36 are provided in the vicinity of drain bus lines 14 (at the periphery of the pixel region). In FIG. 50B, connection electrodes 36 are provided substantially in the middle of sides of the circumference of electrode units 26. In both of the figures, wires branch from the storage capacitor bus line 18 and extend in the vertical direction in the figure along the drain bus lines 14 to be connected to vertical alignment control electrodes of the vertical alignment control sections 204 and 206 formed at the respective slits 34. FIGS. 50A and 50B also show the positions of point-like protrusions 210 formed on an opposite substrate for enhancing regulation of alignment.

FIGS. 51A to 51G show examples of specific configurations according to the present embodiment. FIGS. 51A to 51E are plane views showing configurations of one pixel and the neighborhood of the same. Each of the pixels has an outer configuration substantially in the form of a rectangle of about 86 μm×260 μm. Each of the pixels has a pixel electrode 16 formed with electrode units 26 in three rows and two columns above and below a storage capacitor bus line 18 that extends through the pixel substantially in the middle thereof. In the electrode units 26 shown in FIGS. 51A and 51E, trunk sections 28 are in the form of an X-shaped intersection. In the electrode units 26 shown in FIGS. 51B and 51D, trunk sections 28 are in the form of a +shaped intersection. Connection electrodes 36 in FIGS. 51A, 51C and 51E are formed on the side of the drain bus lines 14, and connection electrodes 36 in FIGS. 51B and 51D are formed in the vicinity of mid points of sides of the circumference of electrode units 26.

As shown in those figures, wires branch from the storage capacitor bus line 18 and extend in the vertical direction along the drain bus lines 14, and H-shaped storage capacitor wiring is formed in each pixel. Vertical alignment control electrodes of vertical alignment control sections 206 are extracted from the H-shaped storage capacitor wiring into each slit 34. FIGS. 51A to 51G also show the positions of point-like protrusions 210 formed on an opposite substrate for enhancing alignment regulation. The point-like protrusions 210 are formed such that they are located substantially in the middle of the respective electrode units 26. In the pixel configuration shown in each of FIGS. 51A to 51G, since no voltage is applied between both of the H-shaped storage capacitor wiring and the vertical alignment control electrodes of the vertical alignment control sections 206 and the opposite electrode, liquid crystal molecules 1 cm above the H-shaped storage capacitor wiring and the vertical alignment control sections 206 can be vertically aligned with stability. Further, singular points with strength s=-1 are formed on both connection electrodes 36.

As described above, the present mode for carrying out the invention makes it possible to provide a liquid crystal display which is in a stable state of alignment and which does not suffer from display defects such as irregularities in display even when subjected to some shock that can be caused in practice by pressing the panel with a finger, for example.

(Fourth Mode for Carrying Out the Invention)

A substrate for a liquid crystal display and a liquid crystal display having the same in a fourth mode for carrying out the invention will no be described. The present mode for carrying out the invention relates to a method of reliably regulating the alignment of a liquid crystal in a vertical alignment type display without providing structures for alignment regulation on an opposite substrate.

An MVA type LCD exhibits a contrast ratio of 10 or more with a viewing angle of 80 deg. in upward, downward, leftward and rightward viewing directions when displaying white or black. However, it must be formed with linear protrusions for alignment control made of resin at least on either substrate. This results in a possibility of a reduction of yield of manufacture attributable to an additional step for forming the linear protrusions.

Figure 52A:
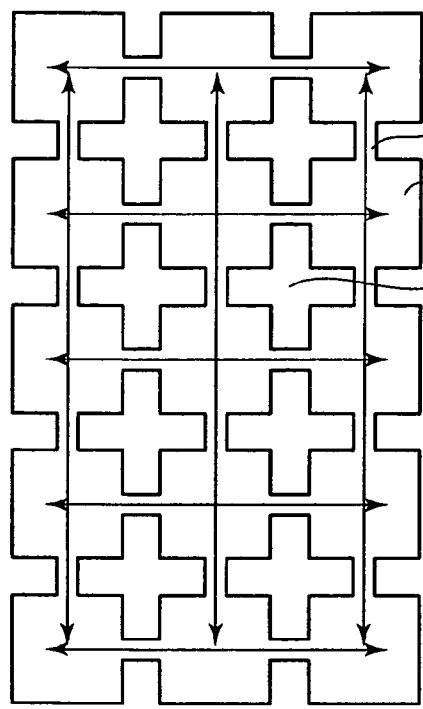
FIGS. 52A and 52B illustrate a substrate for a liquid crystal display in a fourth mode for carrying out the invention.
Figure 52B:
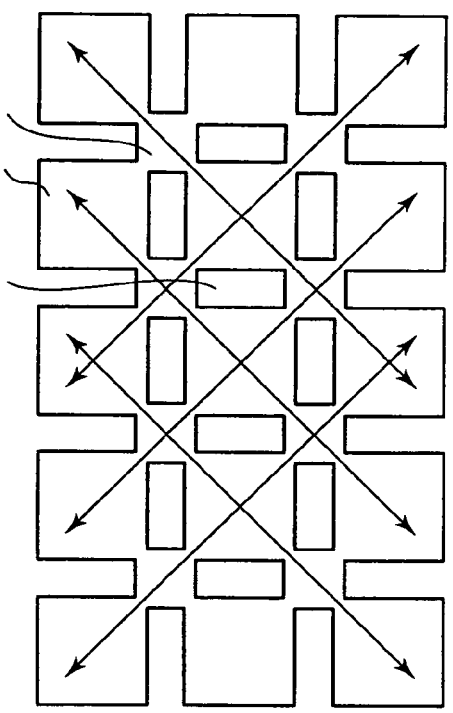

FIGS. 52A and 52B show examples of connection between electrode units. FIG. 52A shows a structure in which five and three square electrode units 526 are arranged in the vertical and horizontal directions respectively in the form of a matrix with slits 534 interposed therebetween.

Adjoining electrode units 526 are electrically connected through connection electrodes 536 that extend substantially from the mid points of one side thereof. FIG. 52B shows a structure in which a plurality of electrode units 526 arranged similarly to those in FIG. 52A are connected through connection electrodes 536 at corners of the circumference thereof adjacent to each other.

In the structures shown in FIGS. 52A and 52B, a plurality of electrode units 526 are connected in a straight line through connection electrodes 536 as indicated by the straight arrows in the figures. Therefore, when the position of a singular point with strength s=+1 formed in each of the plurality of electrode units 526 arranged in a straight line becomes instable, the singular points will be likely to move significantly through the connection electrodes 536 serving as passages, which considerably increases the probability of propagation of an alignment defect throughout the pixel.

In the present mode for carrying out the invention, liquid crystal molecules are tilted in a plurality of desired directions when a voltage is applied thereto while satisfying conditions that (1) no bank-shaped structure made of resin is formed; (2) no alignment regulating force is applied to an alignment film by rubbing the same (i.e., liquid crystal molecules are aligned in a direction perpendicular to a substrate); and (3) the aligning direction of liquid crystal molecules is regulated only by the configuration of pixel electrodes on a TFT substrate 2.

In order to achieve this, in the present mode for carrying out the invention, pixel electrodes provided on a TFT substrate are configured as follows. First, the pixel electrode at each pixel is provided as a combination of a plurality of electrode units having a rectangular or similar configuration. Connection electrodes for electrically connecting the plurality of electrode units are provided as described below.

Figure 53:
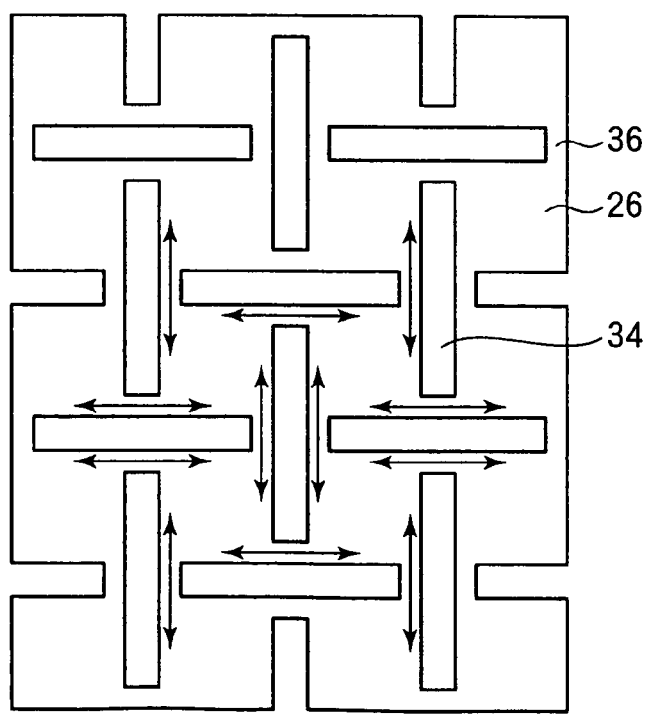
FIG. 53 shows a configuration of a substrate for a liquid crystal display according to Embodiment 4-1 in the fourth mode for carrying out the invention.

A plurality of electrode units adjacent to each other are separated by slits provided along sides of the circumference of the electrode units. A connection electrode is formed on either of ends of one side of the circumference of an electrode unit. When connection electrodes are provided at a plurality of sides of the circumference of an electrode unit, a pixel pattern is employed in which when a connection electrode is provided at an end of only either of two adjoining sides at the corner where the two sides meet each other. When a plurality of electrode units are provided in such a manner, a pixel electrode pattern as shown in FIG. 53 is obtained, for example (first approach).

Electrode units may alternatively be configured as follows. A long and narrow space is formed on each side of the circumference of an electrode unit such that the space extends from a part of the side toward one of the sides adjoining the same, the space being a little short of the other side. The spaces that start on the respective sides are provided such that they extend toward the respective adjacent sides in the same rotating direction about the center of the electrode unit. The rotating direction may be either of the clockwise and counterclockwise directions. Electrode units designed as thus described are provided adjacent to each other with slits interposed therebetween in the same manner as the first approach. The electrode units provided adjacent to each other are electrically connected by providing connection electrodes at circumferential edges thereof (second approach).

The slits separating the plurality of electrode units have a width of 6 μm or more and a length of 10 μm or less, and the connection electrodes for electrically connecting the plurality of electrode units have a width of 5 μm or less.

The present mode for carrying out the invention provides the following advantages when used for LCD manufacturing processes.

(1) Since there is no need for additional structures on an opposite substrate at all, processes for forming structures on the opposite substrate can be eliminated.

(2) The alignment of liquid crystal molecules is regulated by patterning pixel electrodes on a TFT substrate appropriately. Since this can be achieved by using the same process as a process for forming an ordinary "solid" pixel electrode pattern, there is no additional process.

(3) Referring to alignment films to be formed on the substrates, it is only required to apply or form vertical alignment films, and there is no need for a process to provide them with an alignment regulating force such as a rubbing process or an optical alignment process.

Since the advantages described in the above (1) to (3) eliminate factors that can reduce yield of manufacture through an increase in the number of processes, yield of manufacture can be consequently improved.

The following advantages can be achieved by configuring the pixel electrode in each pixel according to the above-described first or second approach.

(4) According to the first approach, since one connection electrode connects only two electrode units in a straight line, a turbulence of alignment can be confined in a small region even when the position of a singular point with strength s=+1 is disturbed.

(5) According to the second approach, there are only two electrode units that are connected in a straight line with one connection electrode, and the region connected in a straight line with the connection electrode is small. Therefore, a turbulence of alignment can be confined in a small region even when the position of a singular point with strength s=+1 is disturbed.

(6) When the slits provided around an electrode unit have a width of 6 μm or more, electrical fields at edges of the electrode unit have a greater effect, and desired alignment can therefore be achieved in the electrode unit. Conversely, when the slits have a smaller width, the diagonal fields have a smaller effect, and the alignment can be disturbed.

(7) The size of an electrode unit can be reduced to enhance the effect of diagonal fields at edges of the electrode unit, the shorter the slits provided around the electrode unit. While the size of the electrode unit is desirably as small as possible, a smaller electrode unit size means a slit section with a greater area and means a reduction in luminance consequently. Therefore, an electrode unit must have an appropriate size, and an idealistic width of the same is about 40 μm. The maximum length of one slit is therefore 100 μm.

(8) When the width of the connection electrodes is too large, a singular point with strength s=+1 can move into an adjacent electrode unit, which results in instable alignment. When the width is 5 μm or less, the movement of a singular point with strength s=+1 is less likely to occur, which results in stable alignment.

When a liquid crystal panel fabricated using a substrate for a liquid crystal display in the present mode for carrying out the invention is sandwiched between a pair of λ/4-plates orthogonal to each other located above and under the same, it is possible to eliminate disclination lines at boundaries between separately aligned regions that are generated when the panel is sandwiched only by linear polarizers, and the luminance of the panel as a whole can be increased because the quantity of light transmitted by the region of the lines can be increased.

Substrates for a liquid crystal displays and liquid crystal display having the same in the present mode for carrying out the invention will now be specifically described with reference to Embodiments 4-1 to 4-5.

Embodiment 4-1

Embodiment 4-1 will now be described with reference to FIGS. 53 and 54. FIG. 53 shows a positional relationship between electrode units 26 arranged in the form of a matrix having five rows and four columns and connection electrodes 36 for electrically connecting the electrode units 26. In FIG. 53, the plurality of electrode units 26 that are adjacent to each other are separated by slits 34 provided along sides of the circumference of the electrode units 26. A connection electrode 36 is formed on either of ends of one side of the circumference of an electrode unit 26. At a corner of an electrode unit 26 where adjoining sides of the same meet each other, a connection electrode 36 is provided only at the end of either of the sides. In such a configuration, since one connection electrode 36 connects only two electrode units 26 in a straight line as indicated by the arrows in FIG. 53, a turbulence of alignment can be confined in a small region even if the position of a singular point with strength s=+1 is disturbed.

Figure 54:
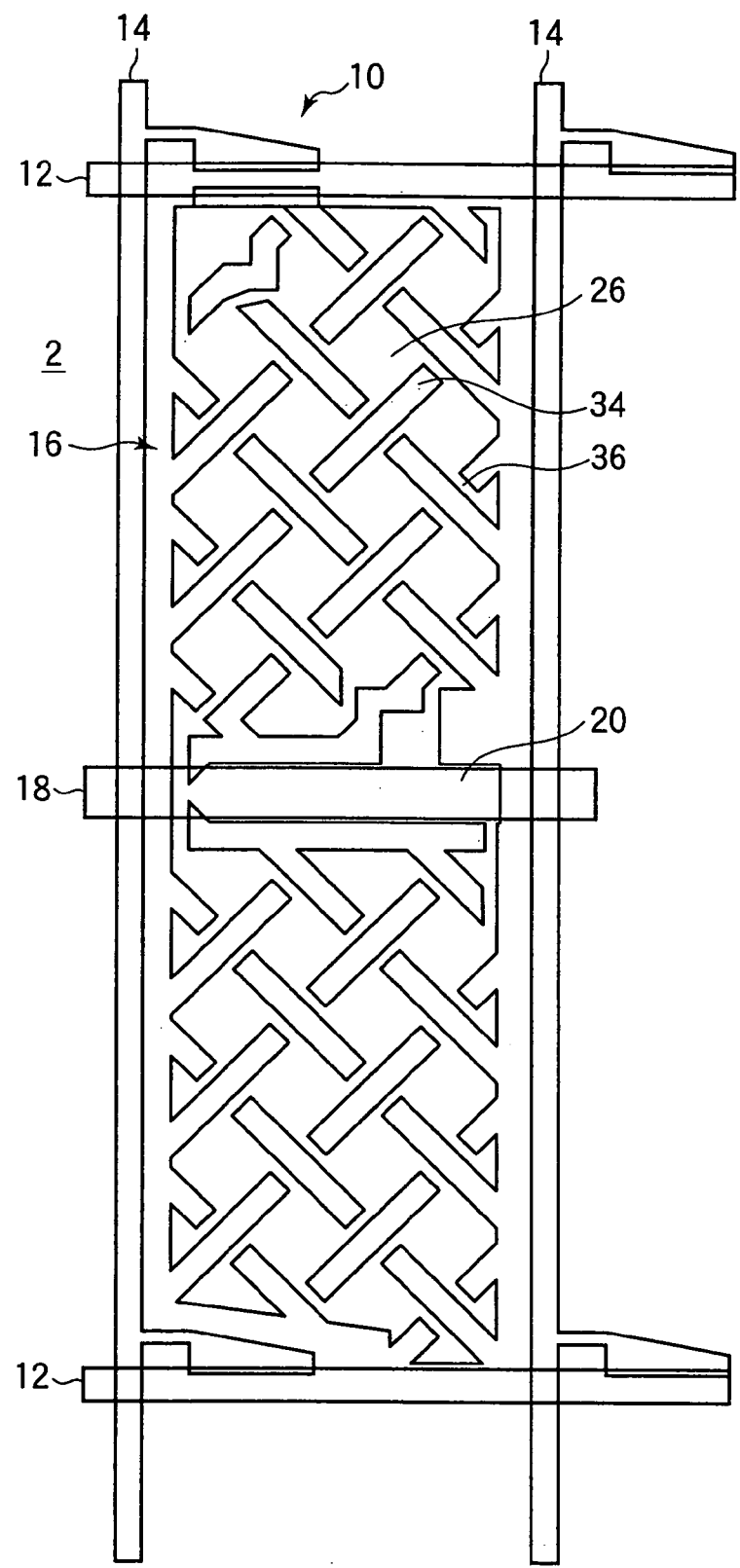
FIG. 54 shows a configuration of a substrate for a liquid crystal display according to Embodiment 4-1 in the fourth mode for carrying out the invention.

FIG. 54 shows a pixel formed using the positional relationship between electrode units 26 and connection electrodes 36 shown in FIG. 53. The pitch of pixel in the direction of drain bus lines 14 (the longitudinal direction of the pixels) is 300 μm, and the pitch of the pixels in the direction of gate bus lines 12 is 100 μm. A TFT substrate 2 is formed with the drain bus lines 14 and gate bus lines 12 that have a width of 7 μm, and a pixel electrode 16 is formed of an ITO in a position that is 8 μm away from each of the lines. That is, the pixel electrode 16 is formed in a region having a width of 77 μm. The configuration of the pattern of the pixel electrode 16 will be described later. A TFT 10 is formed in the vicinity of the intersection between the drain bus line 14 and the gate bus line 12 at each pixel.

The pixel electrode 16 is comprised of a plurality of electrode units 26. An electrode unit 26 is a "solid" electrode having a square circumferential configuration of 19 μm×19 μm. A slit 34 having a width of 6 μm is provided between adjoining electrode units 26. A connection electrode 36 is formed at one end of a side of an electrode unit 26 that is in the form of a square to establish connection to an adjacent electrode unit 26. No connection electrode 36 is formed at the other end of that side. That is, one connection electrode 36 is formed at each corner of the square, and four connection electrodes 36 are formed like a wind mill when the circumferential section is viewed as whole. The connection electrodes 36 have a width of 3.5 μm. Electrode units 26 having the connection electrodes 36 thus formed thereon are arranged adjacent to each other such that the connection electrodes 36 of each other are connected. Slits 34 having a width of 6 μm are formed between adjoining electrode units 26. Referring to the positional relationship between slits 34 that are adjacent to each other, they are provided such that an end of one of the slits 34 is located in the middle of the other slit 34 in the longitudinal direction thereof with a connection electrode 36 interposed between the slits, and the longitudinal directions of the adjoining slits 34 are orthogonal to each other.

The pixel electrode 16 is connected to a source electrode of the TFT 10 through a contact hole formed in an insulation layer (the hole and the layer are not shown). Since this results in a need for a margin to form the contact hole, a somewhat large transparent electrode is required in the region where the pixel electrode 16 and the source electrode are connected. For this reason, a "sold" electrode of about 15 μm square is provided only in such a region.

A drain electrode of the TFT 10 for an adjacent pixel is provided under the illustrated pixel. Therefore, in order to prevent the drain electrode from disturbing alignment and generating crosstalk, the pixel electrode 16 is provided such that an edge thereof is 7 μm away from the drain electrode to prevent the pixel electrode 16 and the drain electrode from overlapping each other.

A black matrix having a width of 23 μm in the direction of drain bus lines 14 is provided at pitches of 300 μm and 100 μm on a CF substrate (opposite substrate) 4. A color filter (CF) layer in red (R), green (G) or blue (B) is formed at each opening, and a common electrode that is "solid" in the entire region thereof is formed of an ITO over the openings. No bank-shaped alignment regulating structure is formed at all on the opposite substrate 4.

Vertical alignment films are formed on the substrates, and liquid crystal molecules are aligned in a direction perpendicular to substrate surfaces (surfaces of the alignment films) when no voltage is applied. The TFT substrate 2 and the opposite substrate 4 are combined with a predetermined cell gap left therebetween, and a liquid crystal having negative dielectric anisotropy is injected and sealed between them.

When a liquid crystal panel having such a configuration is driven in an ordinary way, in one of the electrode units 26 of a pixel electrode 16, separate alignments in four general directions from the edges of the square (i.e., the regions that constitute the sides thereof) toward the center thereof can be achieved. Since one electrode unit 26 has a relatively small configuration, i.e., a size of 19 μm×19 μm, electrical fields at edges of the pixels have a great effect that provides a great alignment regulating force. Since the slits 34 provided in the pixel electrodes 16 allow the distances of straight regions connected by the connection electrodes 36 to be made small, alignment defects attributable to coupling of alignment regions between adjoining electrode units 26 are less likely to occur, and any reduction in display quality can be prevented even if such a defect occurs.

Embodiment 4-2

Figure 55:
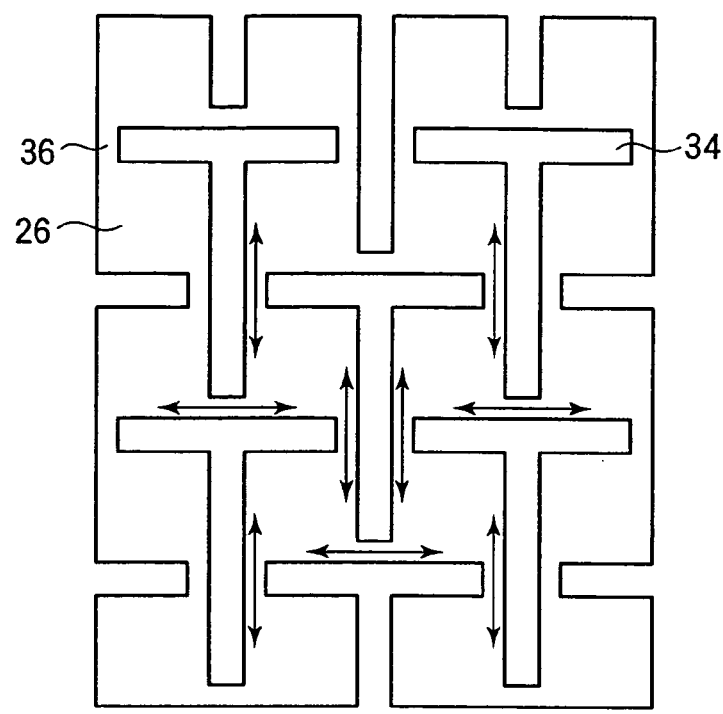
FIG. 55 shows a configuration of a substrate for a liquid crystal display according to Embodiment 4-2 in the fourth mode for carrying out the invention.

Embodiment 4-2 will now be described with reference to FIG. 55. While electrode units 26 have the same configuration as that in FIG. 53, a structure is employed in which connection electrodes 36 are provided only three sides of the circumference of the electrode units 26 and no connection electrode 36 is provided on the remaining side. In such a configuration, since the number of connections between adjoining electrode units 26 can be reduced, the probability of occurrence of alignment defects attributable to movement of singular points with strength s=+1 can be reduced further.

Embodiment 4-3

Figure 56:
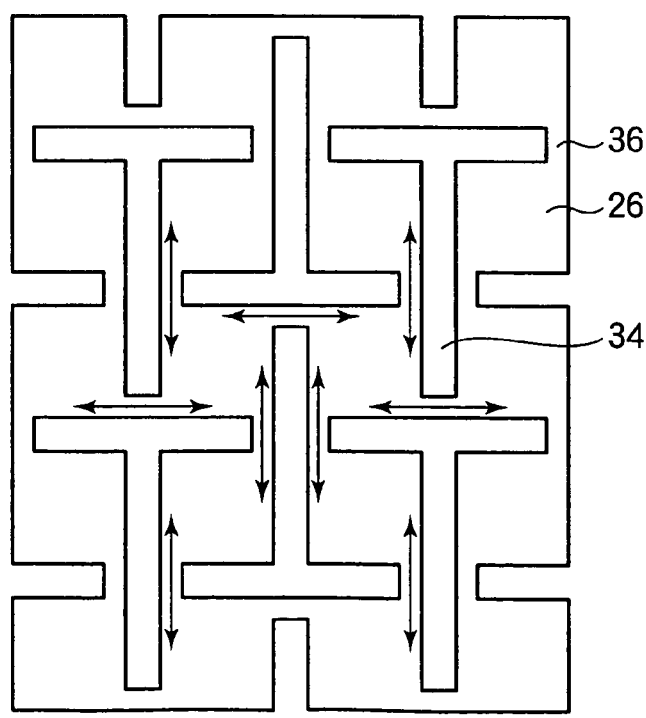
FIG. 56 shows a configuration of a substrate for a liquid crystal display according to Embodiment 4-3 in the fourth mode for carrying out the invention.

Embodiment 4-3 will now be described with reference to FIG. 56. While electrode units 26 have the same configuration as that in FIG. 53, the embodiment is a combination of electrode units 26 having connection electrodes 36 provided on all sides of the circumference thereof and electrode units 26 having connection electrodes 36 only on two opposite sides of the circumference thereof and having no connection electrodes 26 on the remaining two sides. In such a configuration, since the number of connections between adjoining electrode units 26 can be reduced, the probability of occurrence of alignment defects attributable to movement of singular points with strength s=+1 can be reduced further.

Embodiment 4-4

Figure 57A:
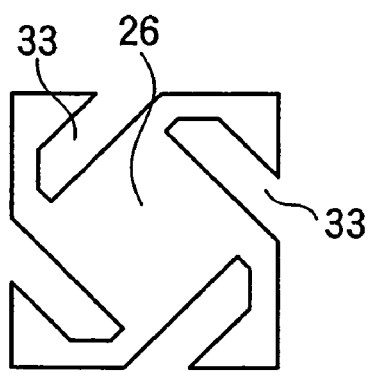
FIGS. 57A and 57B show a configuration of a substrate for a liquid crystal display according to Embodiment 4-4 in the fourth mode for carrying out the invention.
Figure 57B:
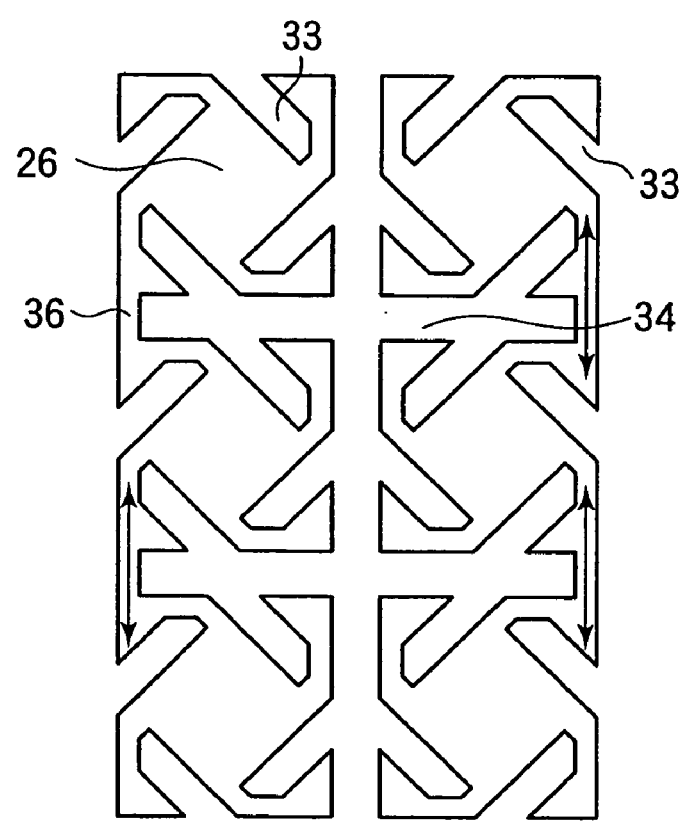

Embodiment 4-4 will now be described with reference to FIGS. 57A to 58. FIG. 57A shows a configuration of one electrode unit 26 according to the present embodiment, and FIG. 57B shows a positional relationship between electrode units 26 arranged in the form of a matrix having three rows and two columns and connection electrodes 36 for electrically connecting the electrode units 26.

The electrode units 26 have a circumferential configuration in the form of a square of 35 μm×35 μm. One electrode unit 26 is provided with four spaces 33 having a width of 6 μm that start at a part of respective sides. The spaces 33 desirably start at positions close to the centers of the respective sides. Specifically, a space 33 is extended from a starting point that is about 14 μm away from the right end of the side at the bottom among the four sides of the square shown in FIG. 57A, the space extending at an angle of 45 deg. to that side toward the adjacent side on the right-hand side of the same. Since the electrode will be cut when the space 33 is extended up to the adjacent side on the right-hand side, the electrode must be left on the side toward which the space 33 extends without fail. The configuration of the electrode unit 26 shown in FIG. 57A is obtained by providing such a space 33 on each side of the square.

Figure 58:
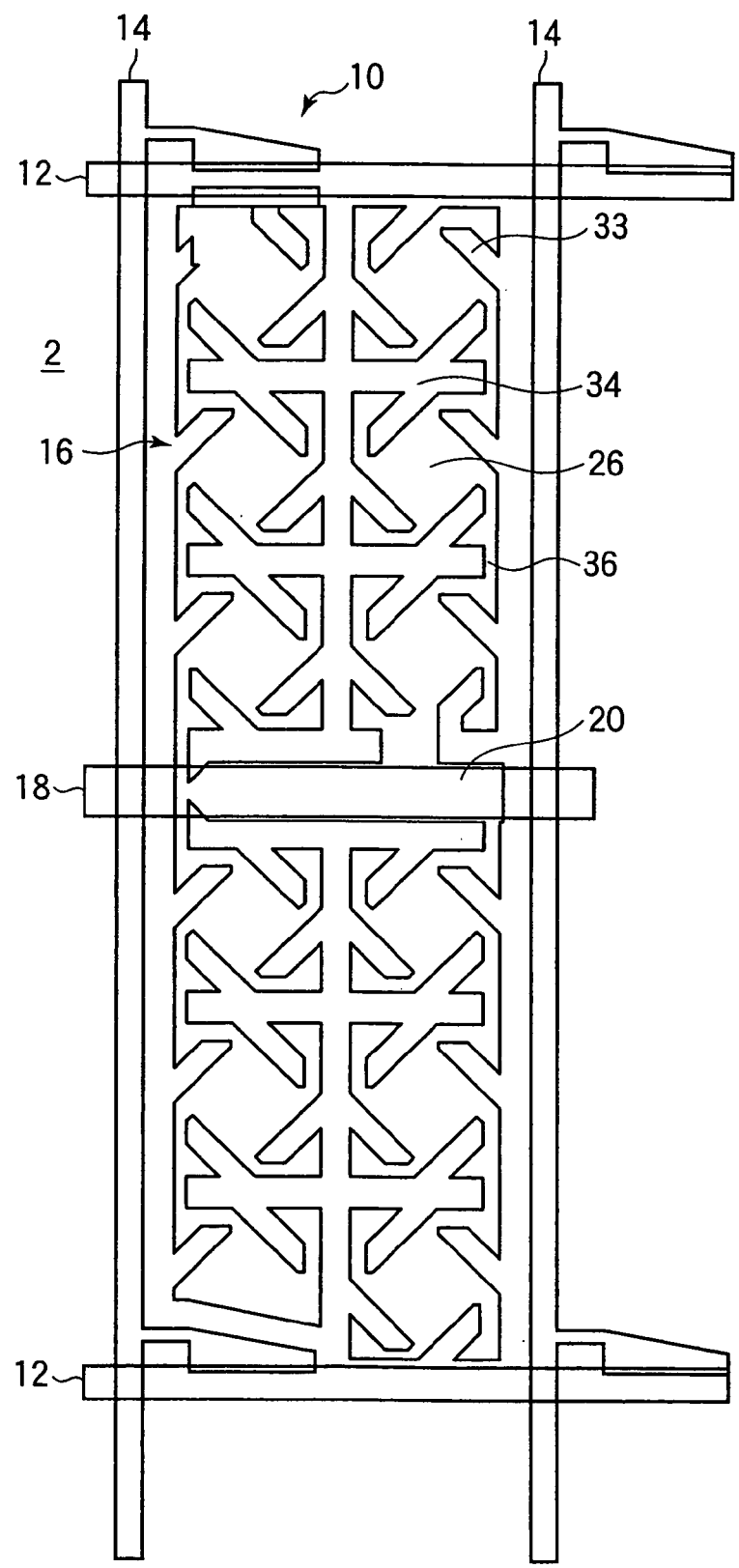
FIG. 58 shows a configuration of a substrate for a liquid crystal display according to Embodiment 4-4 in the fourth mode for carrying out the invention.

A structure as shown in FIG. 58 will be provided by arranging two electrode units 26 having such a configuration along gate bus lines 12 and six of the same along drain bus lines 14. Electrode units 26 adjacent to each other are separated by slits 34 having a width of 7 μm. A connection electrode 36 for electrically connecting each electrode unit 26 is provided at edges of the pixel electrode 16. The purpose is to reduce the length of continuous regions in the form of a straight line on the pixel electrode 16. This makes it possible to reduce the possibility of alignment defects attributable to coupling of alignment regions between the electrode units 26 that are adjacent to each other with the slits 34 interposed therebetween and to prevent any reduction is display quality even if such an alignment defect occurs.

Embodiment 4-5

Embodiment 4-5 will now be described with reference to FIGS. 59 and 60. In the present embodiment, the pitch of pixels in the direction of drain bus lines 14 (in the longitudinal direction of the pixels) is 225 μm. The pitch of the pixels in the direction of gate bus lines 12 is 75 μm. This is an example in which the size of one pixel itself is smaller than those in Embodiment 4-1 and 4-4.

The drain bus lines 14 and the gate bus lines 12 that have a width of 6 μm are formed on a TFT substrate 2, and a pixel electrode 16 is formed of an ITO in a position that is 7 μm away from each of the lines. That is, the pixel electrode 16 is formed in a region having a width of 55 μm. The configuration of the pattern of the pixel electrode 16 will be described later. A TFT 10 is formed in the vicinity of the intersection between the drain bus line 14 and the gate bus line 12 at each pixel.

The pixel electrode 16 is comprised of a plurality of electrode units 26. An electrode unit 26 is an electrode having a square circumferential configuration of 24.5 μm×24.5 μm. A slit 34 having a width of 6 μm is provided between adjoining electrode units 26. A connection electrode 36 is formed at one end of a side of an electrode unit 26 that is in the form of a square to establish connection to an adjacent electrode unit 26. No connection electrode 36 is formed at the other end of that side, and no connection electrode is formed at the end of the side adjacent to the corner where the connection electrode 36 is formed. That is, one connection electrode 36 is formed at each corner of the square to provide a configuration like a wind mill. The connection electrodes 36 have a width of 3.5 μm. Electrode units 26 having the connection electrodes 36 thus formed thereon are arranged adjacent to each other such that the connection electrodes 36 of each other are connected. Slits 34 having a width of 6 μm are formed between adjoining electrode units 26. Referring to the positional relationship between slits 34 that are adjacent to each other, they are provided such that an end of one of the slits 34 is located in the middle of the other slit 34 in the longitudinal direction thereof with a connection electrode 36 interposed between the slits, and the longitudinal directions of the adjoining slits 34 are orthogonal to each other.

Two electrode units 26 thus fabricated are arranged in the horizontal direction (the extending direction of the gate bus lines 12), and six units are arranged in the vertical direction (the extending direction of the drain bus lines 14). A storage capacitor bus line 18 is eccentrically provided in an upper or lower part of the pixel instead of the middle of the same because it is to provided in alignment with a slit 34 that is defined when the electrode units 26 are arranged. Specifically, a storage capacitor electrode 20 having a width of 20 μm is provided around a position that is about 150 μm away from the lower gate bus line 12 and about 75 μm away from the upper gate bus line 12. Eight (2×4) electrode units 26 and four (2×2) electrode units 26 are provided in lower and upper opening regions respectively, the regions being bounded by the storage capacitor bus line 18. A part of an electrode unit 26 must be modified in configuration such that it does not overlap a TFT region of an adjacent pixel just as seen in Embodiment 4-1.

The pixel electrode 16 is connected to a source electrode of the TFT 10 through a contact hole formed in an insulation layer (the hole and the layer are not shown). Since this results in a need for a margin to form the contact hole, a somewhat large transparent electrode is required in the region where the pixel electrode 16 and the source electrode are connected. For this reason, a "sold" electrode of about 15 μm square is provided only in such a region.

A drain electrode of the TFT 10 for the adjacent pixel is provided under the illustrated pixel. Therefore, in order to prevent the drain electrode from disturbing alignment and generating crosstalk, the pixel electrode 16 is provided such that an edge thereof is 7 μm away from the drain electrode to prevent the pixel electrode 16 and the drain electrode from overlapping each other.

A black matrix having a width of 20 μm in the direction of drain bus lines 14 is provided at pitches of 225 μm×75 μm on a CF substrate (opposite substrate) 4. A CF layer in red (R), green (G) or blue (B) is formed at each opening, and a common electrode that is "solid" in the entire region thereof is formed of an ITO over the openings. No bank-shaped alignment regulating structure is formed at all on the opposite substrate 4.

Vertical alignment films are formed on the substrates, and liquid crystal molecules are aligned in a direction perpendicular to substrate surfaces (surfaces of the alignment films) when no voltage is applied. The TFT substrate 2 and the opposite substrate 4 are combined with a predetermined cell gap left therebetween, and a liquid crystal having negative dielectric anisotropy is injected and sealed between them.

When a liquid crystal panel having such a configuration is driven in an ordinary way, in one of the electrode units 26 of a pixel electrode 16, separate alignments in four general directions from the edges of the square (i.e., the regions that constitute the sides thereof) toward the center thereof can be achieved. Since one electrode unit 26 has a relatively small configuration, i.e., a size of 24.5 µm×24.5 µm, electrical fields at edges of the pixels have a great effect that provides a great alignment regulating force. Since the slits 34 provided in the pixel electrodes 16 allow the distances of straight regions connected by the connection electrodes 36 to be made small, alignment defects attributable to coupling of alignment regions between adjoining electrode units 26 are less likely to occur, and any reduction in display quality can be prevented even if such a defect occurs.

Figure 59:
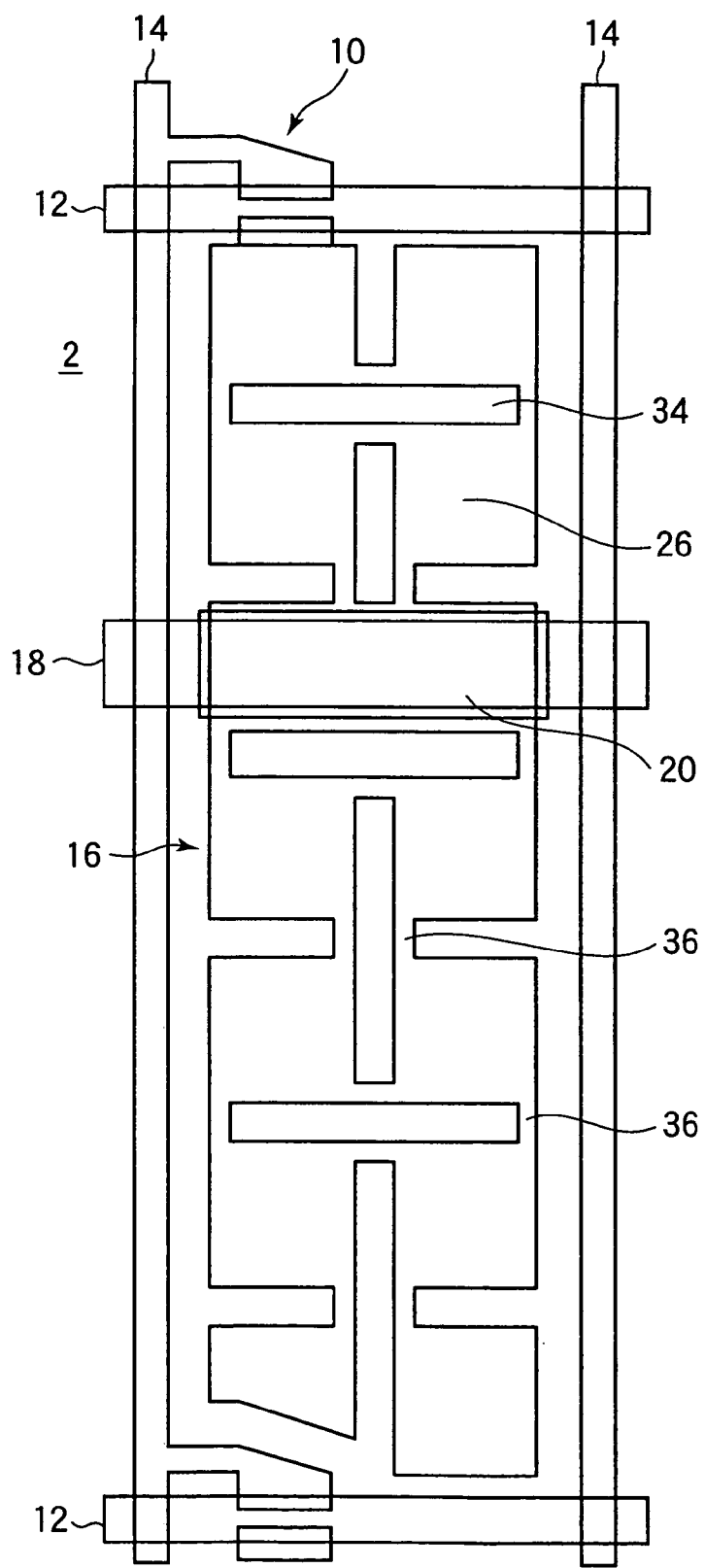
FIG. 59 shows a configuration of a substrate for a liquid crystal display according to Embodiment 4-5 in the fourth mode for carrying out the invention.
Figure 60:
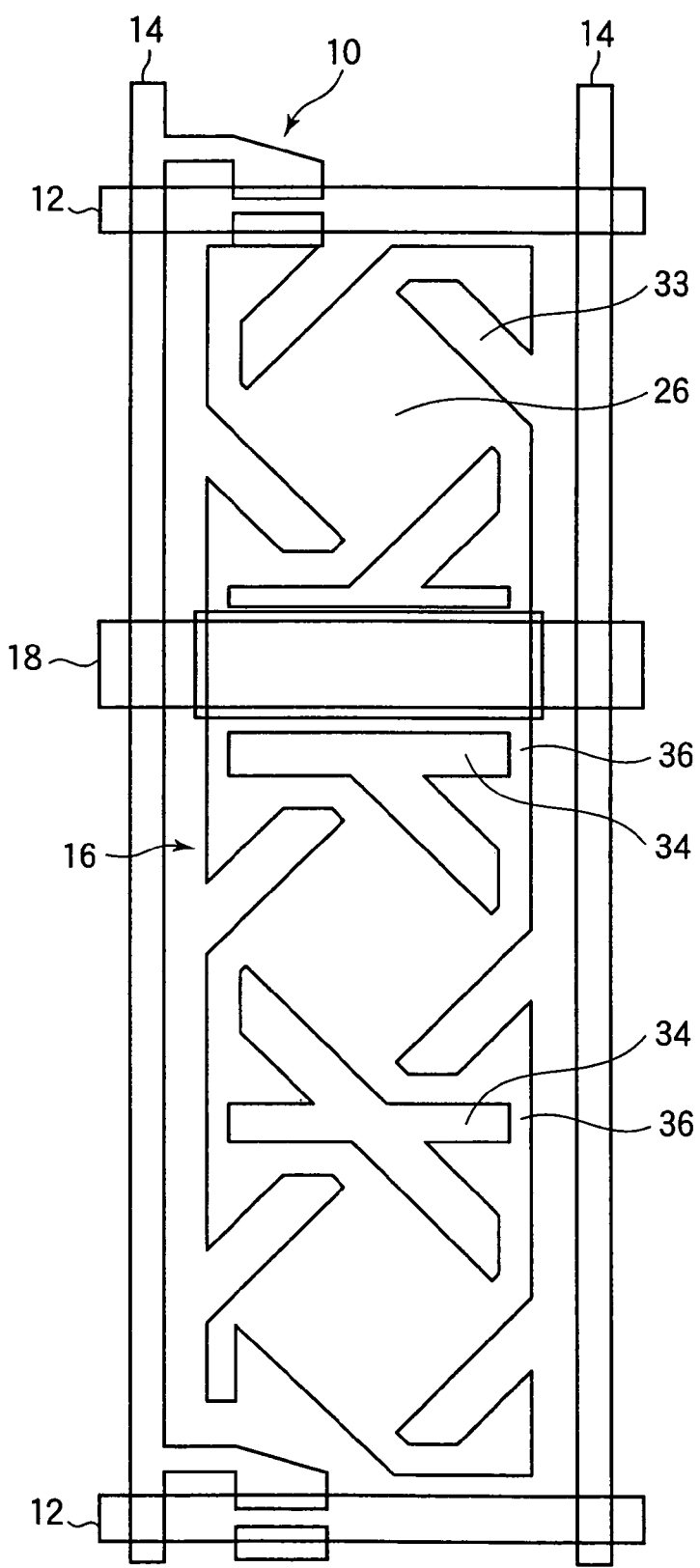
FIG. 60 shows a configuration of a substrate for a liquid crystal display according to Embodiment 4-5 in the fourth mode for carrying out the invention.

FIG. 60 shows a pixel electrode 16 that is obtained by changing the configuration of the pixel units 26 in the pixel structure shown in FIG. 59 into that shown in FIGS. 57A and 57B. In the structure of the pixel electrode 16 shown in FIG. 60, three electrode units 26 as shown in FIGS. 57A and 57B are arranged in the vertical direction (the extending direction of drain bus lines 14). A storage capacitor bus line 18 is eccentrically provided in an upper or lower part of the pixel instead of the middle of the same because it is to provided in alignment with a slit 34 that is defined when the electrode units 26 are arranged. Two electrode units 26 and one electrode unit 26 are provided in lower and upper opening regions respectively, the regions being bounded by the storage capacitor bus line 18. A part of an electrode unit 26 is modified in configuration such that it does not overlap a TFT region of an adjacent pixel just as seen in Embodiment 4-1. This reduces the possibility of alignment defects attributable to coupling of alignment regions between adjoining electrode units 26 that are adjacent to each other with a slit 34 interposed therebetween and makes it possible to prevent any reduction in display quality even if such a defect occurs.

As described above, in the present mode for carrying out the invention, an alignment regulating force can be provided only by a step of patterning pixel electrodes, and the occurrence of alignment defects can be reduced. This makes it possible to fabricate LCDs having high image quality with high yield of manufacture. Display with high luminance can be presented easily by providing circular polarizers having optical axes orthogonal to each other on the top and bottom of an LCD panel in the present mode for carrying out the invention.

(Fifth Mode for Carrying Out the Invention)

Substrates for a liquid crystal display and liquid crystal displays having the same in a fifth mode for carrying out the invention will now be described. As described in the section of the fourth mode for carrying out the invention, MVA LCDs and ASV LCD according to the related art have the problem of low yield of manufacture because they require a step for forming bank-shaped resin patterns. Further, when a liquid crystal moves at the instant of switching of a pixel electrode from a low tone to a high tone, singular points with strength s=+1 can move through connection electrodes that electrically connect electrode patterns adjacent to each other, and the singular points can be fixed as they are. Such a phenomenon is displayed as an after-image.

When the surface of a liquid crystal panel is pressed with a finger, liquid crystal molecules are physically urged and tilted. Singular points with strength s=+1 move also in such a case, and singular points with strength s=+1 can move not only through connection electrodes but also beyond the region of slits between electrode patterns where no connection electrode is provided.

Singular points with strength s=+1 move beyond slits between electrode patterns under the following conditions.

(1) The intervals of slits between electrode patterns adjacent to each other are small.

(2) The electrode patterns themselves do not have sufficient parts to regulate alignment such as fine slits, and the electrodes themselves occupy a great area.

(3) Relatively high tones are displayed (normally, singular points do not move at in the case of low tones).

There is another problem in that when a pixel electrode is put in contact with a source electrode of a TFT, a singular point with strength s=+1 which must be formed in the middle of the pixel electrode can drift toward the source electrode under the influence of an electric field of the source electrode, which can result in an after-image.

In the present mode for carrying out the invention, the following structure is employed to eliminate after-images attributable to vibration of a liquid crystal display and irregularities that is caused when the surface of the display is pressed with a finger and to prevent any increase in the number of processes for manufacturing the same.

(1) In a pixel electrode for one pixel, the position of each of electrode patterns in the cell is kept lower than a peripheral section of each electrode pattern. As a result, a configuration is provided in which a wall constituted by an insulation layer is formed around the electrode pattern that forms a part of the pixel electrode. In this case, since the insulation layer is formed in a region where no electrode exists, it is possible to achieve the same effect as that provided by forming banks between adjoining electrode patterns. This makes it possible to prevent movement and coupling of a singular point with strength s=+1 between adjoining electrode patterns.

(2) In a pixel electrode for one pixel, a contact hole of an electrode pattern that is in direct contact with a TFT is provided in the middle of the electrode pattern, and a source electrode of the TFT is extended to the contact hole of the electrode pattern. When the contact hole is provided in the middle of the electrode pattern, the position where a singular point with strength s=+1 is generated by the electrode pattern agrees with the position where the singular point with strength s=+1 is attracted to the region of the contact hole. This means that the singular point with strength s=+1 is generated in the same position without fail. Since any shift will not occur in the position of each pixel where a singular point with strength s=+1 is generated as thus described, no after-image will be generated.

(3) Electrode units that are located at electrode edges adjacent to gate bus lines or that are in contact with source electrodes of TFTs are made smaller than electrode units in other regions. Electrode units in regions where a singular point with strength s=+1 is likely to be collapsed are thus intentionally made small to reduce the influence of abnormality of singular points when it actually takes place, which makes it possible to make the ratio between separately aligned domains less likely to become imbalanced. It is assumed that this reduces the occurrence of alignment defects that result in coarse display and after-images in a macroscopic view.

Substrates for a liquid crystal display and liquid crystal displays having the same in the present mode for carrying out the invention will now be specifically described with reference to Embodiments 5-1 to 5-4.

Embodiment 5-1

Figure 61:
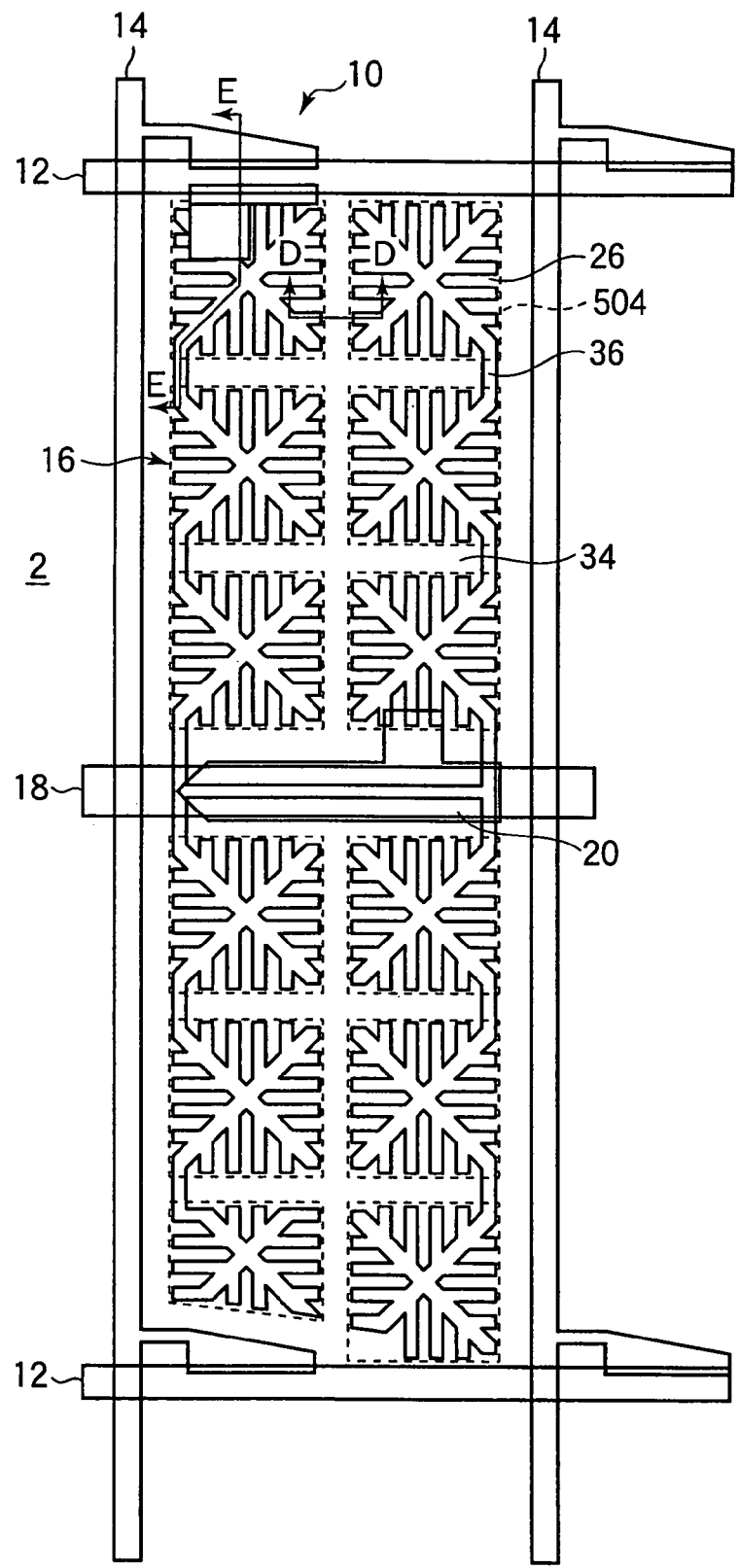
FIG. 61 shows a configuration of a substrate for a liquid crystal display according to Embodiment 5-1 in a fifth mode for carrying out the invention.
Figure 62:
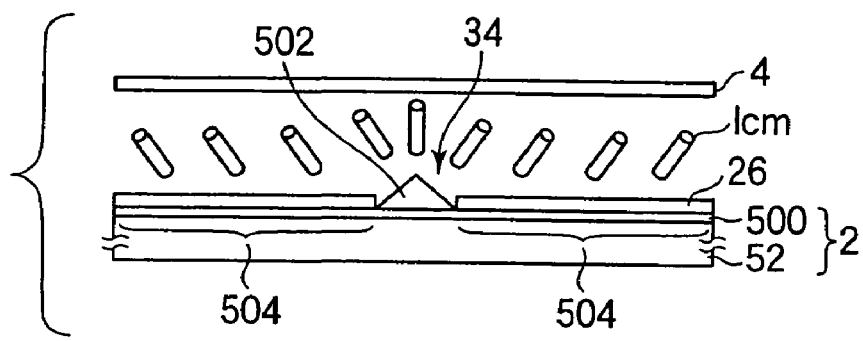
FIG. 62 is a sectional view showing the configuration of a substrate for a liquid crystal display according to Embodiment 5-1 in the fifth mode for carrying out the invention.

Embodiment 5-1 will now be described with reference to FIGS. 61 and 62. FIG. 61 shows a pixel in which a plurality of electrode units 26 are formed. FIG. 62 shows a section taken along the line D-D in FIG. 61. The pitch of pixels in the direction of drain bus lines 14 (the longitudinal direction of the pixels) is 300 µm, and the pitch of the pixels in the direction of gate bus lines 12 is 100 µm.

The drain bus lines 14 and the gate bus lines 12 that have a width of 7 m are formed on a glass substrate 52 of a TFT substrate 2. A first insulation layer 500 primarily made of $SiO_2$ is formed between the drain bus lines 14 and the gate bus lines 12, and a second insulation layer 502 is further formed (see FIG. 62). Openings are formed in predetermined positions of the second insulation layer 502. The positions of the openings will be described below.

(1) An opening is formed in the layer in a region associated with a source electrode of a TFT 10. This is essential because there the electrode must be connected to a pixel electrode 16. A hole in the form of a square of about 5 µm is formed above the source electrode in the region where it is put in contact with an electrode unit 26.

(2) An opening sized to accommodate electrode units 26 is formed in the position where the electrode units 26 are to be formed later. For example, let us assume that one electrode unit 26 has a square circumferential configuration of 35 µm×35 µm; two electrode units 26 are arranged in the horizontal direction in one pixel; and six electrode units 26 are arranged in the vertical direction. Then, a hole having a size of 37 µm×37 µm is provided in the second insulation layer 502 in association with the positions of the electrode units 26 thus arranged.

Thereafter, an ITO layer to serve as the pixel electrode 16 is formed on the entire surface using a sputtering process. Then, the ITO later is patterned using a wet etching process to form the plurality of electrode units 26. At this time, the electrode units 26 are formed in a hole 504 of 37 µm×37 µm that has been formed in the second insulation layer 502 at the previous step. Connection electrodes 36 having a width of about 4 µm are simultaneously formed in predetermined positions because each of the electrode units 26 should not be electrically isolated.

A drain electrode of a TFT 10 for an adjacent pixel is provided under the illustrated pixel. Therefore, in order to prevent a turbulence in alignment or crosstalk attributable to the drain electrode, the pixel electrode 16 is provided such that an edge thereof is 7 µm away from the drain electrode to prevent the pixel electrode 16 and the drain electrode from overlapping each other.

On a CF substrate (opposite substrate) 4, a black matrix having a width of 23 µm is provided in the direction of the drain bus lines 14 at pitches of 300 µm×100 µm. A color filter (CF) layer in red (R), green (G) or blue (B) is formed at each opening, and a common electrode that is "solid" in the entire region thereof is formed of an ITO over the openings. No bank-shaped alignment regulating structure is formed at all on the opposite substrate 4.

Vertical alignment films are formed on the substrates, and liquid crystal molecules are aligned in a direction perpendicular to substrate surfaces (surfaces of the alignment films) when no voltage is applied. The TFT substrate 2 and the opposite substrate 4 are combined with a predetermined cell gap left therebetween, and a liquid crystal having negative dielectric anisotropy is injected and sealed between them.

When a liquid crystal panel having such a configuration is driven in an ordinary way, in one of the electrode units 26 of a pixel electrode 16, separate alignments in four general directions from the edges of the square (i.e., the regions that constitute the sides thereof) toward the center thereof can be achieved.

Figure 63A:
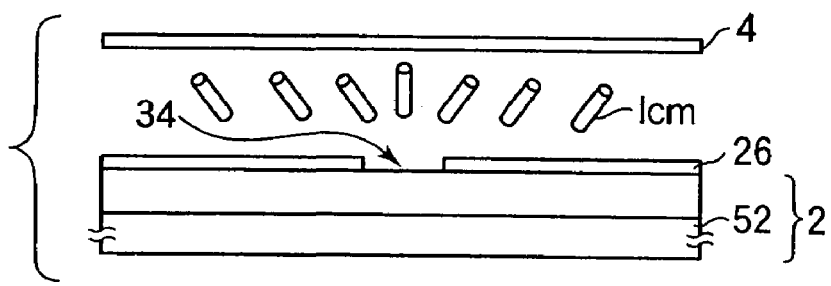
FIGS. 63A and 63B are sectional views showing examples to be compared with the configuration of a substrate for a liquid crystal display according to Embodiment 5-1 in the fifth mode for carrying out the invention.
Figure 63B:
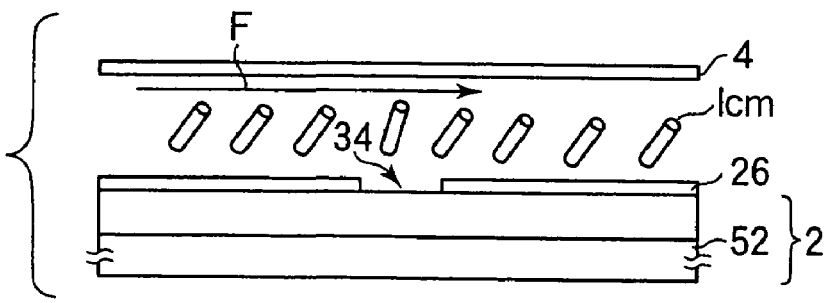

FIGS. 63A and 63B show a section of a pixel having a structure according to the related art as a comparative example. FIG. 63A shows a state of alignment of liquid crystal molecules 1 cm sealed between a TFT substrate 2 and a CF substrate 4. Two electrode units 26 that adjoin each other with a slit 34 interposed therebetween are formed on the TFT substrate 2. When a voltage is applied, the liquid crystal molecules 1 cm are aligned as illustrated, and a singular point with strengths =+1 is present above the slit 34. However, when a force F is exerted on the panel as a result of a press with a finger, the liquid crystal molecules 1 cm are aligned in one direction as illustrated, and the singular point with strength s=+1 moves away from the slit 34 or disappears. On the contrary, according to the present embodiment, electrical fields at edges of the pixel have a great effect, and a great alignment regulating force can be provided. Further, since the second insulation layer 502 of the slit 34 in the pixel electrode 16 serves as a bank-shaped alignment regulating structure as shown in FIG. 62, alignment defects attributable to coupling of alignment regions between adjoining electrode units 26 are less likely to occur, and any reduction in display quality can be prevented even if such a defect occurs.

Embodiment 5-2

Embodiment 5-2 will now be described with reference to FIGS. 64 to 67C. FIG. 64 shows a section taken along the same position as the line E-E in FIG. 61. FIGS. 65A to 67C show sectional views taken at manufacturing steps in the same position as that shown in FIG. 64. The configuration of electrode units 26 will not be described because it is the same as that in Embodiment 5-1. The present embodiment is different from Embodiment 5-1 in that an ITO layer to serve as pixel electrodes 16 is formed first. As shown in FIG. 65 A, an ITO film 510 is first formed on a glass substrate 52. Next, the ITO film 510 is patterned using a wet etching process to form pixel electrodes 16 including electrode units 26 and connection electrodes 36 as shown in FIG. 65B. Then, an insulation film 514 is formed on the entire surface (see FIG. 65C). Next, a film of a gate electrode material 516 is formed on the entire surface as shown in FIG. 65D.

The gate electrode material 516 is then patterned to form gate bus lines 12 as shown in FIG. 66A. Next, a gate insulation film 518 is formed as shown in FIG. 66B, and a semiconductor layer which is not shown is formed and then patterned to form a channel layer (not shown) on the gate bus lines (gate electrodes) 12. Next, contact holes 520 are formed to expose the surface of the electrode unit 26 as shown in FIG. 66C.

Then, a metal layer 522 for forming drain bus lines is formed and patterned as shown in FIG. 67A to form drain bus lines 14, drain electrodes 22 and source electrodes 24, thereby fabricating TFTs 10 (see FIG. 67B). Next, the gate insulation film 518 and the insulation film 514 are etched using a dry etching process in predetermined regions to form insulation layers 524 on the connection electrodes 36, and this completes a TFT substrate 2 in which regions where the pixel electrodes 16 are to be formed are lower than other regions.

In the structure of the present embodiment, since the insulation layers 524 are formed only above slits 34 and the connection electrodes 36 for electrically connecting the electrode units 26 of the pixel electrodes 16, it is possible to prevent movement of singular points with strength s=+1 that has occurred in the region of the connection electrodes 36 according to the related art. This makes it possible to provide a pixel structure which does not suffer from alignment defects when pressed with a finger or vibrated. Further, the pixel structure can be formed using manufacturing processes that are similar to those in the related art.

Embodiment 5-3

Figure 68:
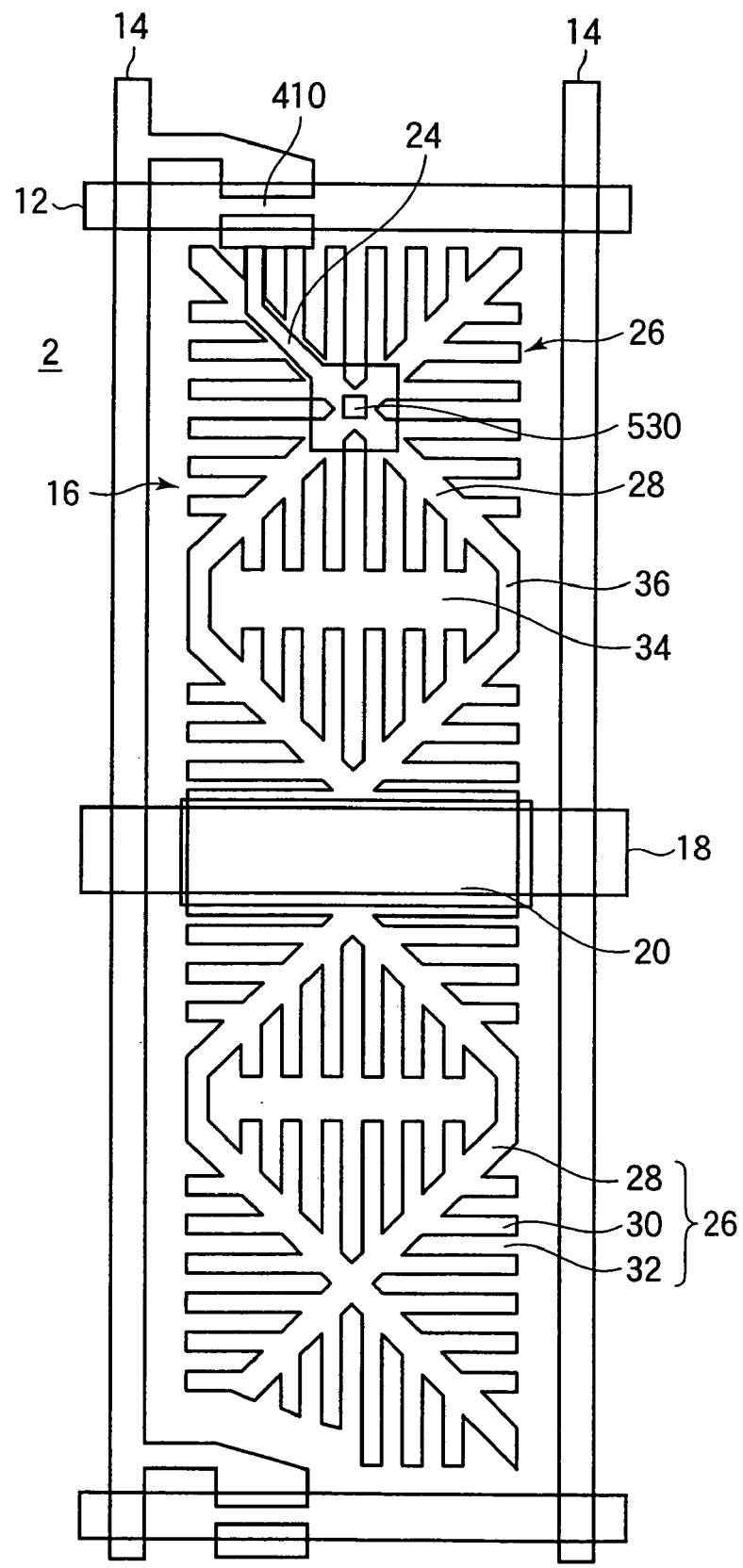
FIG. 68 shows a configuration of a substrate for a liquid crystal display according to Embodiment 5-3 in the fifth mode for carrying out the invention.

Embodiment 5-3 will now be described with reference to FIG. 68. In the present embodiment, the pitch of pixels in the direction of drain bus lines 14 is 225 µm. The pitch of the pixels in the direction of gate bus lines 12 is 75 µm. This is an example in which the size of one pixel itself is smaller than that in Embodiment 5-1.

The drain bus lines 14 and the gate bus lines 12 that have a width of 6 µm are formed on a TFT substrate 2, and pixel electrodes 16 constituted by ITOs are formed at a distance of 7 µm from each of the lines. That is, a region where a pixel electrode 16 is to be formed has a width of 55 µm. The configuration of the pattern of the pixel electrode 16 will be described later. A TFT 10 is formed in the vicinity of an intersection between the drain bus line 14 and the gate bus line 12 at each pixel.

A pixel electrode 16 is configured by arranging three electrode units 26 in total in one row in the horizontal direction and three columns in the vertical direction. An electrode unit 26 is an electrode having a square circumferential configuration of 55 µm×55 µm. The electrode units 26 are provided adjacent to each other with slits 34 having a width of 8 µm interposed therebetween and are electrically connected by connection electrodes 36 having a width of 4 µm. A contact hole 530 of a size of about 5 µm is provided substantially in the middle of an electrode unit 26 that is directly connected to the TFT 10 among the electrode units 26 that constitute the pixel electrode 16. The electrode unit 26 is formed solidly in a region substantially in the middle thereof that ranges 5 µm around the contact hole 530 such that the electrode is formed in the contact hole 530 without fail. The source electrode 24 is disposed under the electrode unit 26 with an insulation layer interposed therebetween, and it must be configured such that protrusion of the same from trunk sections 28 and branch section 30 of the electrode unit 26 is minimized. The reason is that spaces 32 in the electrode unit 26 will not function as intended when the source electrode 24 is formed under the spaces 32 because the source electrode 24 and the electrode unit 26 are at the same potential.

This makes it possible to prevent a singular point with strength s=+1 which must be formed in the middle of the electrode unit 26 from drifting toward the source electrode 24 under the influence of an electric field of the source electrode 24 when the pixel electrode 16 is put in contact with the source electrode 24 of the TFT 10. It is therefore possible to reduce a feel of coarseness in display attributable to such a phenomenon.

Embodiment 5-4

Figure 69:
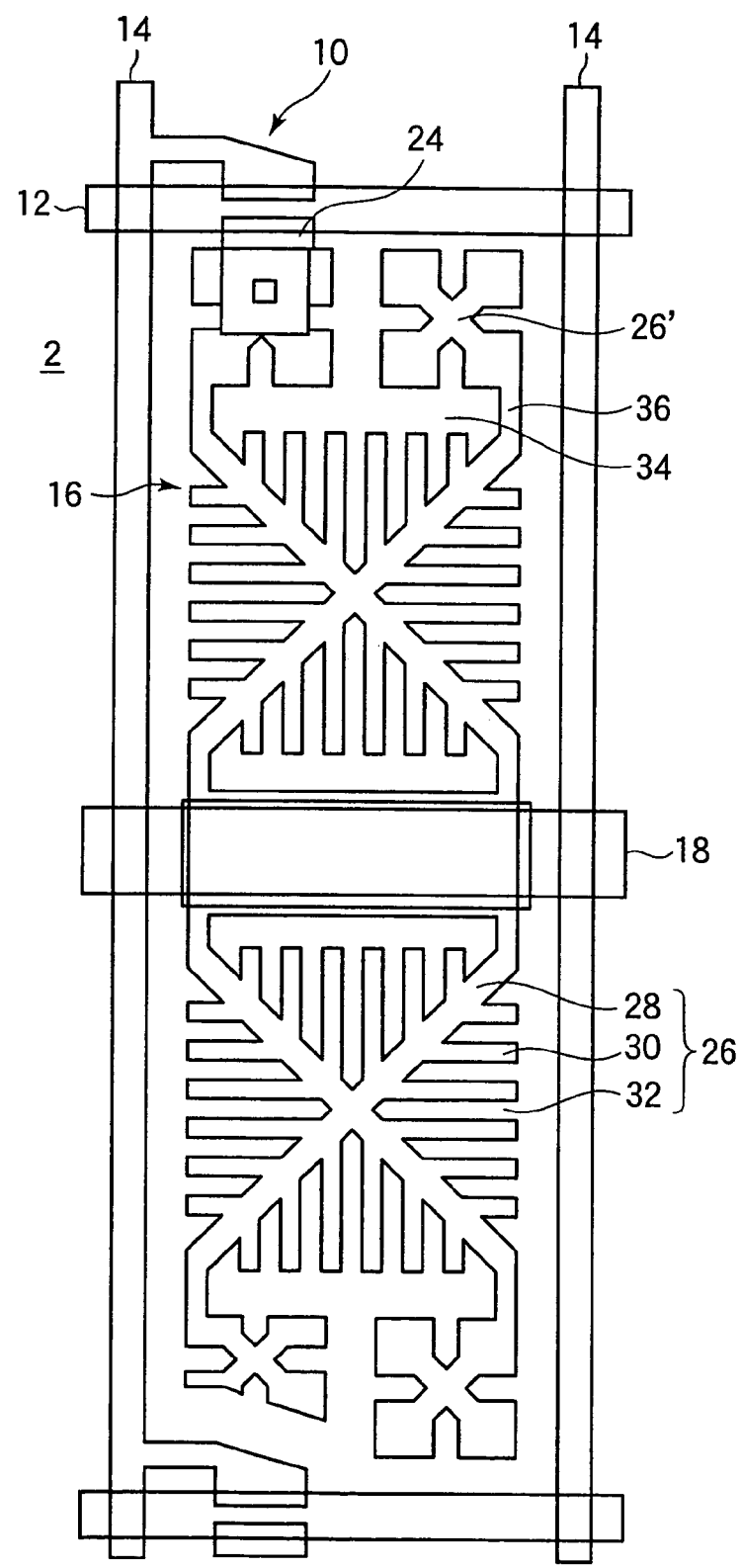
FIG. 69 shows a configuration of a substrate for a liquid crystal display according to Embodiment 5-4 in the fifth mode for carrying out the invention.

Embodiment 5-4 will be described with reference to FIG. 69. In the present embodiment, pixel pitches are the same as those in Embodiment 5-3.

A pixel electrode 16 is configured by combining first electrode units 26 and second electrode units 26'. The first electrode units 26 have a square configuration of 55 µm×55 µm, and the second electrode units 26' have a square configuration of 24 µm×24 µm. In the pixel electrode 16, the second electrode units 26' are provided at the top and bottom ends of the pixel in two rows in the horizontal direction and one row in the vertical direction. The first electrode units 26 are provided in one horizontal and two vertical rows between the second electrode units 26' at the top and bottom ends.

In the present embodiment, the second electrode units 26' that are located at electrode edges adjacent to gate bus lines 12 or in contact with source electrodes 24 of TFTs 10 are made smaller than the electrode units 26 located in other regions. The electrode units 26' in regions where a singular point with strength s=+1 is likely to be collapsed are thus intentionally made small to reduce the influence of abnormality of singular points when it actually takes place, which makes it possible to make the ratio between separately aligned domains less likely to become imbalanced. This suppresses the occurrence of alignment defects that result in coarse display and after-images in a macroscopic view.

As described above, in the present mode for carrying out the invention, fluctuations of the positions where singular points are generated can be suppressed without increasing manufacturing processes by using a structure in which banks constituted by an insulation layer are formed around electrode patterns of pixel electrodes.

A hole for contact with a TFT is provided in the middle of an electrode pattern, which makes it possible to generate singular points in positions that are aligned with each other, thereby suppressing generation of after-images.

The invention is not limited to the above-described modes for carrying out the same and may be modified in various ways.

For example, while a plurality of electrode units 26 having substantially the same configuration are provided in a pixel region in the above-described modes for carrying out the invention, this is not limiting the invention, and a plurality of electrode units having different configurations may be provided in combination. By way of example, a configuration is possible in which a plurality of electrode units 26 in two types of configurations are respectively provided above and under a storage capacitor bus line 18 in a line symmetrical relationship with each other about the storage capacitor bus line 18.

Further, while MVA LCDs have been referred to as examples in the above-described modes for carrying out the invention, the invention is not limited to the same and may be applied to other types of liquid crystal displays such as TN (twisted nematic) mode displays.

Furthermore, while transmissive liquid crystal displays have been referred to as examples in the above-described modes for carrying out the invention, the invention is not limited to the same and may be applied to other types of liquid crystal displays such as reflective displays and transflective displays in which a pixel electrode 16 is constituted by a conductive film having light reflecting properties.

While liquid crystal displays having color filters formed on a CF substrate 4 provided opposite to a TFT substrate 2 have been referred to as examples in the above-described modes for carrying out the invention, the invention is not limited to the same and may be applied to liquid crystal displays having the so-called CF-on-TFT structure in which color filters are formed on a TFT substrate 2.

As described above, the invention makes it possible to provide a substrate for a liquid crystal display and a liquid crystal display having the same that provide good display characteristics without increasing manufacturing steps.

What is claimed is:

1. A substrate for a liquid crystal display comprising:

an insulated substrate that sandwiches a liquid crystal in combination with an opposite substrate;

a plurality of gate bus lines formed substantially in parallel with each other on the insulated substrate;

a plurality of drain bus lines formed such that they intersect the gate bus lines with an insulation film interposed therebetween;

pixel regions provided in the form of a matrix on the insulated substrate;

a pixel electrode having a plurality of electrode units formed in each pixel region, slits formed between the electrode units, and connection electrodes for connecting the plurality of electrode units with each other; and a thin film transistor formed in each of the pixel regions, wherein the electrode units have a plurality of trunk sections, a plurality of branch sections that branch and extend from the trunk sections, and spaces between the branch sections, wherein the plurality of trunk sections are formed such that they intersect each other; and the electrode units have a plurality of alignment regions which are defined by the plurality of trunk sections and in which a liquid crystal is aligned in respective different directions, wherein the connection electrodes have extensions that are provided between branch sections belonging to electrode units adjacent to the drain bus lines and extending toward the drain bus lines and that extend in parallel with the extending direction of the branch sections and a connecting portion connecting the extensions and extending substantially in parallel with the drain bus lines.

* * * * *